United States Patent
Shirai et al.

(10) Patent No.: US 7,243,228 B2
(45) Date of Patent: Jul. 10, 2007

(54) DATA STORAGE WITH CBC-MODE ENCRYPTION PROCESSING

(75) Inventors: Taizo Shirai, Tokyo (JP); Yoshihito Ishibashi, Tokyo (JP); Kenji Yoshino, Tokyo (JP); Toru Akishita, Chiba (JP)

(73) Assignee: Sony Corporation, Tokyo (JP)

( * ) Notice: Subject to any disclaimer, the term of this patent is extended or adjusted under 35 U.S.C. 154(b) by 665 days.

(21) Appl. No.: 09/982,624

(22) Filed: Oct. 18, 2001

(65) Prior Publication Data

US 2002/0071553 A1 Jun. 13, 2002

(30) Foreign Application Priority Data

Oct. 20, 2000 (JP) ............................. 2000-320805

(51) Int. Cl.
*H04L 9/00* (2006.01)
(52) U.S. Cl. .................... 713/160; 713/161; 713/181
(58) Field of Classification Search .................. 380/42, 380/37, 255; 713/150; 705/67
See application file for complete search history.

(56) References Cited

U.S. PATENT DOCUMENTS

| | | | | |
|---|---|---|---|---|
| 5,671,283 A | * | 9/1997 | Michener et al. | 713/161 |
| 5,673,319 A | * | 9/1997 | Bellare et al. | 713/181 |
| 5,768,390 A | * | 6/1998 | Coppersmith et al. | 380/42 |
| 5,838,791 A | * | 11/1998 | Torii et al. | 380/217 |
| 6,360,320 B1 | * | 3/2002 | Ishiguro et al. | 713/164 |
| 6,748,485 B1 | * | 6/2004 | Yokota et al. | 711/112 |
| 2001/0007127 A1 | * | 7/2001 | Staring | 713/160 |

* cited by examiner

*Primary Examiner*—Nasser Moazzami
*Assistant Examiner*—Pramila Parthasarathy
(74) *Attorney, Agent, or Firm*—Finnegan, Henderson, Farabow, Garrett & Dunner, L.L.P.

(57) ABSTRACT

Between a data recording/playback device and a data storage device, CBC-mode encryption processing is executed which encrypts a plurality of encryption keys of content which correspond to sectors. The encrypted data is stored in a header corresponding to the content. The CBC-mode encryption processing is executed by using a storage key unique to media in which the content is stored. For using the content, only by decrypting the key data in media in which mutual authentication is established, the content can be used, so that highly-secure key storage is implemented.

8 Claims, 47 Drawing Sheets

FIG. 7

| Format Version |
|---|
| Content ID |
| Content Type |
| Data Type |
| Encryption Algorithm |
| Encryption Mode |
| Encryption Format Type |
| Encryption Flag |
| ICV Flag |
| Kc_Encrypted 0 |
| ⋮ |
| Kc_Encrypted 31 |
| Kicv_cont_encrypted |
| Valid Revocation List Version |
| ICV of Security Header |

FIG. 9

| Revocation List ID |
| --- |
| Revocation List Version |
| Number of Media1 ID |
| Media1 ID(0) |
| ⋮ |
| Media1 ID(L-1) |
| Number of Media2 ID |
| Media2 ID(0) |
| ⋮ |
| Media2 ID(M-1) |
| Number of Content ID |
| Content ID(0) |
| ⋮ |
| Content ID(N-1) |
| ICV of Revocation List |

FIG. 17

| DIRECTORY | FILE NAME | STORAGE SECTORS |
|---|---|---|
| / | A.h | 1 — 10 |
| / | A.cont | 21 — 100 |
| /dir_a | B.h | 101 — 110 |
| /dir_a | B.cont | 111 — 350 |
| /dir_a/dir_x | C | 401 — 450 |
| /dir_b | D | 501 — 580 |
| /dir_c | E.h | 601 — 610 |
| ⋮ | ⋮ | ⋮ |
| /dir_c | Z.cont | 5001 — 5340 |

FIG. 42
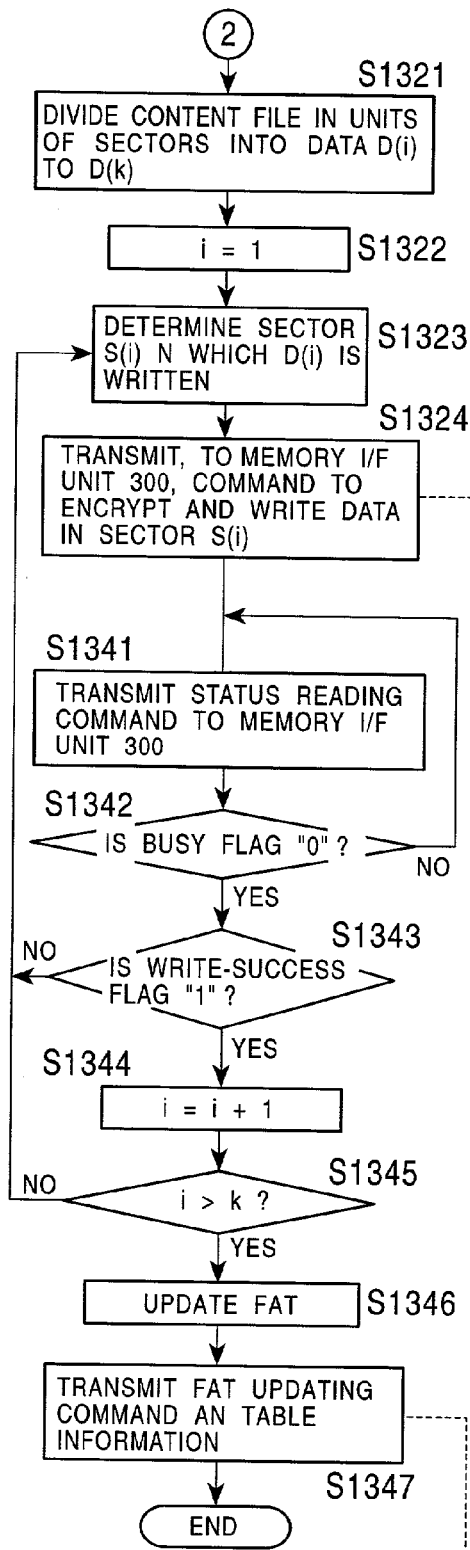
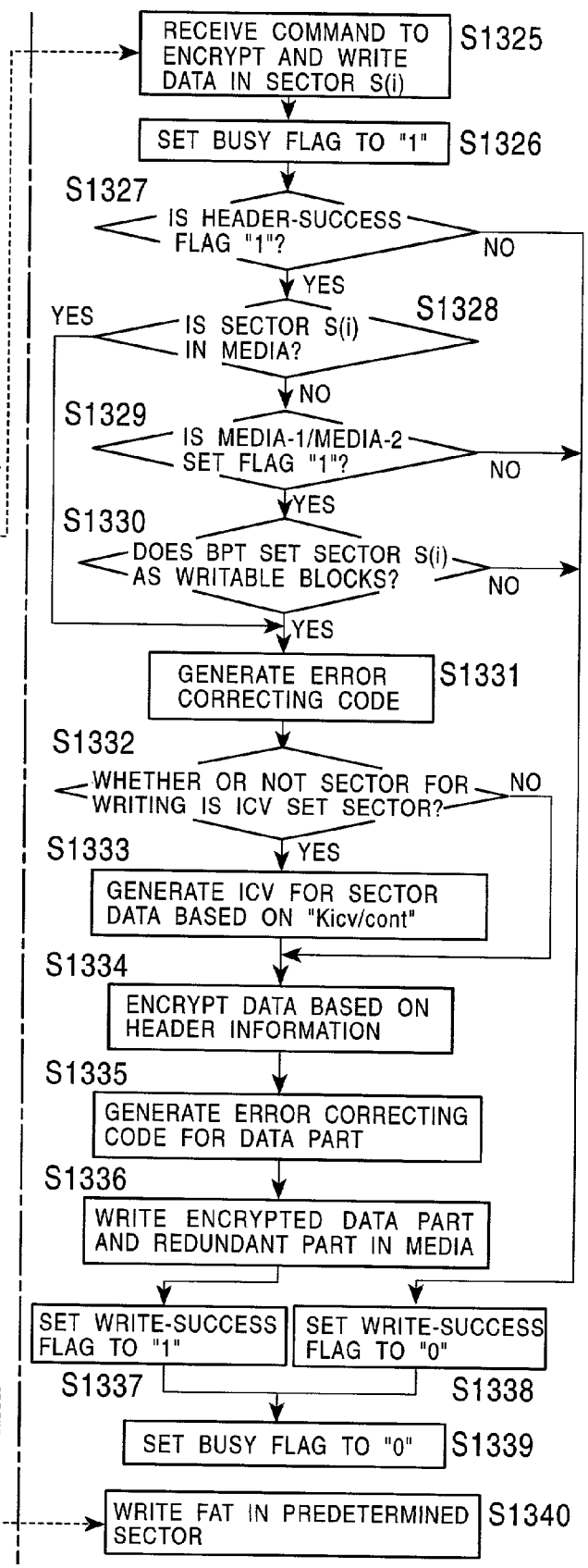

DATA STORAGE WITH CBC-MODE ENCRYPTION PROCESSING

BACKGROUND OF THE INVENTION

1. Field of the Invention

The present invention relates to data storage devices, data recording methods, data playback methods, and program providing media. In particular, the present invention relates to a data storage device, a data recording method, a data playback method in which content stored in the storage device is protected under high security management, and a program providing medium used therewith.

2. Description of the Related Art

With the rapid spread of the Internet in recent years and the spread of compact mobile players and portable game machines, the distribution of various types of software data (hereinafter referred to as "content"), such as music data, game programs, and image data, via a network such as the Internet or by storage media, such as digital versatile disks (DVDs), compact disks (CDs), and memory cards, is rapidly increasing. The distributed content is received via the network and is stored in a play-only device or a storage medium of a game machine which belongs to a user, or a memory card containing the content is loaded into the game machine, whereby content-playback processing or the execution of a program can be performed.

Content storage devices include a flash memory, which is commonly used. The flash memory is a form of electrically rewritable, non-volatile memory called an "electrically erasable, programmable read-only memory (EEPROM)". The degree of integration of conventional EEPROMs is limited because the use of two transistors for one bit results in a large occupied area per bit. Conversely, in the flash memory, by using an all-bit batch erasure, one bit is implemented by one transistor. It is expected that flash memories will replace recording media such as magnetic disks and optical disks.

A type of memory card is also known in which the flash memory can be loaded/unloaded into/from a data recording/playback device. By using this memory card, a digital audio recorder/player in which a memory card is used instead of a conventional disk medium such as CD or MiniDisk (registered trademark) (MD) can be provided.

When such a content storage device using the flash memory is used in a personal computer, a playback unit, or the like, a file management system called a "file allocation table (FAT)" is generally used as an access information table. In the FAT system, after defining necessary files, the parameters required for the files are sequentially set from the first file. As a result, the file size can be set to be variable, and one or more management units (e.g., sectors or clusters) can constitute one file. Details related matters to the management units are written in the FAT. In the FAT system, the file structure can be easily formed regardless of the physical properties of the recording medium. Accordingly, the FAT system can be employed not only in floppy disks and hard disks but also in magneto-optical disks. The FAT system is employed in the above memory card.

Various content, such as music data, image data, or programs, are accessed based on the FAT from, for example, the above flash memory in response to a user's instruction from an information device which is used as a playback unit, a game machine, or a personal computer, or to a user's instruction via an input device connected to the information device. The content is played back by the information device or on a display and a speaker which are connected thereto.

In general, the distribution rights, etc., of much software content, such as game programs, music data, and image data, are possessed by the creators and sellers of the content. Accordingly, in the distribution of the contents, security limitation of usage is commonly employed in which unauthorized duplication, etc., is prevented by permitting only a registered user to use the content.

One technique enabling limitation of use by the user is encryption processing on the content to be distributed. Specifically, various encrypted contents, such as encrypted audio data, image data, and game programs, are distributed via, for example the Internet, and only a person who is identified as a registered user is supplied with a means for decrypting the distributed content, that is, a decryption key.

The encrypted data can be processed to form usable decrypted data (plaintext) by performing decryption processing based on predetermined processes. This method of data encryption and decryption which uses an encryption key for information encryption processing and a decryption key for decryption processing has been conventionally known.

There is a case in which a content part is encrypted in order to protect copyright, etc. In this case, when a single encryption key is used to encrypt the entirety of the content part, a large number of codes are generated under the same encryption key. This results in a possibility that the codes may be easily attacked. Normally, it is preferable that, after dividing the content part as much as possible, the divided pieces of the content part be encrypted by using different encryption keys. The minimum unit of content encryption is a sector. In addition, a construction for securely storing a plurality of content keys is an issue.

SUMMARY OF THE INVENTION

It is an object of the present invention to provide a data storage device, a data recording method, and a data playback method in which a plurality of keys for use in content encryption, etc., are retained with enhanced security. It is also an object of the present invention to provide a program providing medium used therewith.

To these ends, according to a first aspect of the present invention, there is provided a data storage device including a data storage area consisting of a plurality of blocks, each of which consists of a plurality of sectors which each have a predetermined data capacity, and a cryptosystem unit. The cryptosystem unit receives, as cryptosystem keys for performing cryptosystem processing on data to be stored in the data storage area, a set of keys correlated with the encryption keys or decryption keys for each of the sectors from a device capable of performing data communication with the data storage device, and transmits, to the device, a set of encrypted keys obtained by executing encryption processing in the cipher block chaining (CBC) mode on the received set of keys.

Preferably, the cryptosystem unit generates key data as the header information of the data to be stored in the data storage area by using a storage key which is unique to the data storage device to execute the encryption processing in the CBC mode on the received set of keys.

The data storage device may perform mutual authentication with the device capable of performing data communication with the data storage device. The received set of keys may be a set of session-key-used CBC-mode-processing keys encrypted in the CBC mode by using a session key generated in the mutual authentication. The cryptosystem unit may perform the decryption in the CBC mode of the set of encrypted session-key-used CBC-mode-processing keys. In the cryptosystem unit, a set of storage-key-used CBC-mode-processing keys may be generated by executing, based on a storage key unique to the data storage device, the encryption processing in the CBC mode on the set of decrypted session-key-used CBC-mode-processing keys, and the set of storage-key-used CBC-mode-processing keys is transmitted as header-information-forming data to the device.

The data storage device may perform mutual authentication with the device capable of performing data communication with the data storage device. The received set of keys may be header information on the data to be stored in the data storage area, and may be a set of storage-key-used CBC-mode-processing keys encrypted in the CBC mode based on a storage key unique to the data storage device. The cryptosystem unit may perform the decryption in the CBC mode of the set of encrypted storage-key-used CBC-mode-processing keys by using the storage key. In the cryptosystem unit, a set of session-key-used CBC-mode-processing keys may be generated by executing, based on a session key generated in the mutual authentication, the encryption processing in the CBC mode, and the set of session-key-used CBC-mode-processing keys may be transmitted as data constituting decrypting key information.

From the device capable of performing data communication with the data storage device, the cryptosystem unit may receive: the set of keys correlated with the encryption keys or decryption keys for the sectors, as cryptosystem keys for performing cryptosystem processing on the data to be stored in the data storage area; and an integrity-check-value generating key of data to be stored in at least one of the sectors. In the cryptosystem unit, the received set of keys may be encrypted in the CBC mode and are transmitted to the device.

According to a second aspect of the present invention, there is provided a data recording method for a data processor including a data storage device which includes a cryptosystem unit and a data storage area consisting of a plurality of blocks, each of which consists of a plurality of sectors which each have a predetermined data capacity; and a data recording device for executing data storage processing by transmitting data to the data storage device. The data recording method includes the steps of: executing mutual authentication processing between the data storage device and the data recording device; when the mutual authentication is established, transmitting, to the data storage device, by the data recording device, a set of session-key-used CBC-mode-processing keys which are generated by executing, based on a session key generated in the mutual authentication, encryption processing in the CBC mode on the set of keys applicable to encryption processing on pieces of data to be stored in the sectors; decrypting, by the data storage device, the set of session-key-used CBC-mode-processing keys by performing decryption in the CBC mode using the session key; transmitting, to the data storage device, a set of storage-key-used CBC-mode-processing keys which are generated by executing, based on a storage key unique to the data storage device, encryption processing in the CBC mode on the set of decrypted session-key-used CBC-mode-processing keys; and generating, by the data recording device, header information including as a component the received set of storage-key-used CBC-mode-processing keys, the header information corresponding to the data to be stored in the data storage device.

According to a third aspect of the present invention, there is provided a data playback method for a data processor including a data storage device which includes a cryptosystem unit and a data storage area consisting of a plurality of blocks, each of which consists of a plurality of sectors which each have a predetermined data capacity; and a data playback device for playing back data which is received from the data storage device. The data playback method includes the steps of: executing mutual authentication processing between the data storage device and the data playback device; when the mutual authentication is established, transmitting, from the data playback device to the data storage device, a set of storage-key-used CBC-mode-processing keys which is included in the header information of data stored in the data storage area and which is generated by executing encryption processing in the CBC mode using a storage key unique to the data storage device; decrypting, by the data storage device, the set of storage-key-used CBC-mode-processing keys by performing decryption in the CBC mode using the storage key; transmitting, by the data storage device, to the data playback device, a set of session-key-used CBC-mode-processing keys which are generated by executing, based on a session key generated in the mutual authentication, encryption processing in the CBC mode on the set of decrypted storage-key-used CBC-mode-processing keys; and obtaining, by the data playback device, a set of keys for decrypting encrypted sector data which is stored in each of the sectors in the data storage area by decrypting, in the CBC mode, the session-key-used CBC-mode-processing keys by using the session key.

According to a fourth aspect of the present invention, there is provided a program providing medium for providing a computer program which controls a computer system to execute data recording processing for a data processor comprising: a data storage device comprising cryptosystem unit and a data storage area consisting of a plurality of blocks, each of which consists of a plurality of sectors which each have a predetermined data capacity; and a data recording device for executing data storage processing by transmitting data to the data storage device. The computer program includes the steps of: executing mutual authentication processing between the data storage device and the data recording device; when the mutual authentication is established, transmitting, to the data storage device, by the data recording device, a set of session-key-used CBC-mode-processing keys which are generated by executing, based on a session key generated in the mutual authentication, encryption processing in the CBC mode on the set of keys applicable to encryption processing on pieces of data to be stored in the sectors; decrypting, by the data storage device, the set of session-key-used CBC-mode-processing keys by performing decryption in the CBC mode using the session key; transmitting, to the data storage device, a set of storage-key-used CBC-mode-processing keys which are generated by executing, based on a storage key unique to the data storage device, encryption processing in the CBC mode on the set of decrypted session-key-used CBC-mode-processing keys; and generating, by the data recording device, header information including as a component the received set of storage-key-used CBC-mode-processing keys, the header information corresponding to the data to be stored in the data storage device.

According to a fifth aspect of the present invention, there is provided a program providing medium for providing a computer program which controls a computer system to execute data playback processing for a data processor comprising: a data storage device comprising cryptosystem unit and a data storage area consisting of a plurality of blocks, each of which consists of a plurality of sectors which each have a predetermined data capacity; and a data playback device for playing back data which is received from the data storage device. The computer program includes the steps of: executing mutual authentication processing between the data storage device and the data playback device; when the mutual authentication is established, transmitting, from the data playback device to the data storage device, a set of storage-key-used CBC-mode-processing keys which is included in the header information of data stored in the data storage area and which is generated by executing encryption processing in the CBC mode using a storage key unique to the data storage device; decrypting, by the data storage device, the set of storage-key-used CBC-mode-processing keys by performing decryption in the CBC mode using the storage key; transmitting, by the data storage device, to the data playback device, a set of session-key-used CBC-mode-processing keys which are generated by executing, based on a session key generated in the mutual authentication, encryption processing in the CBC mode on the set of decrypted storage-key-used CBC-mode-processing keys; and obtaining, by the data playback device, a set of keys for decrypting encrypted sector data which is stored in each of the sectors in the data storage area by decrypting, in the CBC mode, the session-key-used CBC-mode-processing keys by using the session key.

Each of the program providing media according to the fourth and fifth aspects of the present invention is, for example, a medium for providing a computer program in a computer-readable form to a general-purpose computer system capable of executing various types of program codes. The form of the medium is not particularly limited and may be a recording medium such as a CD, an FD, an MO, or a transmission medium such as a network.

The above program providing media define cooperative relationships in structure and function with a computer program in order to implement the function of a predetermined computer program on a computer system. In other words, by installing a computer program into a computer system with each program providing medium, the computer system exhibits cooperative operations, and operations and advantages which are similar to those in other aspects of the present invention can be obtained.

According to the present invention, it is impossible to perform unauthorized decryption processing from encrypted key data, so that keys can be securely stored.

According to the present invention, it is impossible to decrypt key data from a device alone or when inappropriate media is loaded into the device, so that keys can be securely stored.

Further objects, features and advantages of the present invention will become apparent from the following description of the preferred embodiments with reference to the attached drawings.

BRIEF DESCRIPTION OF THE DRAWINGS

FIG. 7 is a drawing showing the structure of a security header which is set correspondingly to content stored in media for use in the present invention;

FIG. 9 is a drawing showing the structure of a revocation list in a data processing device of the present invention;

FIG. 17 is an illustration of a file allocation table in a data processing device of the present invention;

FIG. 42 consists of second flowcharts showing processing that writes data in encrypted form in a data processing device of the present invention;

DESCRIPTION OF THE PREFERRED EMBODIMENTS

Outline of System

Figure 1:
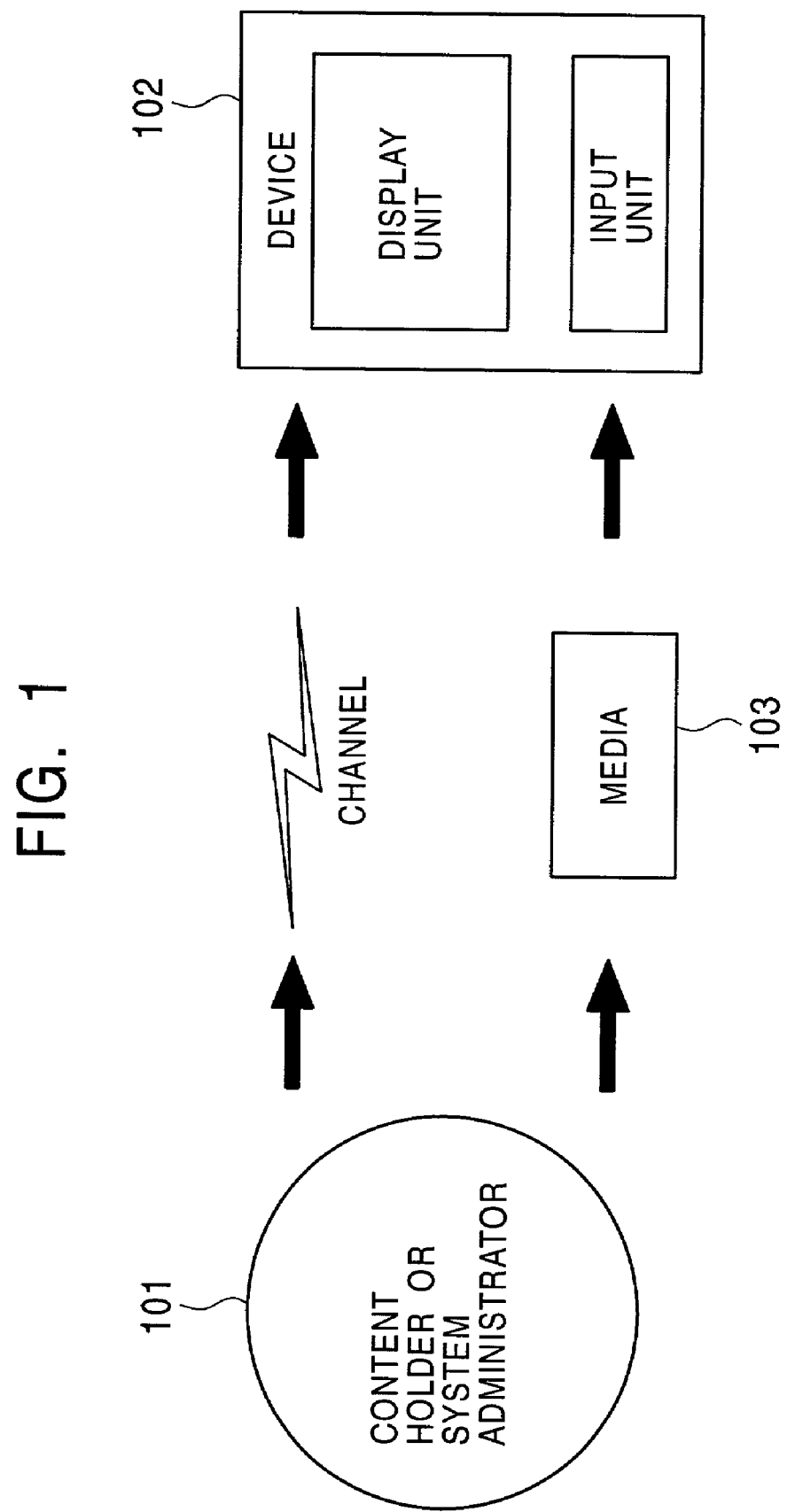
FIG. 1 is an illustration of the concept of usage of a data processing device of the present invention.

FIG. 1 shows the structure of a content distribution system to which a data processing device of the present invention is applied.

Content, such as music data, image data, and various programs, is stored by a system holder or a system administrator 101 such as service provider into media 103 as various recording media such as a CD, a DVD, and a memory card having a built-in flash memory. The content is played back or executed after the media is loaded into a device 102 or the content is received by the device 102. The device 102 is, for example, a device having a content playback function, such as a personal computer, a play-only device, or a game machine. The device 102 includes, for example, a display unit for displaying image content, and an input unit for the user to input instructions.

Figure 2:
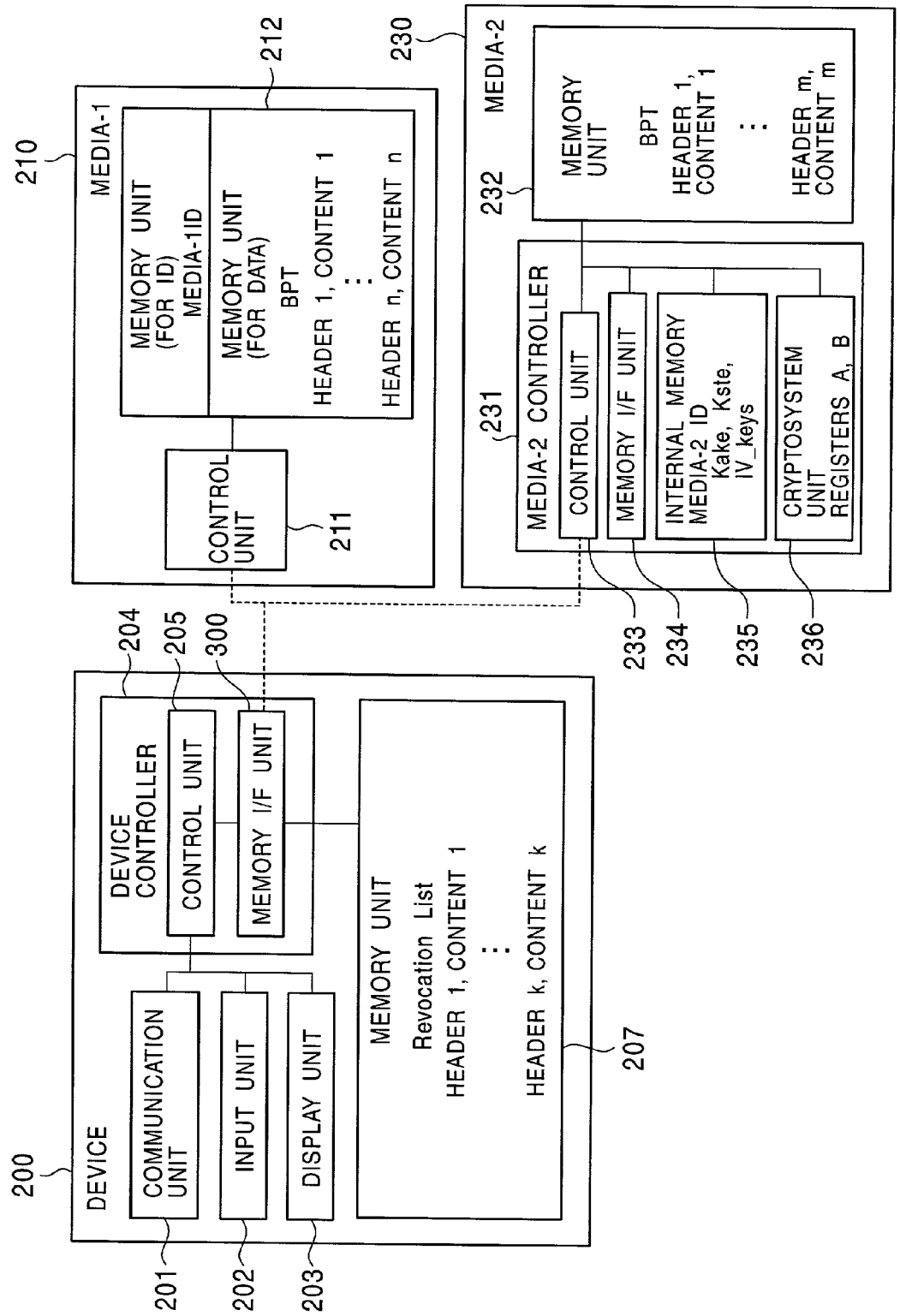
FIG. 2 is an illustration of a data processing device of the present invention, and two types of media.

The detailed structures of a device that plays back content and examples of media that store content in the above content distribution system is shown in FIG. 2.

FIG. 2 shows the detailed structure of a device 200, media 1 (210), and media 2 (230). Media 1 (210) includes a control unit that only supports simple data reading/writing processing. Media 2 (230) includes a control unit which executes mutual authentication processing with a device into which media 2 is loaded, and which executes encryption processing on content to be stored therein. Both media 1 (210) and media 2 (230) can be loaded into the device 200.

In FIG. 2, the device 200 includes a communication unit 201 that executes data-transmitting/receiving processing using means of data communication such as the Internet, an input unit 202 to which various instructions are input, a display unit 203 that displays messages and content, a control unit 205 that controls the units 201 to 203, a device controller 204 including a memory interface (I/F) unit 300 having an interface function of processing data input/output to/from media 1 or 2 (210 or 230), and a memory unit 207 that is an internal memory storing groups of content files and a revocation list as revocation information on inappropriate media and contents. Data files (such as the revocation list) which are stored in the memory unit 207 are managed by a FAT so that the data files can be read.

In content playback, the device 200 performs playback after verifying that content to be played back does not correspond to revoked media or revoked content which is recorded in the revocation list. When the content to be played back is found on the revocation list, the situation is treated as a playback error, and playback processing is not executed. The revocation list and playback processing to which the revocation list is applied are described later.

Media 1 (210) includes a control unit 211 that controls the input and output of data, and a memory unit 212 that stores the content. The memory unit 212 not only stores the content together with corresponding header information, but also stores a media identifier (ID) as identification information unique to each media, and a block permission table (BPT) as an access permission table describing memory-access control information.

After recognizing the media, the file system of the device 200 reads the BPT from the media, and transfers the BPT to the memory I/F unit 300 that directly accesses the media in order to manage the BPT. After receiving the BPT, the memory I/F unit 300 performs verification of an integrity check value (ICV) for the received BPT. Only when the ICV is correct does the memory I/F unit 300 regard the BPT as valid and stores it. When receiving a command to access the memory unit of the media, the memory I/F unit 300 executes accessing based on the BPT of the media. The configuration of the BPT and processing using the BPT are described later.

Media 2 (230) includes a controller 231 and a memory unit 232. The memory unit 232 stores content with corresponding header information, and stores a BPT as an access permission table. The controller 231 includes a memory I/F unit 234 as a data-storage or data-reading interface with the memory unit 232; an internal memory 235 that stores a media-2 ID as a media identifier, an authentication key "Kake" which is applied to mutual authentication processing, a storage key "Ksto" as a cryptosystem key used when content is stored in the memory unit 232, and an initial value "IV_keys" for use in encryption of a key to be encrypted; a cryptosystem unit 236 which executes authentication processing or content encryption/decryption processing and which includes a register; and a control unit 233 that controls the above units.

Memory Structure in Media

Figure 3:
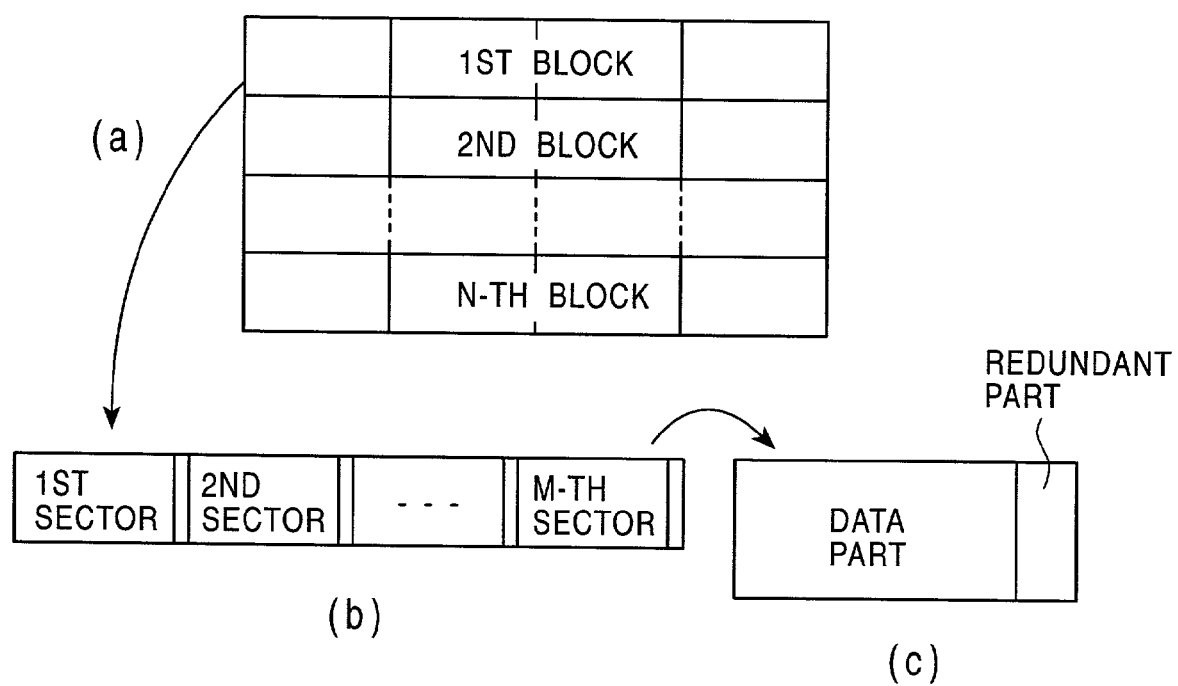
FIG. 3 consists of drawings showing the structure of data stored in the memory unit of each type of media.

Next, FIG. 3 shows the structure of data stored in each of the memory units 211 and 233 of media 1 (210) and media 2 (230). Each memory unit is, for example, a flash memory that is a form of electrically erasable, programmable read-only memory (EEPROM). In this memory, data erasure is performed by a block-unit batch-erasure method.

As shown in part (a) of FIG. 3, the flash memory has a plurality of blocks, namely, the 1st block to the N-th block. As shown in part (b) of FIG. 3, each block consists of a plurality of sectors, namely, the 1st sector to the M-th sector. As shown in part (c) of FIG. 3, each sector consists of a data part including actual data, and a redundant part including redundant data such as an error correcting code. In the redundant part, an ICV for checking sector data in each sector may be stored.

Main Commands

Main commands that are issued by the control unit 205 to the memory I/F unit 300 of the device 200 (shown in FIG. 2) are described below.

Commands that are issued from the control unit 205 to the memory I/F unit 300 are as follows:

"status reading command"
  Reads the status of a status register in which the status of the present memory I/F unit is set. The memory I/F unit 300 sends back the contents of the status register.
"sector reading command"
  Command to read data in a designated sector.
"sector writing command"
  Command to write data in a designated sector.
"sector decryption-reading command"
  Command to execute processing that, based on set header information, decrypts encrypted data in a designated sector and reads the decrypted data.
"sector encryption-writing command"
  Command to execute processing that, based on set header information, encrypts data and writes the encrypted data in a designated sector.
"header generating command"
  Command to execute processing that generates a header based on a designated parameter.
"header set command"
  Command to execute processing that sets a header in a memory I/F unit.
"BPT set command"
  Command to execute processing that sets a BPT in a memory I/F unit.
"revocation list set command"
  Command to execute processing that sets a revocation list of inappropriate media and inappropriate content in a memory I/F unit.
"updating-revocation-list check command"
  Command to execute processing that checks whether an update revocation list may be used to update the present revocation list.
"media-1 identification command"
  Command to execute processing that reads a media ID from media 1 when it is connected to the memory I/F unit 300, and that verifies whether the ID is valid.
"media-2 identification command"
  Command to execute processing that verifies whether media ID is valid after performing mutual authentication with media 2 when it is connected to the memory I/F unit 300.
"file-allocation-table calling command"
  Command to execute processing that reads a FAT in the memory unit 207.
"file-allocation table updating command"
  Command to execute processing that updates a FAT to the memory unit 207.

From the memory I/F unit 300 to media 1, the following command is issued:

"ID reading commands"
  Command to execute processing that reads the ID of media 1.

Detailed Structure of Memory I/F Unit 300 in Device 200

Figure 4:
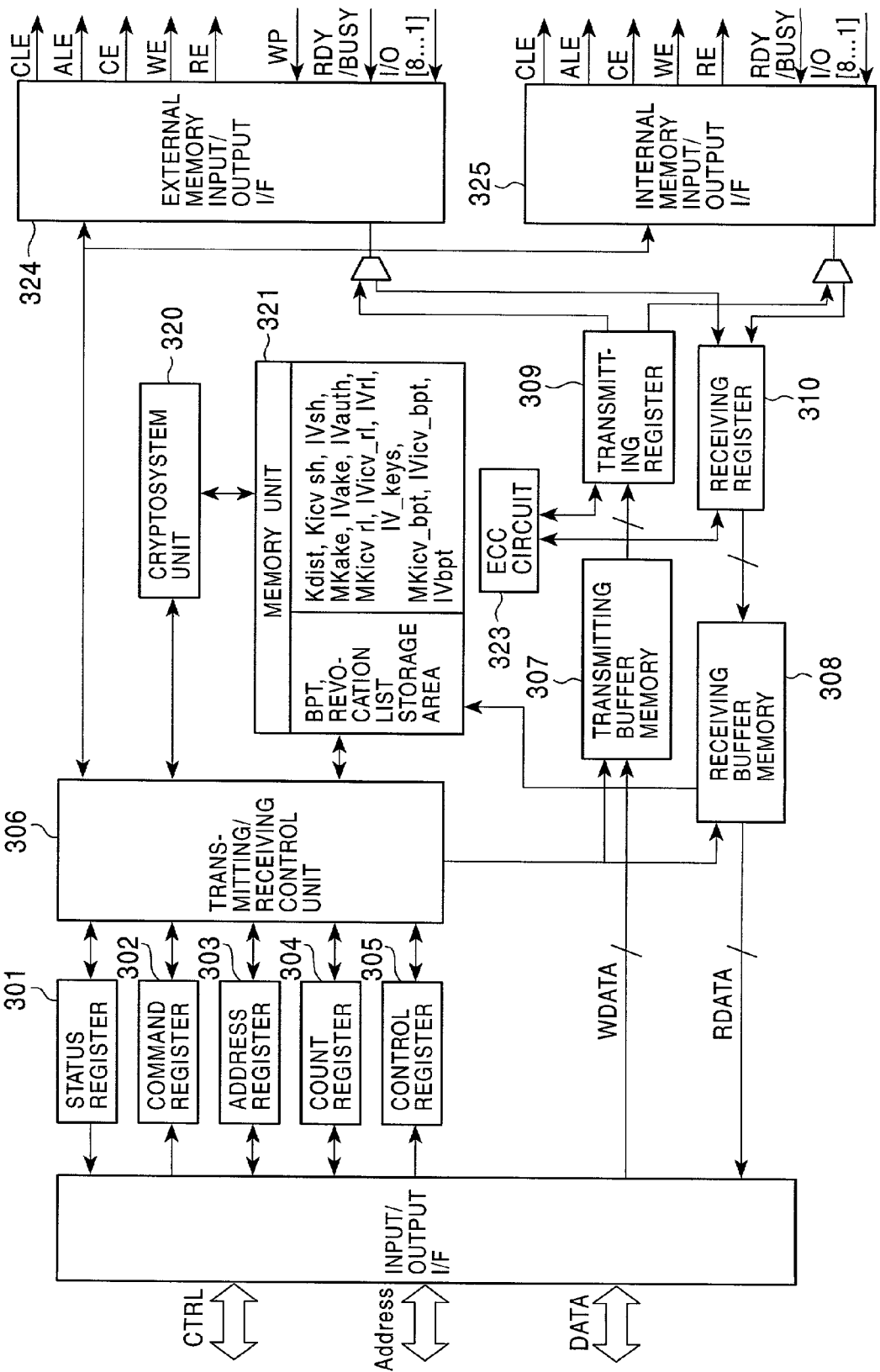
FIG. 4 is a block diagram showing the detailed structure of a memory I/F unit in a data processing device of the present invention.
Figure 5:
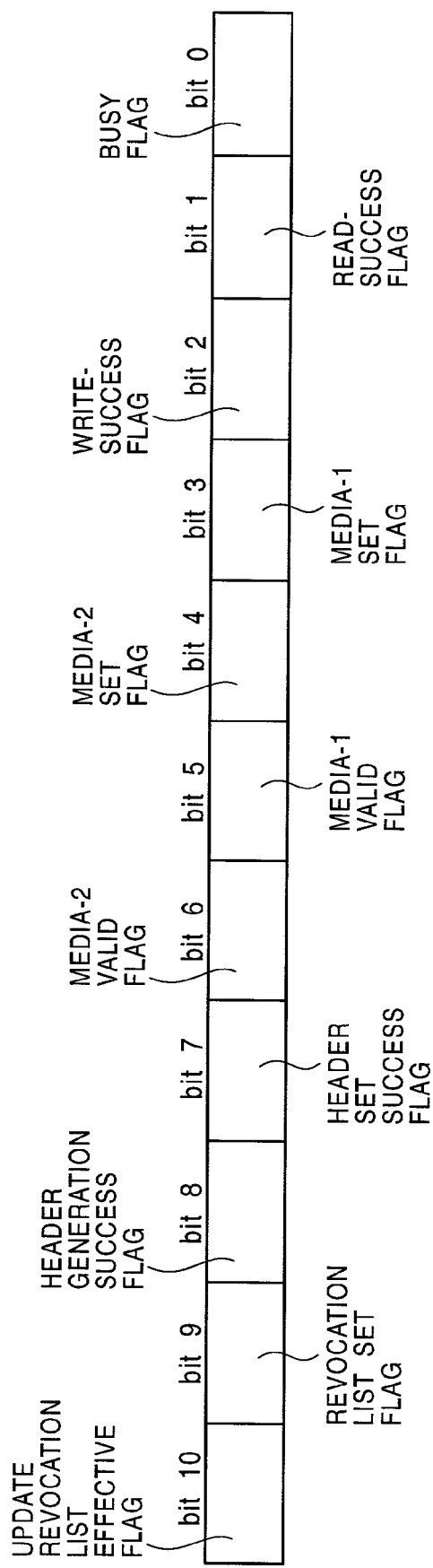
FIG. 5 is a drawing showing the arrangement of data in the status register of a memory I/F unit in a data processing device of the present invention.

The detailed structure of the memory I/F unit 300 in the device 200 is shown in FIG. 4. The functions of components are described as follows:

"status register 301"
  Stores the internal status of the memory I/F unit 300. An example of the status register 301 is shown in FIG. 5. The bits of the status register 301 have the following meanings:
    "bit 0": busy flag (1: busy; 0: ready): Bit indicating whether the memory I/F unit 300 is executing internal processing.
    "bit 1": read-success flag (1: success; 0: fail): Bit indicating whether data has successfully been read from a memory unit 321.
    "bit 2": write-success flag (1: success; 0: fail): Bit indicating whether data has successfully been written in a memory unit 321.
    "bit 3": media-1 set flag (1: set; 0: not set): Bit indicating whether connected media 1 is usable.
    "bit 4": media-2 set flag (1: set; 0: not set): Bit indicating whether connected media 2 is usable.
    "bit 5": media-1 valid flag (1: OK; 0: Not OK): Bit indicating whether the ID of connected media 1 is not one of the revoked ones in the revocation list.
    "bit 6": media-2 valid flag (1: OK; 0: Not OK): Bit indicating whether the ID of connected media 2 is not one of the revoked ones in the revocation list.
    "bit 7": header set success flag (1: success; 0: fail): Bit indicating whether a header has been set in the memory I/F unit 300.
    "bit 8": header generation success flag (1: success; 0: fail): Bit indicating whether a header has successfully been generated.
    "bit 9": revocation list set flag (1: set; 0: not set): Bit indicating whether the revocation list has been set in the memory I/F unit 300.
    "bit 10": update revocation list valid flag (1: OK; 0: Not OK): Bit indicating whether the update revocation list is valid.

The status register 301 retains the above types of status information for the memory I/F unit 300.

Referring back to FIG. 4, the functions of the other components are described below.

"command register 302"
Stores a command transmitted from the control unit 205.

"address register 303"
Sets a sector in which data transfer is started.

"count register 304"
Sets the total number of data sectors to be transferred.

(Reading/writing of data from/to the external memory and the internal memory is executed by setting, in the address register 303, a sector address at which the data reading/writing is initiated, setting the total number of sectors for the reading/writing in the count register 304, and setting a sector reading/writing command in the command register 302)

"control register 305"
Sets the operation of the memory I/F unit 300.

"transmitting/receiving control unit 306"
Controls memory interface components such as the registers 301 to 305, and the transmitting and receiving buffer memories 307 and 308.

"transmitting buffer memory 307"
Stores data to be transmitted.

"receiving buffer memory 308"
Stores received data.

"transmitting register 309"
Used for transmitting data in the transmitting buffer memory 307.

"receiving register 310"
Stores received data and is used for transferring the received data to the receiving buffer memory 308.

"cryptosystem unit 320"
Performs various cryptosystem processes on data in the transmitting and receiving buffer memories 307 and 308.

"memory unit 321"
Storage area in which the key information required for cryptosystem processing in a cryptosystem unit 320, the revocation list read from the internal memory, and the BPT which is externally read as an access permission table from the external memory are stored.

When the revocation list and the BPT are properly set in the memory I/F unit 300, or the transmitting/receiving control unit 306 receives a command such as a media identification command or a data-reading/writing command for the external memory, processing which refers to the set revocation list and BPT is executed. This processing is described later with reference to flowcharts.

The memory unit 321 stores, as the key information required for cryptosystem processing, the following types of data:

"Kdist": Distribution key included in a security header of content other than the content stored in media 2.
Encrypts a content-ICV generating key "Kicv_cont" and content key "Kc".

"Kicv_sh": Security-header-ICV generating key for use in the generation of an ICV for a security header.

"IVsh": Initial value (IV) for use in the generation of an ICV for a security header.

"MKake": Master key for mutual authentication.

"IVake": Initial value that is applied to processing that generates a key for mutual authentication.

"IVauth": Initial value (IV) for generating data for mutual authentication.

"MKicv_rl": Master key for generating an ICV key for the revocation list.

"IVicv_rl": Initial value (IV) for generating an ICV for the revocation list.

"IVrl": Initial value (IV) for generating an ICV for the revocation list.

"IV_keys": Initial value (IV) for use in the encryption of a content-encrypting key in media 2.

"MKicv_bpt": Master key for generating an ICV for the BPT as access permission information.

"IVicv_bpt": Initial value (IV) for use in an ICV generating mode for generating an ICV for the BPT as access permission information.

"IVbpt": Initial value (IV) of the BPT as access permission information.

The memory I/F unit 300 further includes the following components:

"error checking and correcting (ECC) circuit 323"
Dedicated block for performing ECC checking on data in the transmitting register 309 and the receiving register 310.

"external memory input/output interface (I/F) 324"
Input/output interface with the external memory (media 1 or 2). The external memory includes, for example, a memory card including a flash memory. The external memory input/output I/F 324 is used to input and output, for example, content, header information necessary for content recording and playback, and a BPT.

"internal memory input/output interface (I/F) 325"
Input/output interface with the internal memory. The internal memory input/output I/F 325 is used to input and output, for example, the revocation list stored in the internal memory.

From the external memory input/output I/F 324 and the internal memory input/output I/F 325, the following signals are output to the external memory (media 1 or 2) or the internal memory in accordance with types of processing.

CLE: "command latch enable"
ALE: "address latch enable"
CE: "chip enable"
WE: "write enable"
RE: "read enable"

In addition, the following signals are input as signals from the external memory (media 1 or 2) or the internal memory.

WP: "write protect" (applied only to the external memory (media 1 or 2)
RDY/BUSY: "ready/busy"

Configuration of Content Stored in Memory

Figure 6A:
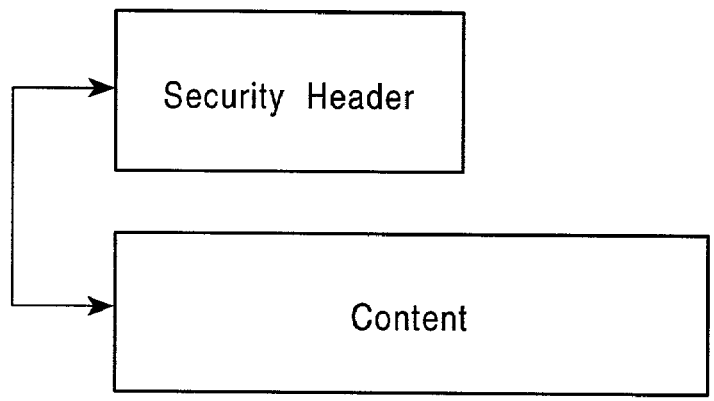
FIGS. 6A and 6B are drawings showing the detailed structure of data stored in media for a data processing device of the present invention.
Figure 6B:
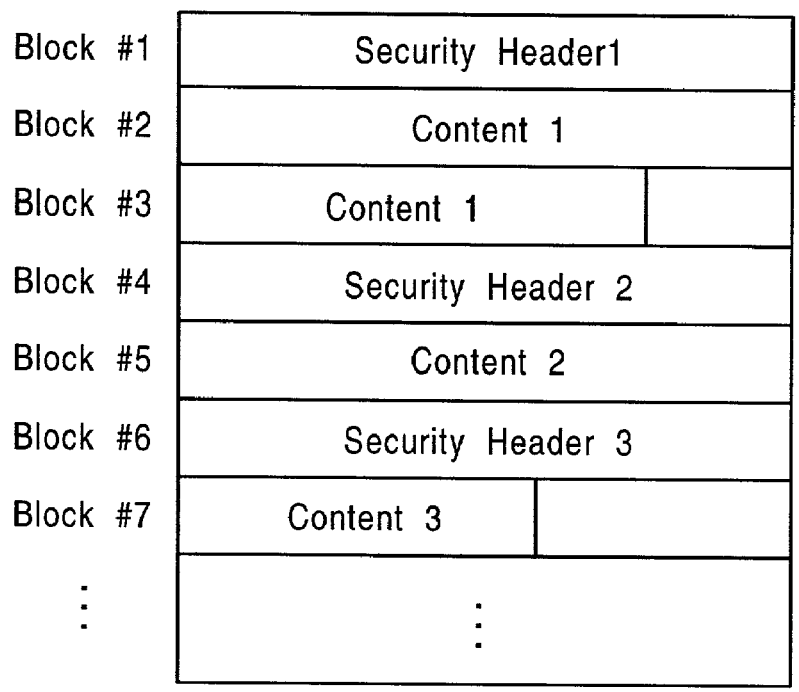

With reference to FIGS. 6A and 6B, the configuration of content stored in the flash memory of the media is described below.

As shown in FIG. 6A, each pieces of content, such as music data and image data, consists of a security header part composed of various types of attribute information, and a content part as actual data.

As shown in FIG. 6B, the flash memory of the media stores pairs of security header parts and content parts for a plurality of pieces of content. As described above, erasure is performed in units of blocks in the flash memory. Accordingly, the flash memory employs a form in which the security header part or content part of one piece of content is stored in one block, and does not perform processing in which different pieces of content is stored in one block, excluding a case in which batch erasure processing is allowed.

Structure of Security Header

A security header is attribute information corresponding to each piece of content. The data structure of the security header is shown in FIG. 7. The types of data are as follows:

"Format Version"
Indicates the format version of a security header.

"Content ID"
Indicates the identifier (ID) of the content.

"Content Type"
Indicates the type of content. The types of content include, for example, content stored in media 1, content stored in media 2, and broadcast content.

"Data Type"
Indicates one content attribute such as music data, image data, or program.

"Encryption Algorithm"
Indicates an encrypting algorithm using a content key (Kc) of the content. Indicates, for example, one encryption type such as encryption based on the Data Encryption Standard (DES) or encryption based on the Triple-DES.

"Encryption Mode"
Indicates the encryption mode corresponding to an algorithm designated in the Encryption Algorithm.
Indicates, for example, an electronic codebook mode (ECB) or a cipher block chaining (CBC) mode.

"Encryption Format Type"
Indicates a content encryption format, specifically, type 1 or type 2, where type 1 represents a form in which the entirety of content is encrypted by using a single content key Kc, and type 2 represents a form in which the content is encrypted by using different keys Ksec_n for the different sectors of the content.

The encryption formats are shown in FIGS. 8A and 8B. FIG. 8A shows a memory-stored structure of a content encrypted in accordance with the type-1 encryption format, and FIG. 8B shows a memory-stored structure of a content encrypted in accordance with the type-2 encryption format.

The type-1 encryption format shown in FIG. 8A indicates sector-independent encryption processing in which the entirety of the content is encrypted by using a single content "Kc" and is stored in memory. The type-2 encryption format shown in FIG. 8B indicates sector-dependent encryption processing in which a content is stored after being encrypted by using different sector keys "Ksec_1" to "Ksec_m" for the sectors of the flash memory. For example, in sector 1 of the flash memory in FIG. 8B, a sector key "Ksec_1" is set as an encryption key for sector 1, and the entirety of a content to be stored in sector 1 is encrypted by using "Ksec_1" and is stored in each block. In sector m of the flash memory, the sector key "Ksec_m" is set as an encryption key for sector m, and the entirety of content to be stored in sector m is encrypted by using Ksec_m and is stored in each block.

As described above, the present invention employs content encryption processing using different encryption keys for sectors. Also in an encryption form using different encryption keys for sectors, various forms of encryption are usable, such as Triple-DES processing using a plurality of keys for one sector. These forms are described later.

Referring back to FIG. 7, the structure of the security header is further described below.

"Encryption Flag"
Indicates that each sector in the block is encrypted or non-encrypted. For example, "0" indicates a non-encrypted sector, and "1" indicates an encrypted sector. In this embodiment, one block consists of 32 sectors.

"ICV Flags"
Each indicate that an ICV is added or not added to each sector in the block. The number of ICV Flags corresponds to the number of (32) sectors in a block. For example, "0" indicates the no ICV is added, and "1" indicates that an ICV is added.

"Kc_Encrypted 0–31 (encrypted content key)"
Storage areas (32 areas) for encrypted content keys.

"Kicv_cont_encrypted (encrypted ICV generating key)"
Storage area for a key for generating an ICV for encrypted content.

"Valid Revocation List version"
Version of a revocation list which is properly applied to content playback.
In a case in which the version of a set revocation list in content playback is older than this version, playback is not allowed. "0" is set for content which does not need to refer to a revocation list, such as playback of self-stored data.

"ICV of Security Header"
ICV of a security header.

Revocation List

Next, with reference to FIG. 9, the structure of the revocation list as revoked information on inappropriate media and contents is described below. Data types constituting the structure are as follows:

"Revocation List ID"
Identifier unique to a revocation list.

"Revocation List Version"
Indicates the version of a revocation list. A revocation list is updated. In the updating, revoked information on new inappropriate media and contents are added.

In the present invention, version information is set in a revocation list, and in the header of content, the version information of an valid revocation list is set. When the content is read, the version of the present revocation list stored in the device is compared with the version of the valid revocation list in the header of the content. When the version of the present version of the revocation list is older, the reading of the content is stopped. Unless the revocation list is updated, the content cannot be read.

In addition, only in a case in which, by comparing the version information of the present revocation list with the version information of an update revocation list, the memory I/F unit 300 has determined that the version of the update revocation list is newer, the updating of the revocation list is allowed.

Version comparison processing using version information, and specific updating are described later using flowcharts.

"Number of Media1 IDs"
Indicates a total number of revoked identifiers (IDs) of media 1.

"Medial ID(0)" to "Media1 ID(L−1)"
Form a list of revoked identifiers (IDs) of media 1.

"Number of Media2 IDs"
Indicates a total number of revoked identifiers (IDs) of media 2.

"Media2 ID(0)" to "Media2 ID(M−1)"
Form a list of revoked identifiers (IDs) of media 2.

"Number of Content IDs"
Indicates a total number of revoked content identifiers (IDs).

"Content ID(0)" to "Content ID(N−1)"
Form a list of content identifiers (IDs).

"ICV of Revocation List"

Used for checking the revocation list for interpolation.

As described above, a revocation list in the present invention is constituted by IDs of a plurality of types (such as media and contents). By providing, in a revocation list as revocation information on media and content, a plurality of types of IDs to be revoked, that is, media IDs and content IDs, and performing comparison of the IDs as different operations, using a single revocation list can exclude a plurality of types of media and content. When the media is loaded, or content is read, the memory I/F unit 300 compares the ID of the media or content with each of IDs on the revocation list, whereby the use of inappropriate media or content can be prevented.

By employing a revocation list in which content and a plurality of IDs of media are set, the use of one revocation list can revoke (exclude) media and content of a plurality of types. Media verification processing based on a revocation list in a media-activated mode, and specific content verification processing in content processing are described later.

In the present invention, a revocation list is set in the memory I/F unit 300 which directly accesses the external memory or the like, and the set revocation list can be continuously used in the memory I/F unit 300 when the media is loaded or content is played back, whereby efficient processing can be performed without performing processing such as repeated reading of the revocation list from the internal memory at the time the content is used.

Block Permission Table (BPT)

Next, the structure of a BPT for use as an access permission table is described below.

In a conventional case in which content is played back by a personal computer, a file system in the operating system of the personal computer independently reads and manages an access information table (e.g., a FAT) stored in recording media, so that the file system can freely rewrite the content of the access information table. Accordingly, even if recording media is used which stores a write-protected access information table, data in the recording media is likely to be rewritten such that the access information table is read and rewritten by the file system.

A BPT employed in a data processing device according to the present invention is a media's access information table which is stored in a block in which rewriting by device is inhibited. When the device uses BPT-stored media to execute data processing such as writing of content data, memory accessing in accordance with permission information set in the BPT as a media's access information table is performed by setting the BPT in the memory I/F unit of a device which directly accesses the media, even if the control unit of the device executes any program.

Figure 10:
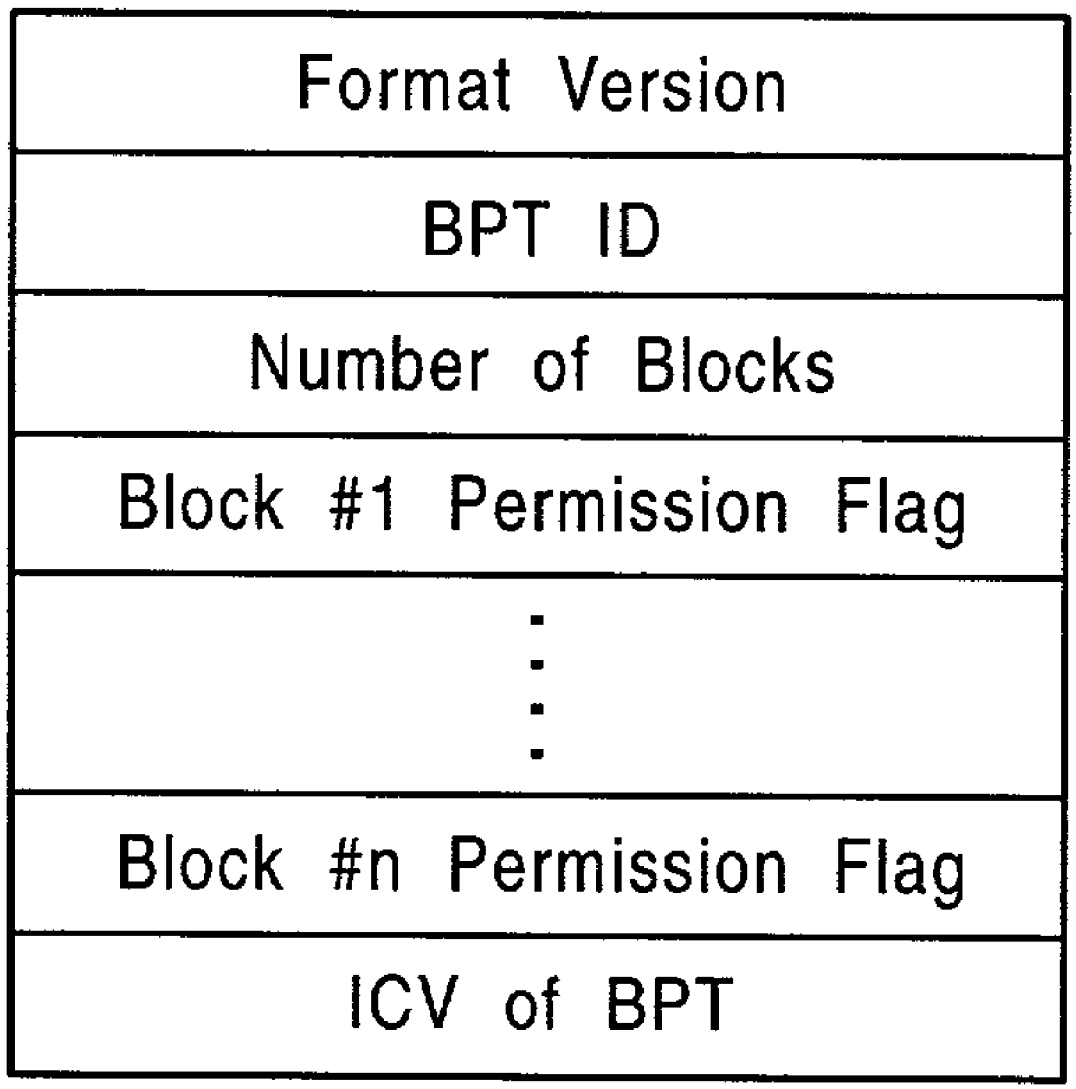
FIG. 10 is an illustration of a block permission table for use in a data processing device of the present invention.

The structure of the BPT is shown in FIG. 10. Data types constituting the BPT are as follows:

"Format Version"

Indicates the format version of the BPT. Used as data for identifying one of various formats for the BPT.

"BPT ID"

ID of the BPT.

"Number of Blocks"

Indicates a total number of blocks which are treated in the BPT. As described above, in the flash memory, erasure is performed in units of blocks. Accordingly, the Number of Blocks indicates the number of blocks which are managed by the BPT.

"Block #1 Permission Flag" to "Block #n Permission Flag"

Indicate the access limitation flags of blocks #1 to #n. For example, each flag having "0" indicates a block which cannot be erased, and each flag having "1" indicates a block which may be erased.

"ICV of BPT"

ICV for checking the BPT for interpolation.

After identifying media, the file system of the device reads the BPT from the media, which is, for example, a memory card having a built-in flash memory, transfers the BPT to the memory I/F unit which directly accesses the media, and controls the memory I/F unit to manage the BPT as an access permission table for the media. The memory I/F unit receives the access permission table and sets the BPT, for example, in the memory unit 321 in FIG. 4. When receiving a command to access the memory of the media, the memory I/F unit executes only the accessing based on the access permission table of the media.

The BPT has settings about, for example, a processing form which is permitted in each block unit of the flash memory of the media, specifically, a block that can be erased, a block that cannot be erased, a block that can be played back, and a block that cannot be played back. The memory I/F unit determines, in accordance with the settings of the BPT, whether processing should be performed. Details of the processing are described later.

In the BPT, an ICV for preventing interpolation is set. When the BPT is set in the memory I/F unit, ICV checking is performed. If interpolation is found, the setting of the BPT is not performed. Accordingly, this prevents an unauthorized access permission table from being created and used. An ICV for the BPT is generated based on a media ID. Thus, if an access permission table is copied from a type of media to another type of media, the copied access permission table cannot be used. The generation of the ICV is described later.

After a BPT is written in a predetermined block in the memory (e.g., a flash memory) of each of media when they are produced, the media are shipped. In the writing of the BPT, setting on inhibition of block erasure is described in the BPT in connection with the block in the memory in which the BPT is stored. A device of the present invention performs a media-stored-data erasure process in which, after accessing the BPT and referring to settings in the BPT on whether or not each block may be erased, only each block that may be erased is erased. Thus, in media in which each BPT-stored block is set so as not to be erased, erasure and rewriting of the BPT is prevented. File writing and playback processing using each BPT in media are described later.

Referring to the flowcharts in FIGS. 11 and 12, the setting of a BPT in each type of media (recording media including a flash memory) when it is produced is described below. Here, it is assumed that the generation of a media ID and the writing of the BPT be successively performed by a media creator capable of performing command communication with the media.

Figure 11:
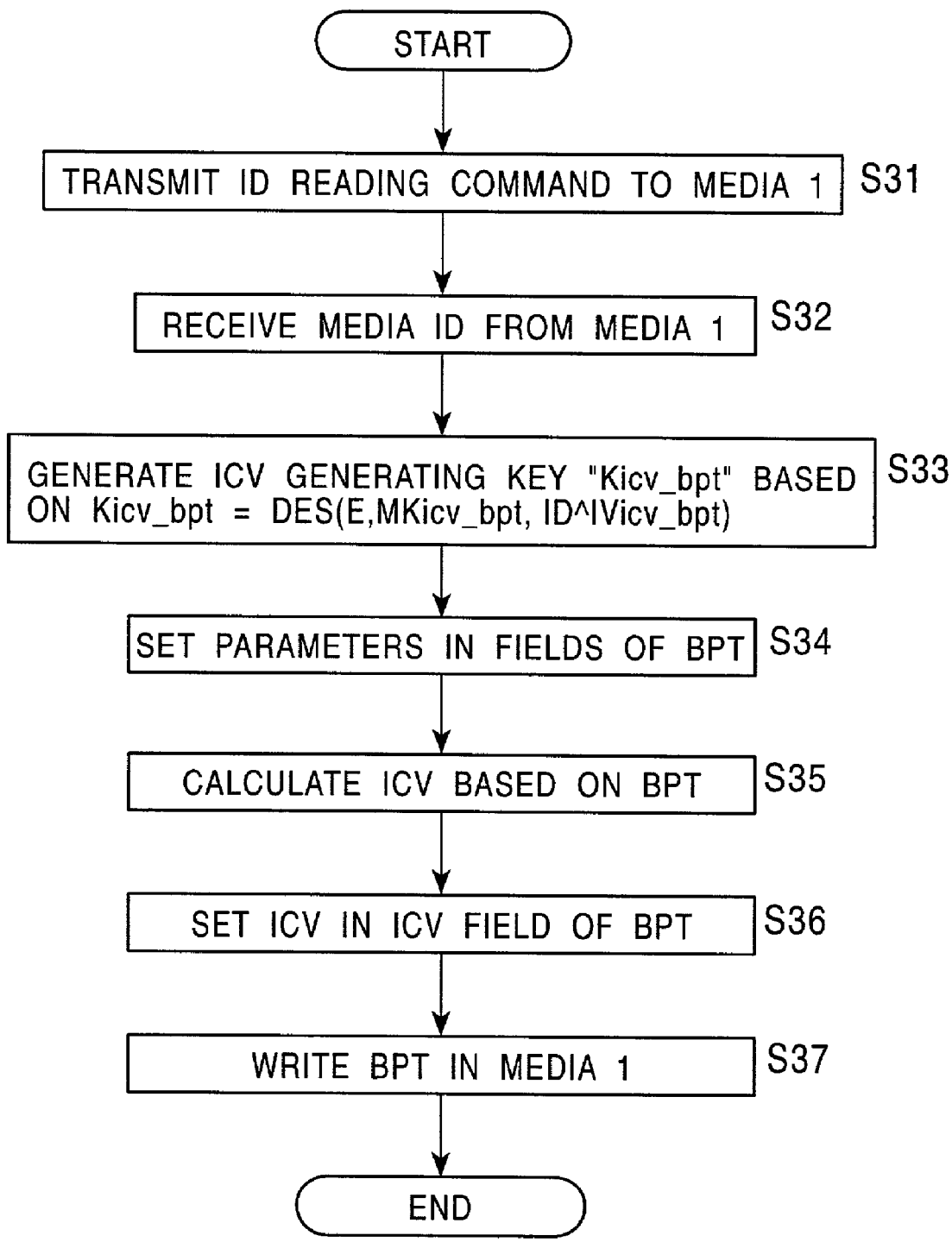
FIG. 11 is a flowchart showing a process in which a media creator sets a block permission table in media 1 having no mutual authentication processing function.

FIG. 11 is a flowchart showing a process in which a media creator sets a BPT in media 1 having no mutual authentication processing function. Steps constituting the process are described below.

In step S31, the media creator sends an ID reading command to media 1 which has not been initialized yet. In step S32, the media creator receives an ID which has already been stored in media 1. In step S33, the media creator generates an ICV generating key "Kicv_bpt" on the basis of the received ID. The ICV generating key "Kicv_bpt" is generated based on a master key "MKicv_bpt", an initial value "IVicv_bpt", and a BPT ID. Specifically, the generation is performed based on the ICV generating key "Kicv_bpt"=DES(E, MKicv_bpt, ID^IVicv_bpt). This expression indicates the execution of DES-mode encryption processing on the exclusive OR value of the ID of the BPT and the initial value "IVicv_bpt".

In step S34, the media creator sets necessary parameters in the fields of the BPT. In step S35, the media creator generates an ICV based on the BPT in which the parameters are set (by applying the construction shown in FIG. 14 which is described later). In step S36, the media creator sets the generated ICV in an ICV field in the BPT. In step S37, the media creator writes the formed BPT in media 1. As described above, a block of the BPT in which writing is performed is set as an erasure-prevented area of the BPT.

Figure 12:
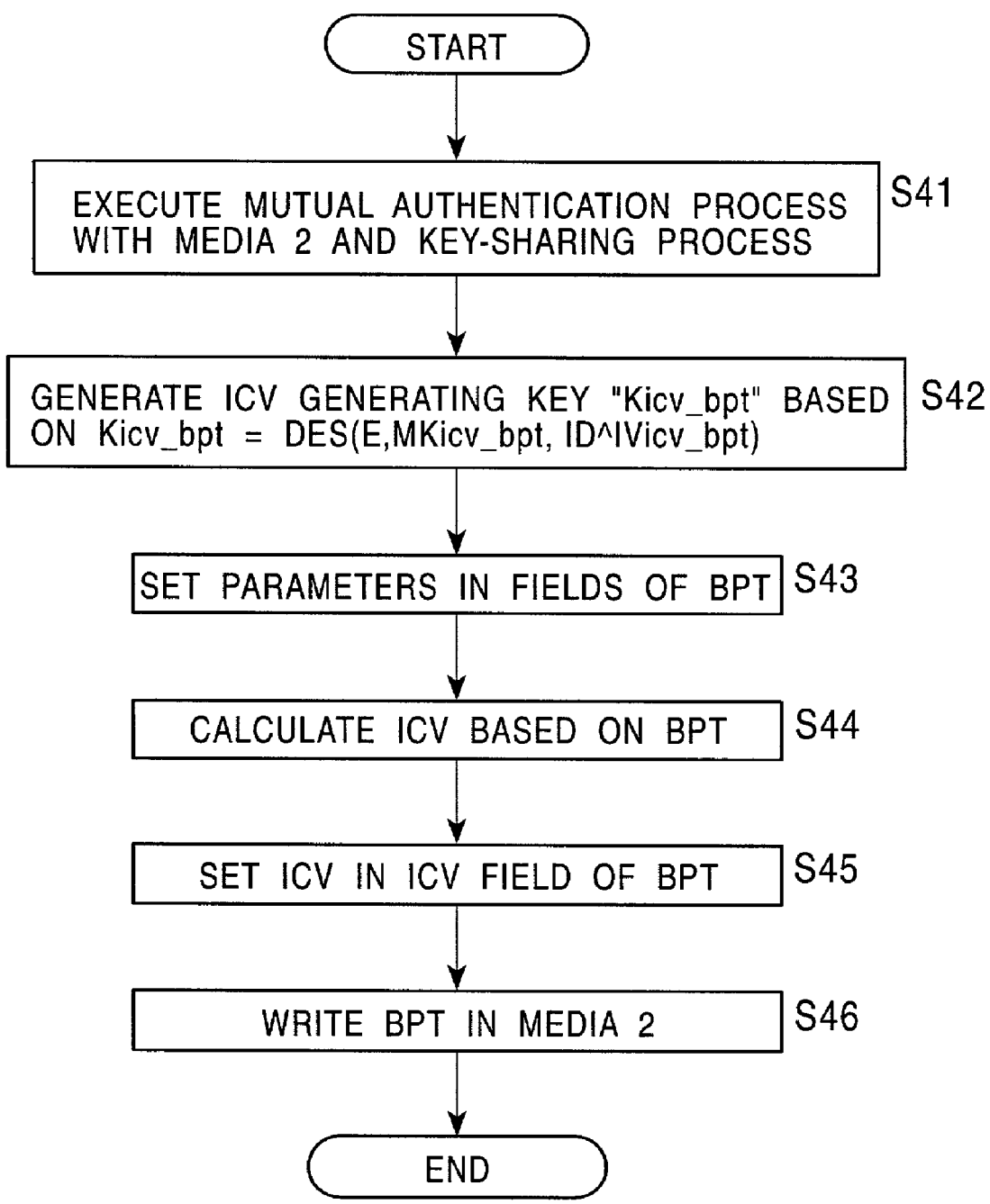
FIG. 12 is flowchart showing a process in which a media creator sets a block permission table in media 2 having mutual authentication processing function.

FIG. 12 is a flowchart showing a process in which a media creator sets a BPT in media 2 having mutual authentication processing function. Steps constituting the process are described below.

In step S41, the media creator executes mutual authentication with media 2 which has not been initialized yet and a session-key sharing process (concerning these processes, see the process shown in FIG. 22 which is described later). After the mutual authentication and sharing processes end, the media creator sends an ID reading command to media 2. In step S42, the media creator receives an ID from media 2 and generates an ICV generating key "Kicv$_{13}$ bpt" on the basis of the received ID. The ICV generating key "Kicv_bpt" is generated based on a master key "MKicv_bpt", an initial value "IVicv_bpt", and a BPT ID. Specifically, the generation is performed based on the ICV generating key "Kicv_bpt"=DES(E, MKicv_bpt, ID^IVicv_bpt). This expression indicates the execution of DES-mode encryption processing with the master key "MKicv_bpt" on the exclusive OR value of the ID of the BPT and the initial value "IVicv_bpt".

In step S43, the media creator sets necessary parameters in the fields of the BPT. In step S44, the media creator generates an ICV based on the BPT in which the parameters are set (by applying the construction shown in FIG. 14 which is described later). In step S45, the media creator sets the generated ICV in an ICV field in the BPT. In step S46, the media creator writes the formed BPT in media 2. As described above, a block of the BPT in which writing is performed is set as an erasure-prevented area of the BPT.

Figure 13:
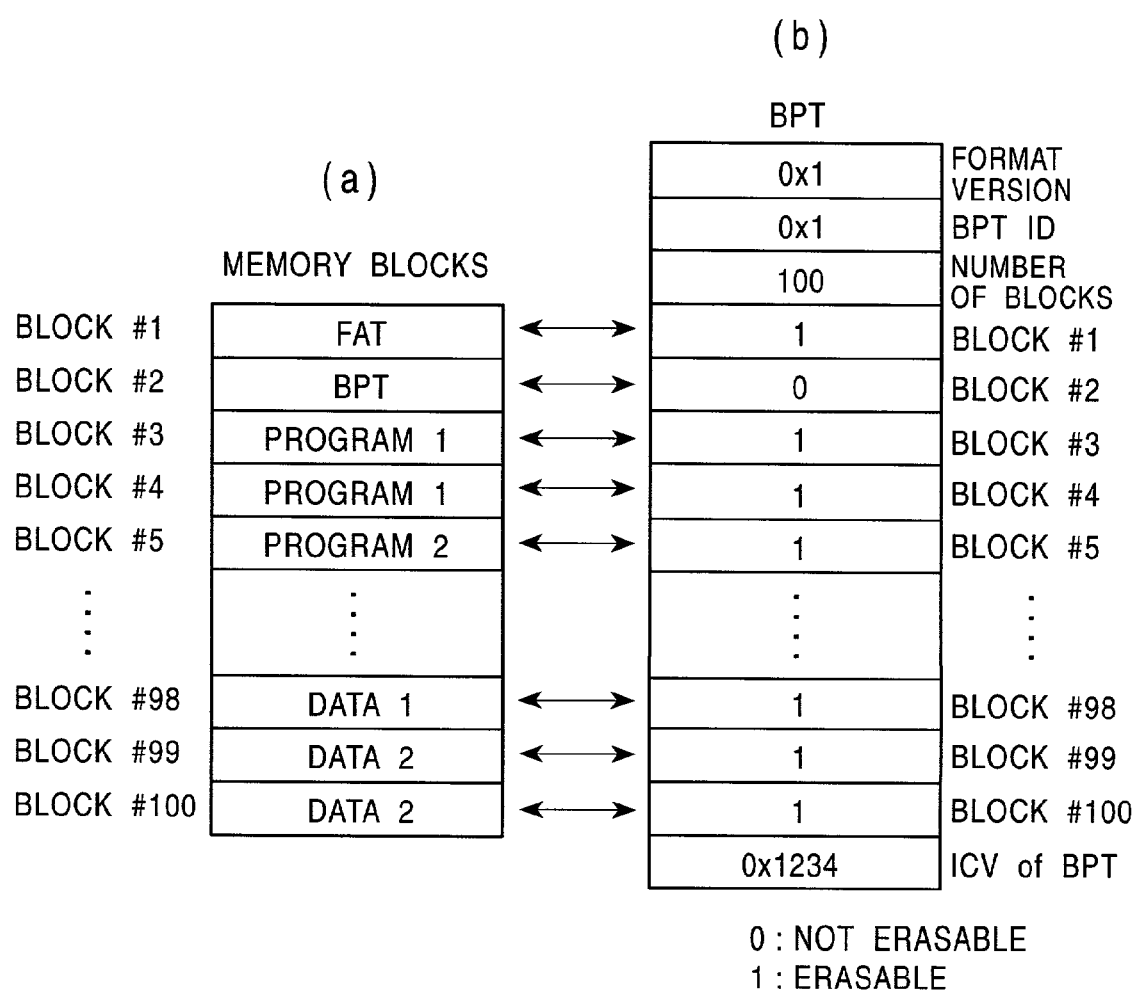
FIG. 13 is a drawing showing a specific example of a block permission table in a data processing device of the present invention.

FIG. 13 shows a specific example of the BPT. The part (a) of FIG. 13 shows the structure of blocks in the flash memory of each of media 1 and media 2. The part (b) of FIG. 13 shows the BPT. The BPT contains "Format Version", "BPT ID", "Number of Blocks", "Block #1" to "Block #100" in each of which "1" indicating an erasable block or "0" indicating an erasure-prevented block is set, and "ICV of BPT". A BPT-stored block (e.g., Block #2 in FIG. 13) of the flash memory is set as an erasure-prevented area of the BPT, and prevents erasure by the device 200, whereby the rewriting of the BPT is not executed.

Although settings in the example of the BPT shown in FIG. 13 are limited to each erasable block (1) or erasure-prevented block (0), access permission related to only erasure processing is not set, but permission or inhibition of reading (playback) may be set. For example, each block can be set as one of a playback-prevented and erasure-prevented block (11), a playable and erasure-prevented block (10), a playback-prevented and erasable block (01), and a playable and erasable block (00).

Because media 2 in FIG. 2 includes the control unit 231, it can hold status information on whether or not the BPT has already been set. Accordingly, even if a new BPT-writing command is sent from the device 200 when the BPT is set in media 2, by controlling media 2 so as not to receive the command, media 2 may prevent the rewriting of the BPT.

The writing of the BPT in the above example has been described using the case of using a media creator capable of performing command communication with each type of media. In addition, the BPT may be written in the media by directly writing a BPT which is created by a simple memory writer. Also in this case, a BPT-stored block in the flash memory is set as an erasure-prevented area in the BPT.

Integrity Check Using ICV

Next, ICV-used data-integrity-check processing is describe below.

In the present invention, ICVs are added to content, a BPT, a revocation list, etc., which are stored in a memory unit, and are applied to data-integrity-check processing for each stored item. Content-related ICVs can be added in units of sector data. A specific form of ICV processing using the ICVs added to the content, the BPT, the revocation list, etc., is described later.

Figure 14:
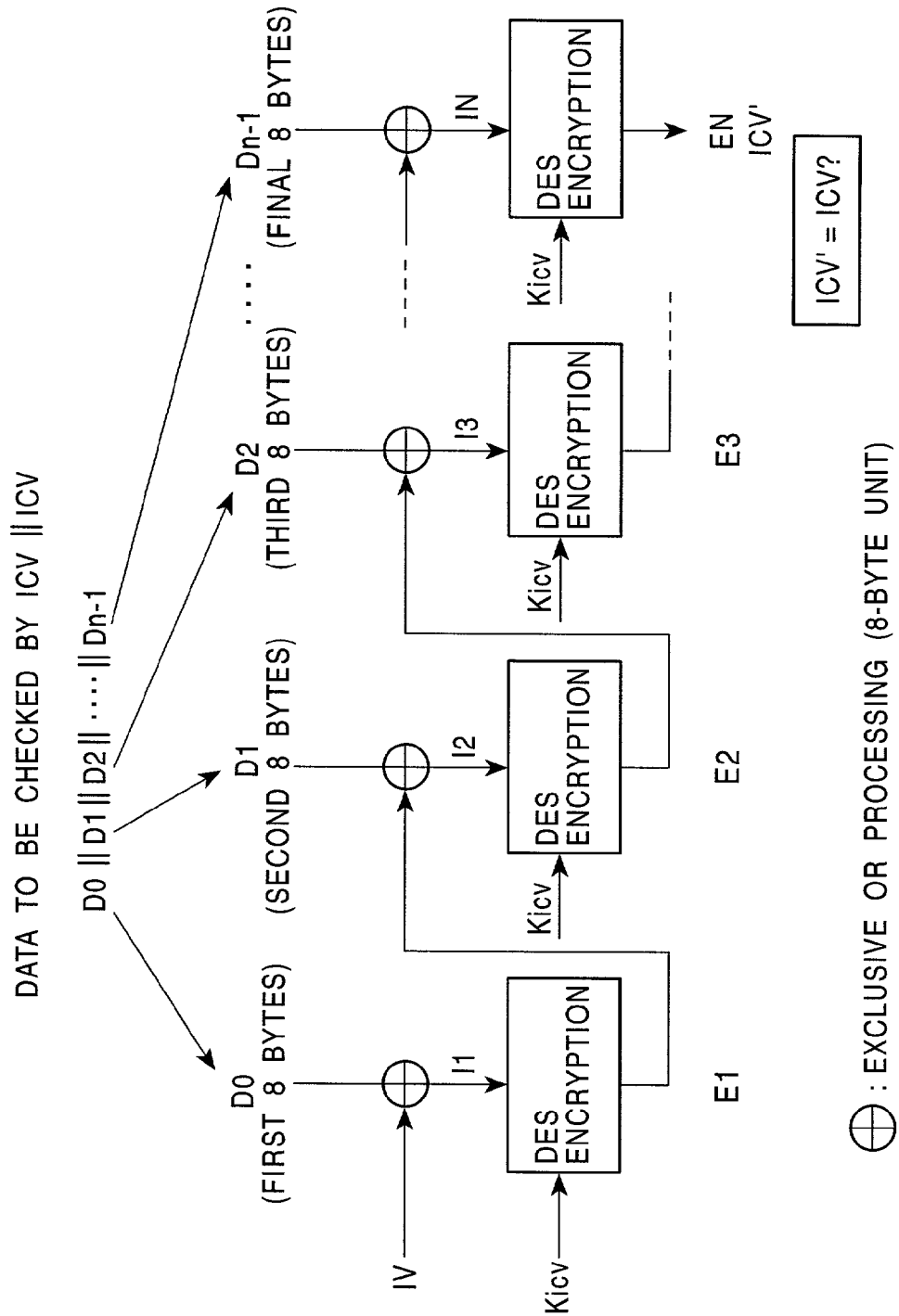
FIG. 14 is a drawing showing an example of the generation of an ICV by using DES cryptosystem processing.

FIG. 14 shows an example of the generation of an ICV by using DES cryptosystem processing. As shown in FIG. 14, a message that forms data to be treated by integrity checking is divided in 8-byte units. The divided message parts are hereinafter referred to as "D0", "D1", "D2", . . . , "Dn−1". The data to be treated by integrity checking is, for example, content itself, data constituting the BPT as the above access permission table, or data constituting a revocation list.

First, an initial value (IV) and D0 are exclusive ORed. The result is represented by "I1". Second, I1 is input to a DES encryption unit and is encrypted by using ICV generating key "Kicv". The output is represented by "E1". Next, E1 and D1 are exclusive ORed, and the output "I2" is input to a DES encryption unit and is encrypted by using an ICV generating key "Kicv". The output is represented by "E2". After that, by repeatedly performing this operation, all the divided message parts are encrypted. A finally output value is represented by a content check value "ICV'".

When in the comparison between an ICV which is guaranteed to be free of interpolation, for example, a correct ICV which is generated when generating content, and an ICV' generated based on new content, identity of both is proved, that is, ICV'=ICV, an input message, for example, a content, a BPT, or a revocation list, is guaranteed to be free of interpolation. If ICV'≠ICV, it is determined that interpolation has occurred.

Figure 15:
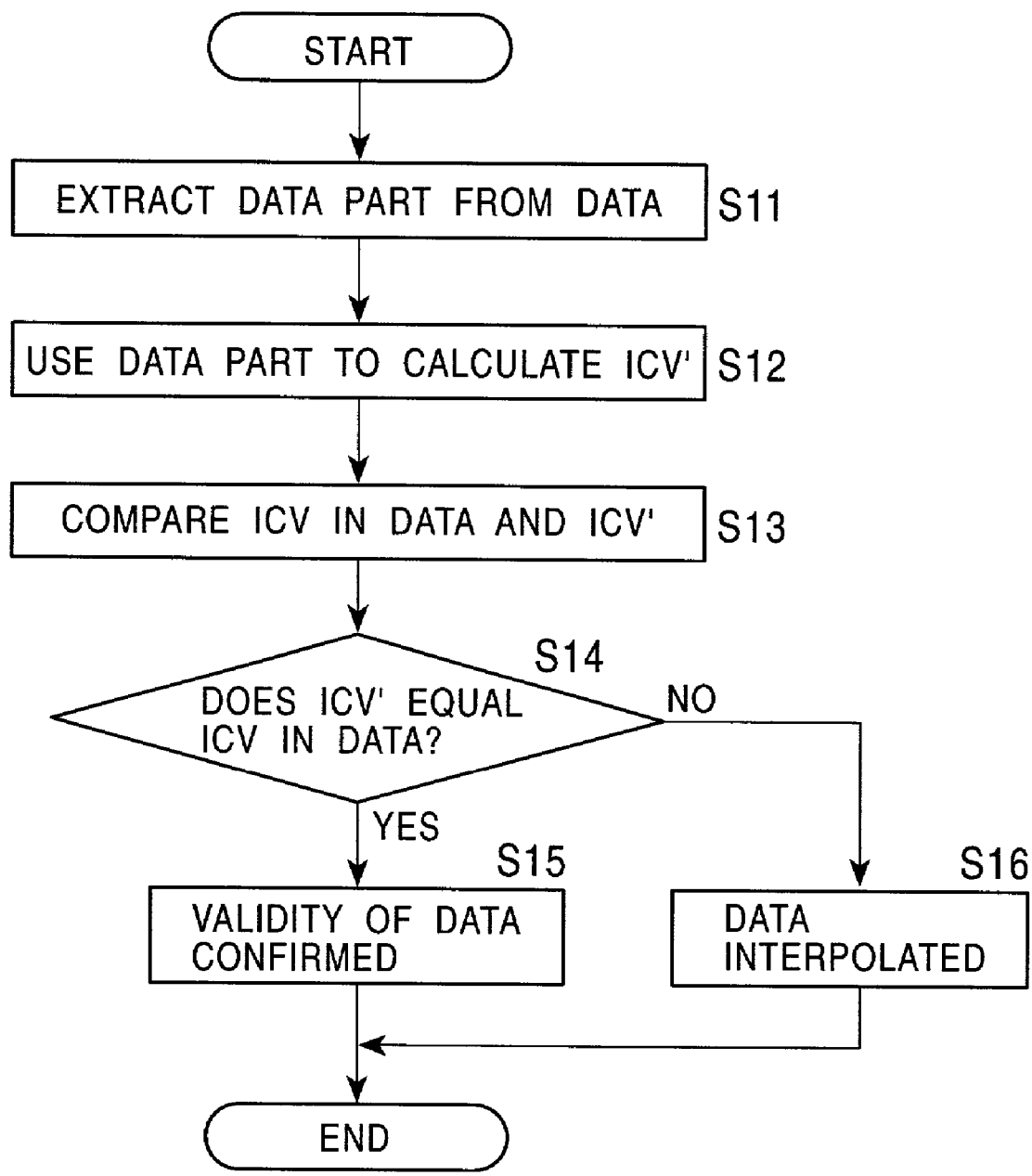
FIG. 15 is a flowchart showing a data-integrity-check process using an ICV in a data processing device of the present invention.

A flowchart of a data-integrity-check process using an ICV is shown in FIG. 15. In step S11, data to be treated by integrity checking is extracted. In step S12, based on the extracted data, a content check value "ICV'" is calculated by the DES cryptosystem construction shown in FIG. 14. In step S13, the calculated content check value "ICV'" is compared with an ICV stored in the data. If both values are equal to each other, the process determines that the data is free of interpolation and is correct (steps S14 to S15). If both values are not equal, the process determines that the data has been interpolated (steps S14 to S16).

An ICV generating key "Kicv_rl" for revocation list integrity checking is generated based on a master key "MKicv_rl" for generating a revocation-list ICV key, an initial value "IVicv_rl" at the time the revocation-list ICV key is generated, and a revocation list version (represented by "Version") included in the attribute information of the revocation list, which are stored in the memory unit 321 (shown in FIG. 4) of the memory I/F unit 300 in the device 200. Specifically, the ICV generating key "Kicv_rl" for revocation list integrity checking is generated based on the ICV generating key "Kicv_rl"=DES(E, MKicv_rl, Version^IVicv_rl). This expression indicates that the exclusive OR value of "Version" and the initial value "IVicv_rl" is encrypted in the DES mode by using the master key "MKicv_rl". Revocation-list ICV checking is executed by the ICV generating process shown in FIG. 15, using an initial value "IVrl" (stored in the memory unit 321) after applying the above generated ICV generating key "Kicv_rl".

The ICV generating key "Kicv_bpt" for BPT integrity checking is generated based on the master key "MKicv_bpt" for generating a BPT ICV key, the initial value "IVicv_bpt" at the time the BPT ICV key is generated, and a BPT ID included in the attribute information of the BPT, which are beforehand stored in the memory unit 321 (shown in FIG. 4) of the memory I/F unit 300 in the device 200. Specifically, the CV generating key "Kicv_bpt" for BPT integrity checking is generated based on the ICV generating key "Kicv_bpt"=DES(E, MKicv_bpt, ID^IVicv_bpt). This expression indicates that the exclusive OR value of the BPT ID and the initial value "IVicv_bpt" is encrypted in the DES mode by using master key "MKicv_bpt". BPT ICV checking is executed by the ICV generating process shown in FIG. 15, using the initial value "IVbpt" (stored in the memory unit 321) after applying the above generated ICV generating key "Kicv_bpt". The ICV which is stored as additional information of the BPT is generated based on data in the BPT and data including the ID of media in which the BPT is stored. Therefore, the BPT ICV checking functions both to determine whether data in the BPT has been interpolated and to prove a correct media-unique BPT, that is, a BPT which is not copied to another type of media.

An ICV generating key "Kicv_cont" for sector-unit content integrity checking is encrypted and stored in the header (security header) of content. This key is acquired in the cryptosystem unit 320 (shown in FIG. 4) of the memory I/F unit 300, as required, and is acquired by decryption processing which is executed in accordance with the DES-CBC mode by the media-2 controller 231 after mutual authentication with media 2 is performed. These processes are described later with reference to flowcharts.

When the result of the above data integrity checking indicates, for example, interpolation of a revocation list, processes are inhibited, such as content playback based on the process of referring to the revocation list. Also, when it is determined that interpolation is found in a BPT as an access permission table, a process is executed which uses the BPT to inhibit data in media from being accessed. These processes are described later.

Data Reading Processing and Data Writing Processing

In the present invention, processing in which a device reads data and processing in which the device stores data on the media are described below.

Processes Performed when Activating the Device

Figure 16:
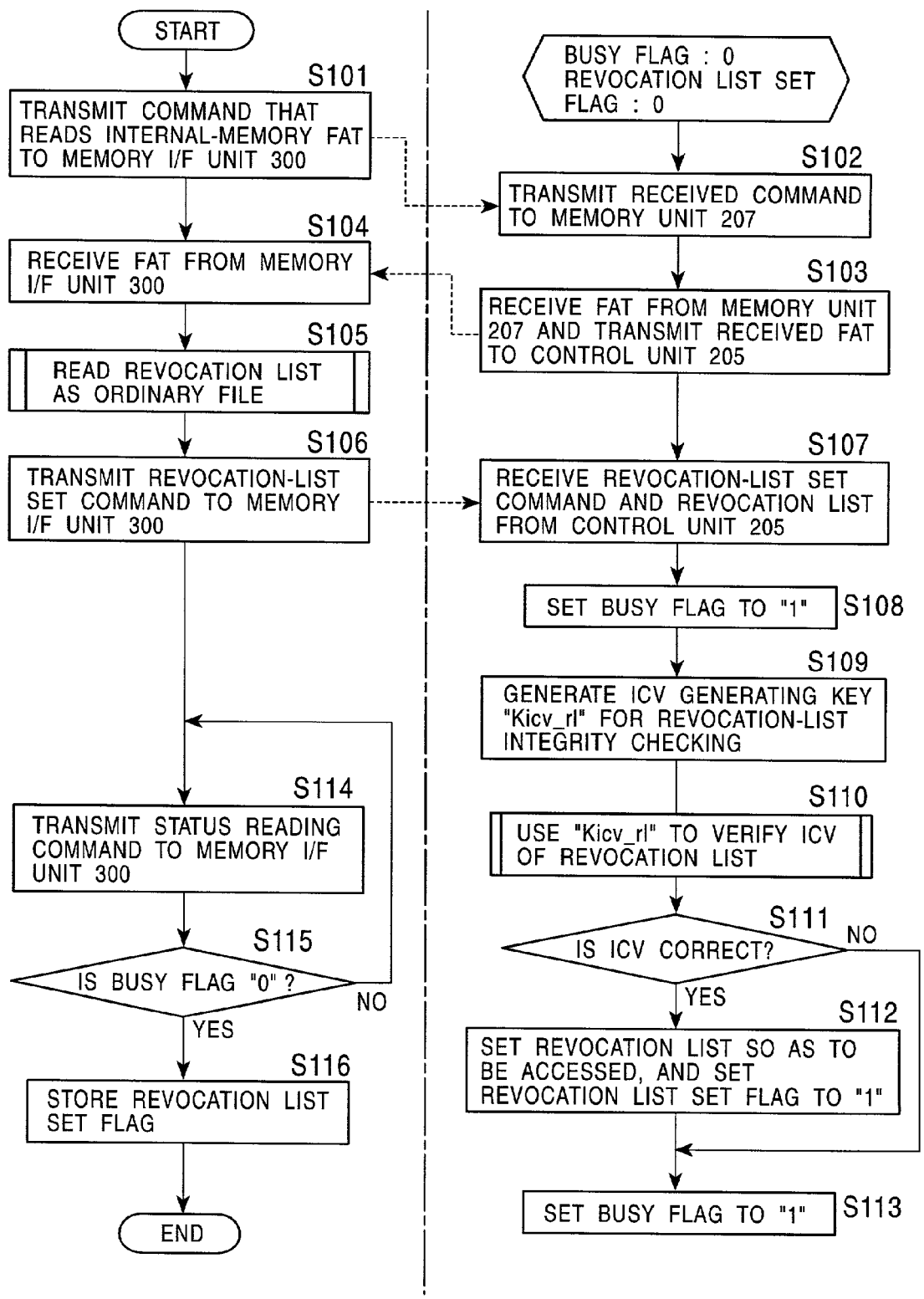
FIG. 16 consists of flowcharts showing processing performed when a data processing device of the present invention is activated.

Processes performed when activating the device 200 (FIG. 2) are described. The left part of FIG. 16 shows a process of the control unit 205 in the device 200, and the right part of FIG. 16 shows a process of the memory I/F unit 300 in the device 200. In the status register 301 of the memory I/F unit 300 at the time the process starts, the busy flag is "0" (ready), and the revocation list set flag is "0" (not set).

In step S101, when the device 200 is activated, the control unit 205 transmits a command that reads an internal-memory FAT to the memory I/F unit 300. In step S102, the memory I/F unit 300 transmits the command to the memory unit 207.

In step S103, the memory I/F unit 300 receives a FAT from the memory I/F unit 207, and transmits the table to the control unit 205.

The FAT is a table for managing, by a directory, data stored in device-accessible internal and external memories, for example, various types of data files such as various contents and a revocation list. In the FAT, directory representations, file names, and storage sectors are correlated mutually, as shown in FIG. 17. Based on the FAT, the device 200 accesses various files.

When the control unit 205 receives a FAT corresponding to data stored in the internal memory (step S104), it reads a revocation list based on the file allocation list (step S105), and transmits a revocation-list set command and the revocation list to the memory I/F unit 300 (step S106). The setting of the revocation list is executed only in a case in which the revocation list is valid. After the revocation list is set, comparing with contents or media IDs recorded in the revocation list is executed in content processing such as the reading of content from media. These processes are described later.

When the memory I/F unit 300 receives the revocation-list set command and the revocation list from the control unit 205 (step S107), it sets "1" in the busy flag of the status register 301 (step S108), and generates ICV generating key "Kicv_rl" for revocation-list integrity checking (step S109).

ICV generating key "Kicv_rl" for revocation-list integrity checking is generated based on master key "MKicv_rl" for generating an ICV key of a revocation list which is beforehand stored in the device 200, initial value "IVicv_rl" at the time the revocation-list ICV key is generated, and a revocation list version (represented by "Version") included in the attribute information of the revocation list. Specifically, ICV generating key "Kicv_rl" for revocation-list integrity checking is generated based on ICV generating key "IVicv_rl"=DES(E, MKicv_rl, Version^IVicv_rl). This expression indicates that the exclusive OR value of "Version" and initial value "IVicv_rl" is encrypted in the DES mode by using master key "MKicv_rl".

In step S110, after generating the ICV' of the revocation list by using the generated ICV generating key "Kicv_rl", the memory I/F unit 300 executes verification (ICV'=ICV?) by comparing with the correct ICV which is beforehand stored in the revocation list. The processing of generating the ICV' is performed based on the DES mode described using FIG. 14 by executing a process to which the ICV generating key "Kicv_rl" generated based on initial value "IVrl" is applied.

When ICV'=ICV ("YES" in step S111), the memory I/F unit 300 determines that the revocation list is free from interpolation and is correct. The revocation list is set so that it can be accessed in processing such as content reading, and the revocation list set flag is set to "1" (step S112). The revocation list is stored in a memory (e.g., the memory unit 321 in FIG. 4) of the memory I/F unit 300. For example, when the transmitting/receiving control unit 306 receives a media-identification command from the control unit 205 (shown in FIG. 2), a media ID of the set revocation list is collated with the media ID of media which is loaded into the device 200. Also, when the transmitting/receiving control unit 306 receives a header set command which accompanies the content reading processing, a content ID of the set revocation list is collated with the content ID of content to be read.

As described above, the revocation list is set in the memory I/F unit 300, which directly accesses the external memory or the like. After the revocation list is set, it is controlled so that it can be continuously used when the media is loaded or content is played back. This eliminates the need for performing processing such as repeated reading from the internal memory during the use of contents, so that efficient processing can be executed.

Referring again to FIG. 16, when ICV'≠ICV ("NO" in step S111), the memory I/F unit 300 determines that the revocation list has interpolation, and content processing based on the process of referring to the revocation list is inhibited and terminated. The termination of the processing sets "0" in the busy flag.

In step S114, the control unit 205 transmits a status reading command to the memory I/F unit 300. In step S115, the control unit 205 determines whether the busy flag represents "0". If the determination is affirmative, in step S116, the revocation list set flag is stored. If it is determined that interpolation is not found in the revocation list, the revocation list set flag is "1" which indicates the valid setting of the revocation list. In the other case, the revocation list set flag is "0".

Media-Identification-Mode Processing

Next, processing which is executed when identifying media, such as media-validity confirmation performed when media is loaded into the device 200, is described below.

As described above, media types include media 1 that does not execute mutual authentication with a device, and media 2 that execute mutual authentication with a device. When each type of device is loaded into a device, the device executes processing that determines whether to execute media-used content processing, specifically, processing that confirms that the loaded media is not recorded as inappropriate media in the revocation list. On condition that the loaded media is not recorded in the revocation list and is identified as properly usable media, a BPT as an access permission table stored in the loaded media is set in the memory I/F unit 300, and processing that performs memory accessing referring to the BPT is executed.

Figure 18:
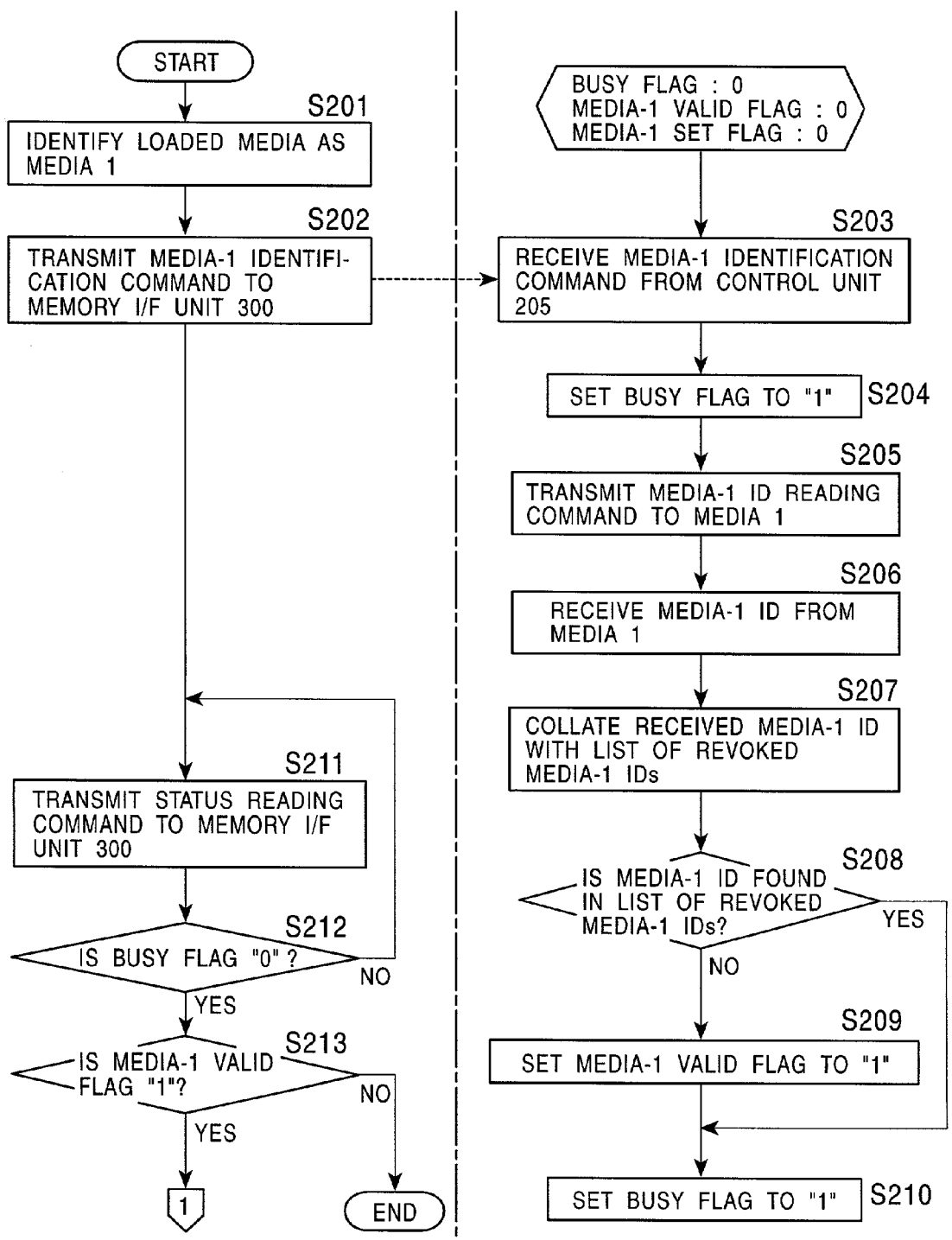
FIG. 18 consists of first flowcharts showing media-1 identification processing by a data processing device of the present invention.
Figure 19:
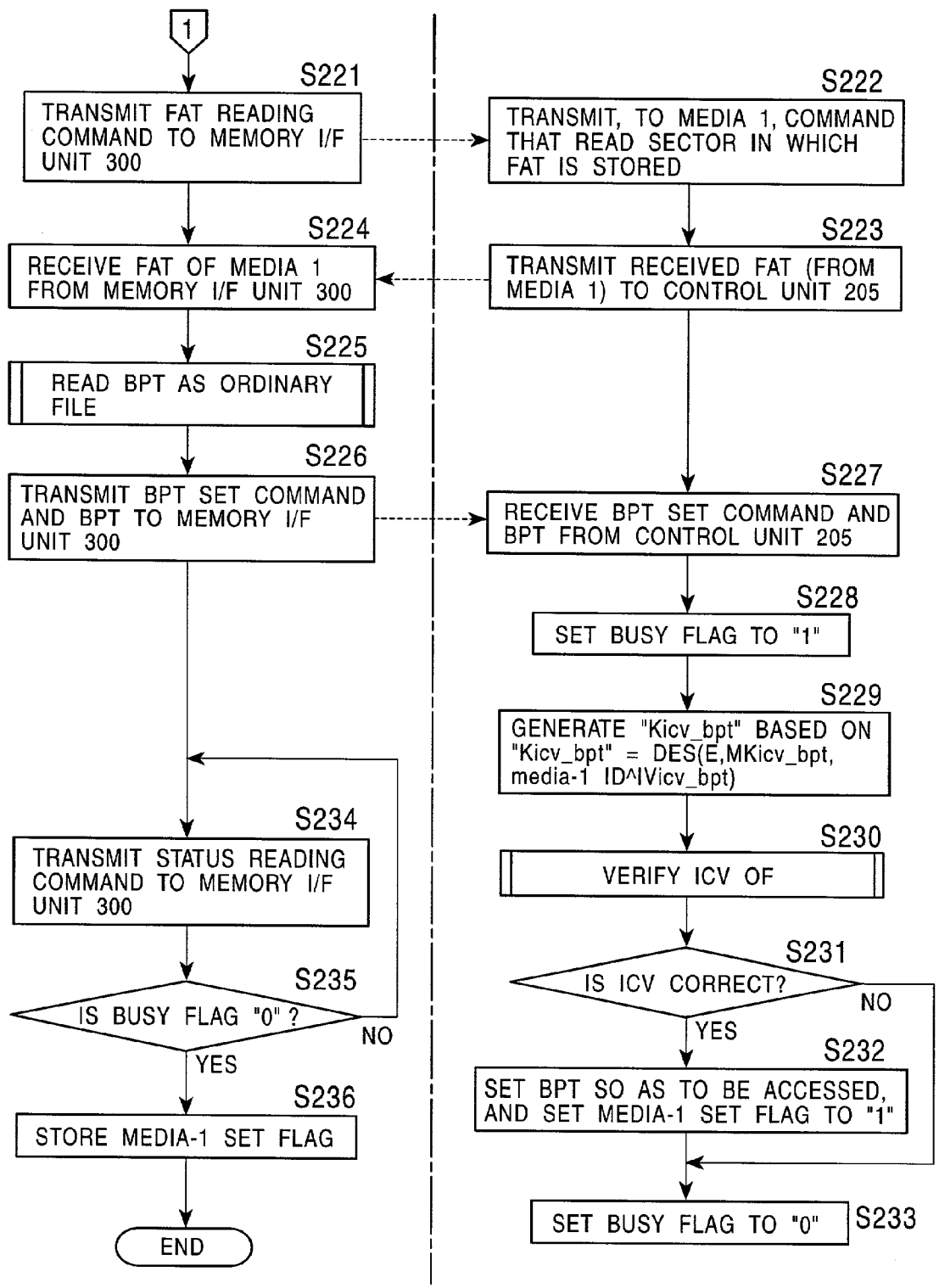
FIG. 19 consists of second flowcharts showing media-1 identification processing by a data processing device of the present invention.

With reference to FIGS. 18 and 19, media identification processing performed when media 1 is loaded is described below.

The left parts of FIGS. 18 and 19 show a process of the device 200 shown in FIG. 2, and the right parts of FIGS. 18 and 19 show a process of the memory I/F unit 300. When the media identification processing starts, in the status register 301 of the memory I/F unit 300, the busy flag is "0" (ready), the media-1 valid flag is "0" (Not OK), and the media-1 set flag is "0" (not set).

In step S201, the control unit 201 identifies the loaded media as media 1. The media identification is performed based on mechanical information based on a preset media shape or communication information between the device 200 and the media. In step S202, when identifying the loaded media as media 1, the control unit 205 transmits a media-1 identification command to the memory I/F unit 300.

When receiving the media-1 identification command (step S203), the memory I/F unit 300 sets the busy flag in the status register 301 to "1" (busy) (step S204). In step S205, the memory I/F unit 300 transmits a media-1 ID reading command to media 1. In step S206, the memory I/F unit 300 receives a media-1 ID. In step S207, the memory I/F unit 300 executes collation of the received media-1 ID with a list of revoked media 1 in the already set revocation list. As described above using FIG. 16, the revocation list is set in the memory I/F unit 300 when the device 200 is initiated.

After the revocation list is set, it is controlled so that it can be continuously used in the memory I/F unit 300 when media 1 is loaded or content is played back.

When an ID that matches the received media-1 ID is not found in the revocation list, the memory I/F unit 300 regards the loaded media 1 as media to be revoked and determines that it is properly usable media ("NO" in step S208). In step S209, the media-1 valid flag in the status register 301 is set to "1" (valid), and in step S210, the busy flag is set to "1" (ready). If an ID matching the received media-1 ID is found in the revocation list ("YES" in step S208), the memory I/F unit 300 regards the loaded media 1 as media to be revoked and determines that it cannot be properly used, so that, without executing the setting of the media-1 valid flag in step S209, the busy flag is set to "0" (ready) and the process is terminated.

In step S211, the control unit 205 transmits a status reading command to the memory I/F unit 300. After the control unit 205 confirms the busy flag is "0" (ready) ("YES" in step S212), only when the media-1 valid flag indicates effectiveness ("1") does the control unit 205 continues the process. When the media-1 valid flag indicates ineffectiveness ("0") ("NO" in step S213), the process of the control unit 205 ends.

Next, proceeding to FIG. 19, in step S221, the control unit 205 transmits a FAT reading command to the memory I/F unit 300. In step S222, a command that reads a sector in which the FAT is stored is transmitted from the memory I/F unit 300 to media 1. In step S223, the memory I/F unit receives the FAT from media 1, and in step S223, it transmits the FAT to the control unit 205.

When receiving the FAT corresponding to data stored in media 1 (step S224), the control unit 205 executes, based on the FAT, BPT-reading processing (step S225), and transmits a BPT set command and the BPT to the memory I/F unit 300 (step S226). Only when the BPT is valid does the memory I/F unit 300 execute the BPT set processing. After the BPT is set, the memory I/F unit 300 determines by referring to the BPT whether or not block-unit erasure can be performed during content processing such as content writing from media. Actual writing of data by referring to the BPT is described later.

After receiving the BPT set command and the BPT from the control unit 205 (step S227), the memory I/F unit 300 sets the status register 301 to "1" (busy) (step S228), and generates ICV generating key "Kicv_bpt" for BPT integrity checking (step S229).

ICV generating key "Kicv_bpt" for BPT integrity checking is generated based on master key "MKicv_bpt" for generating a BPT ICV key, which is beforehand stored in the device 205, initial value "IVicv_bpt" at the time the BPT ICV key is generated, and the media ID. Specifically, ICV generating key "Kicv_bpt" is generated based on ICV generating key "Kicv_bpt"=DES(E, MKicv_bpt, media-1 ID^IVicv_bpt). This expression indicates that the exclusive OR value of the media-1 ID and initial value "IVicv_bpt" is encrypted in the DES mode based on master key "MKicv_bpt".

Next, the memory I/F unit 300 uses the generated ICV generating key "Kicv_bpt" to generate an ICV' of the BPT, and executes processing (ICV'=ICV?) that collates the ICV' with a correct a correct ICV which is beforehand stored in the BPT (step S230). The generation of the ICV' is performed based on the DES mode described using FIG. 14 by performing processing to which the ICV generating key "Kicv_bpt" generated using initial value "IVbpt". The ICV stored as additional information to the BPT is generated based on data including the media ID. Accordingly, the ICV checking functions not only to verify whether data of the BPT has interpolation, but also to prove a correct media-unique BPT, that is, a BPT which is not copied to another type of media.

When ICV'=ICV ("YES" in step S231), the memory I/F unit 300 determines that the BPT is free from interpolation and is correct. In step S232, the BPT is set so that it can be accessed in content processing, etc., and the media-1 set flag is set to "1" (set). When ICV'≠ICV ("NO" in step S231), the memory I/F unit 300 determined that the BPT has interpolation, the content processing by referring to the BPT is inhibited and the process of the device 200 is terminated. The termination of the process sets the busy flag to "0" in step S233.

In step S234, the control unit 205 transmits a status reading command to the memory I/F unit 300. On condition that the busy flag is "0" ("YES" in step S235), the control unit 205 stores the media-1 set flag (step S236). When it is determined that the BPT does not have interpolation, the stored media-1 set flag is "1" which indicates that media 1 is properly set. In the other case, the stored media-1 set flag is "0".

Figure 20:
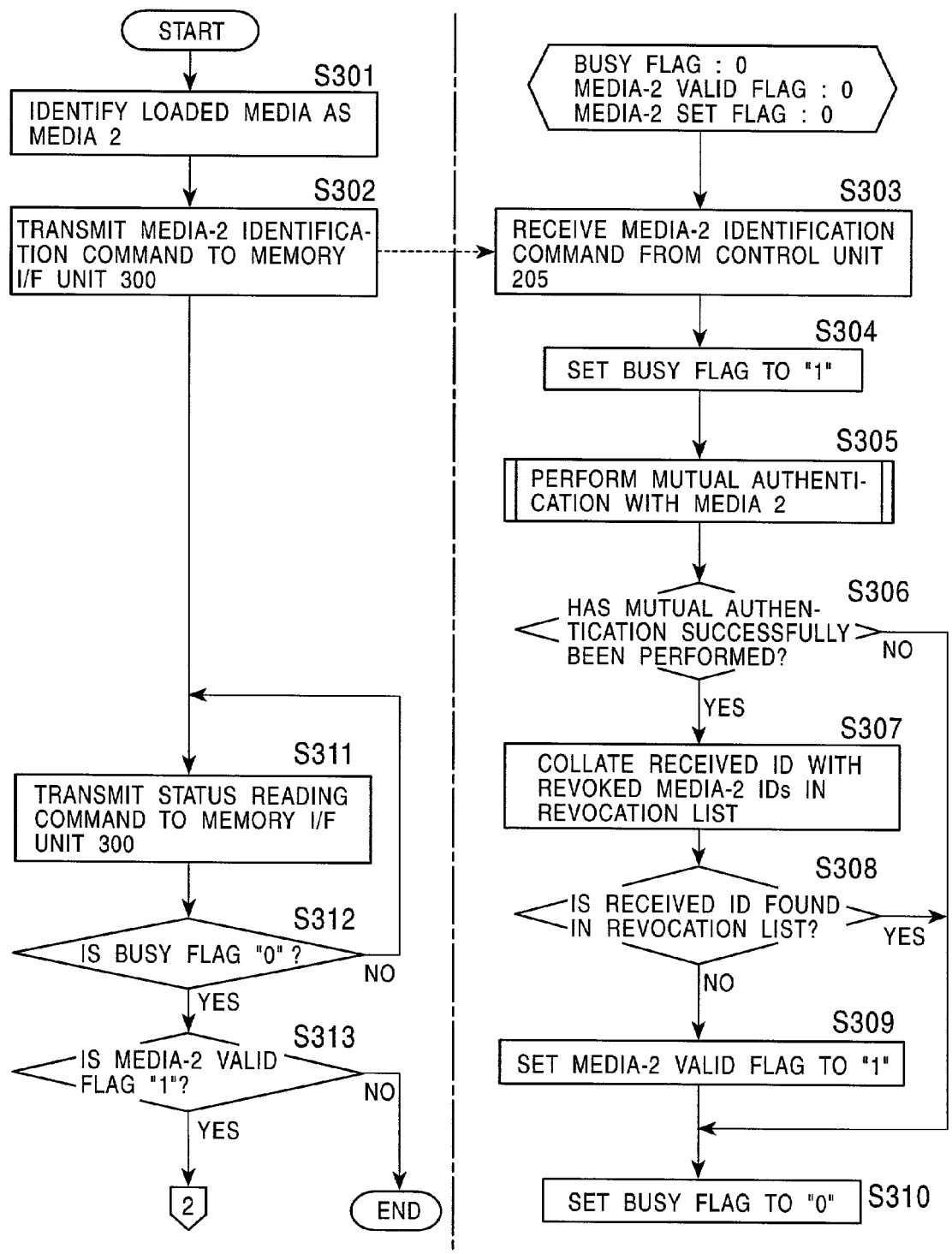
FIG. 20 consists of first flowcharts showing media-2 identification processing by a data processing device of the present invention.
Figure 21:
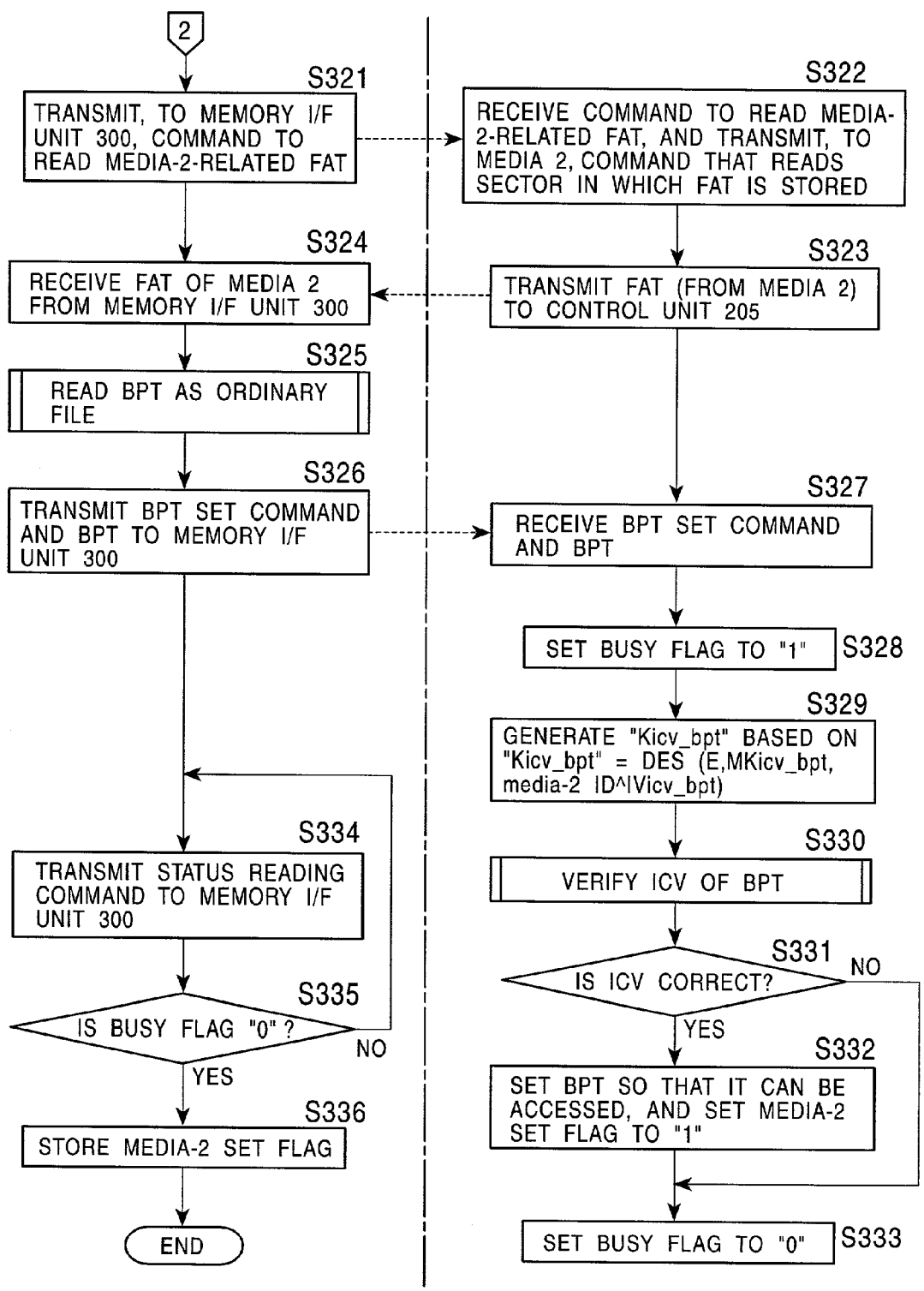
FIG. 21 consists of second flowcharts showing media-2 identification processing by a data processing device of the present invention.

With reference to FIGS. 20 and 21, processing is described below which identifies media 2 when it is loaded into the device 200. Media 2 is one that executes mutual authentication with the device 200, as described above using FIG. 2.

A description of steps S301 to s304 is omitted since they are identical to steps S201 to S204 in the media-1 identification processing shown in FIG. 18.

In step S305, the memory I/F unit 300 executes mutual authentication with media 2.

Figure 22:
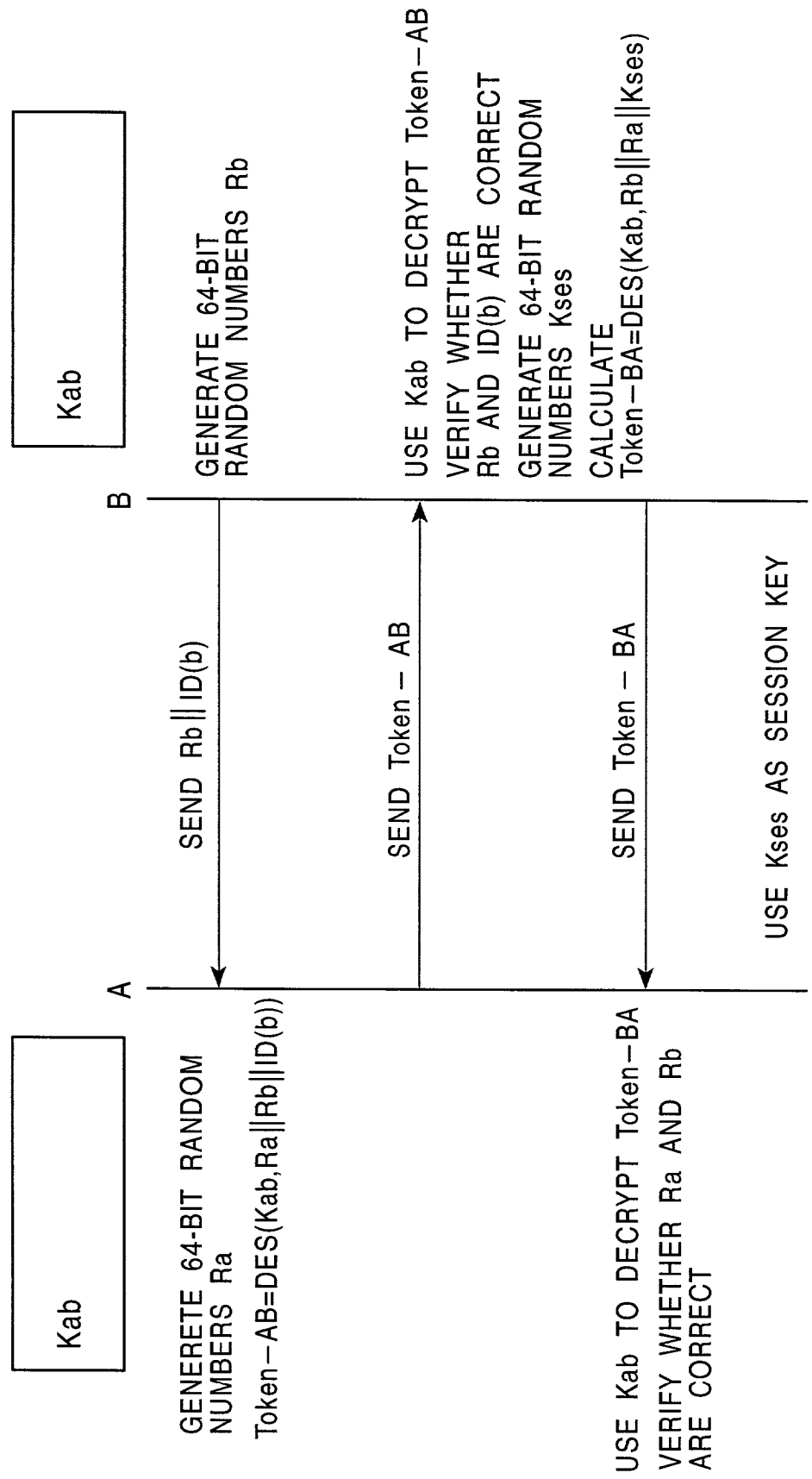
FIG. 22 is a flowchart showing a processing sequence of mutual authentication between a data processing device and media of the present invention.

FIG. 22 shows a processing sequence of mutual authentication (ISO/IEC 9798-2) using a common key cryptosystem. Although FIG. 22 shows that the DES is used as a common key cryptosystem, other types of common key cryptosystems can be used. Referring to FIG. 22, first, "B" generates 64-bit random numbers Rb and transmits Rb and ID(b) as its ID to "A". After receiving Rb and ID(b), "A" generates new random numbers Ra, and uses key "Kab" in the CBC mode in the DES to encrypt the data of Ra, Rb, and ID(b) in the order given. "A" sends back the encrypted data to "B". Key "Kab" is a secret key or authentication key which is common to both "A" and "B". Concerning encryption processing that uses key "Kab" in the CBC mode of the DES, for example, processing using the DES includes the steps of performing the exclusive OR value of an initial value and Ra, generating in an encryption unit a code E1 by using key Kab to encrypt the exclusive OR value of the initial value and Ra, performing the exclusive OR value of the code E1 and Rb, generating in a DES encryption unit a code E2 by using key Kab to encrypt the exclusive OR value of the code E1 and Rb, performing the exclusive OR value of the code E2 and ID(b), and generating, in the DES encryption unit, transmission data "Token-AB" by using the codes E1 and E2, and a code E3 generated by using key Kab to encrypt the exclusive OR value of the code E2 and ID(b).

After receiving the data Token-AB, "B" decrypts the received data by using key "Kab" which is stored as a common secret key in a recording device in each of "A" and "B". A method of decrypting the received data is as follows: First, the code E1 is decrypted by using authentication key "Kab", and the decrypted code and an initial value are exclusive ORed to generate random numbers "Ra". Second, the code E2 is decrypted by using authentication key "Kab", and the decrypted code and the code E1 are exclusive ORed to generate random numbers "Rb". Finally, the code E3 is decrypted by using authentication key "Kab", and the decrypted code and the code E2 are exclusive ORed to generate ID(b). Among the thus obtained values Ra, Rb, and ID(b), Rb and ID(b) are collated with those transmitted by "B". When the result of the collation proves identity, "B" authenticates "A" as a valid one.

Next, "B" uses random numbers to generate session key "Kses" which is used after authentication. Rb, Ra, and Rses are encrypted in the order given in the CBC mode of the DES by using authentication key "Kab", and are sent back to "A".

After receiving the encrypted data, "A" uses authentication key "Kake" to decrypt the received data. A method of decrypting the received data is identical to the decryption processing in "B". Among the thus obtained values Rb, Rb, and Kses, Rb and Ra are collated with those transmitted by "A". When the result of the collation proves identity, "A" authenticates "B" as a valid one. After both "A" and "B" authenticate each other, session key "Kses" is used as a common key for secret communication after the authentication.

When the verification of the received data indicates incorrectness or disagreement, mutual authentication is regarded as having failed, and data communication processing is inhibited after the verification.

Figure 23:
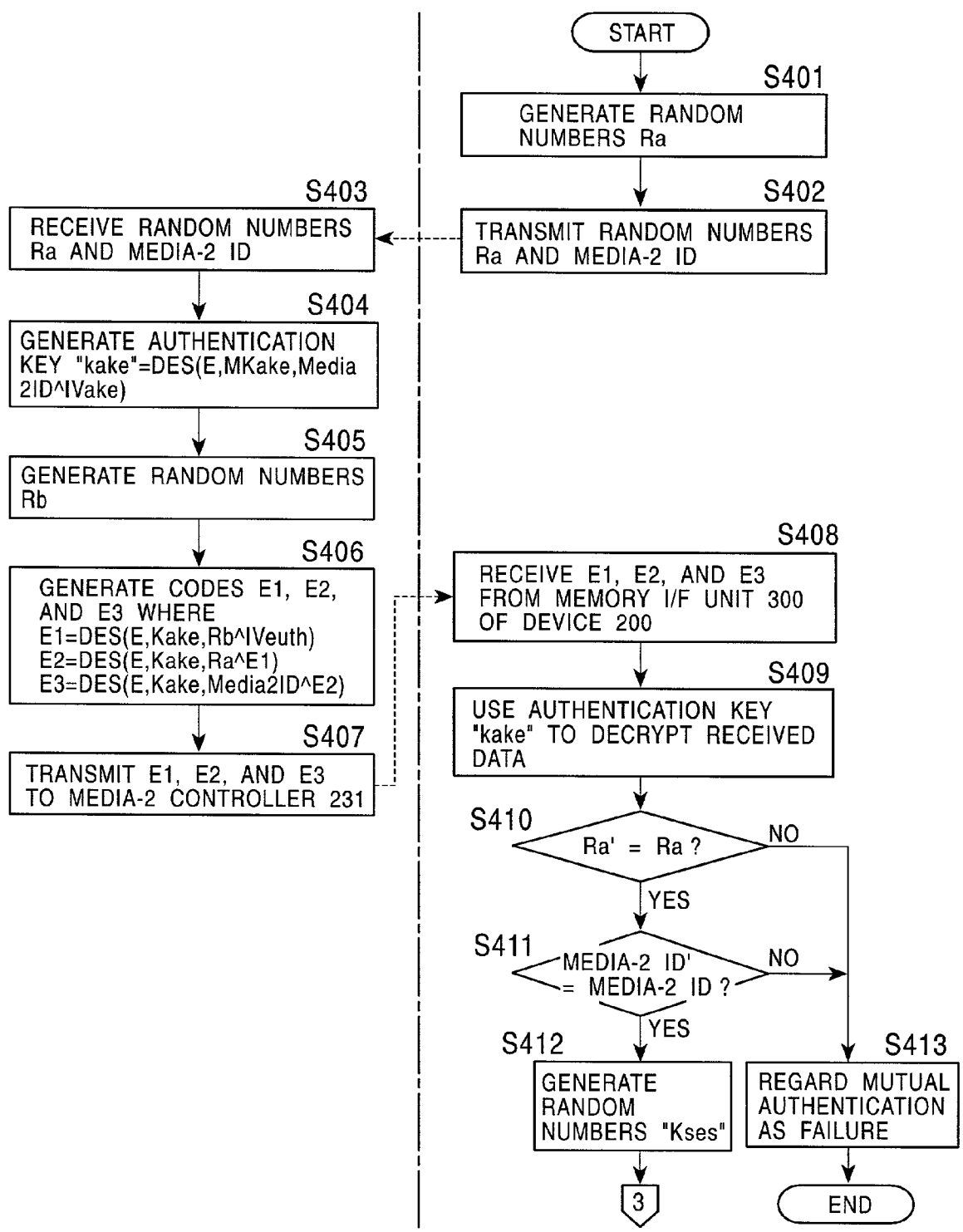
FIG. 23 is a first flowchart showing mutual authentication and key sharing processing in a data processing device of the present invention.
Figure 24:
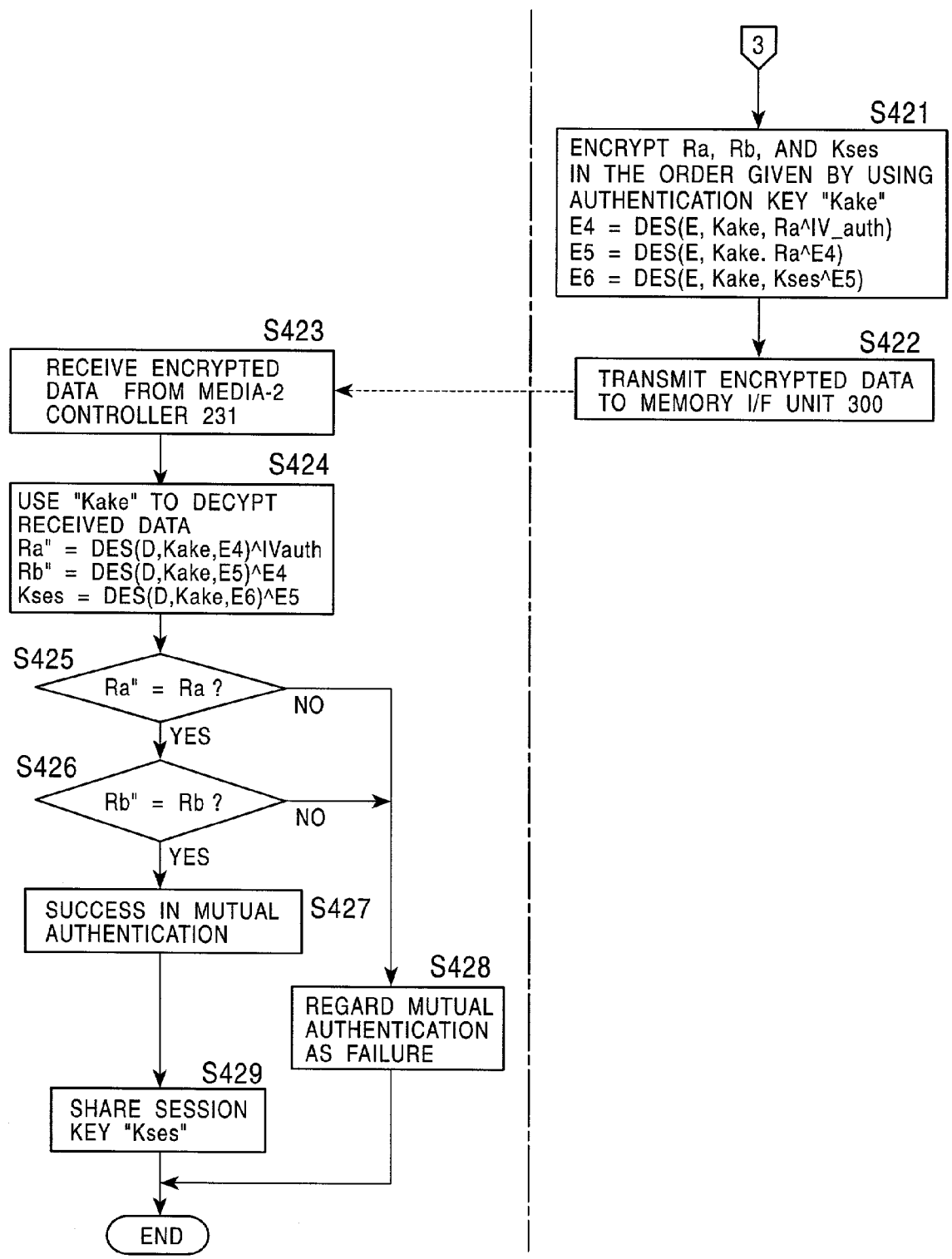
FIG. 24 is a second flowchart showing mutual authentication and key sharing processing in a data processing device of the present invention.

With reference to FIGS. 23 and 24, mutual authentication and key (session key) sharing processing which are performed between the device 200 and media 2 according to the present invention are described below. In each of FIGS. 23 and 24, the left part shows processing of the memory I/F unit 300 in the device 200, and the right part shows processing of the media-2 controller 231.

In step S401, the media-2 controller 231 generates random numbers Ra. In step S402, the media-2 controller 231 transmits the random numbers Ra and a media-2 ID as its identifier to the memory I/F unit 300 of the device 200. In step S403, the media-2 controller 231 receives the random numbers Ra and the media-2 ID. In step S404, the media-2 controller 231 generates authentication key "Kake" by using its own authentication-key-generating master key "MKake" to perform DES encryption on the exclusive ORed value of the received media-2 ID and initial value "IV_ake". In step S405, the memory I/F unit 300 of the device 200 generates new random numbers Rb. In step S406, the memory I/F unit 300 of the device 200 performs finding the exclusive ORed value of initial value "IV_auth" and Rb, encrypting, by using key "Kake", the exclusive ORed value to generate code E1, finding the exclusive ORed value of code E1 and Ra, encrypting, by using key "Kake", the exclusive ORed value to generate code E2, finding the exclusive ORed value of code E2 and the media-2 ID, and encrypting, by using key "Kake", to the exclusive ORed value to generate code E3. In step S407, the memory I/F unit 300 of the device 200 transmits the generated data, that is, "E1∥E2∥E3" to the media-2 controller 231, where "∥" indicates a combination of data.

In step S408, the media-2 controller 231 receives data "E1∥E2∥E3". In step S409, the media-2 controller 231 uses authentication key "Kake" to decrypt the received data. The decryption of the received data is as follows: First, code E1 is decrypted by using authentication key "Kake", and the decrypted data and the initial value are exclusive ORed to generate random numbers Rb'. Second, code E2 is decrypted by using authentication key, and the decrypted data and code E1 are exclusive ORed to generate random numbers Ra'.

Finally, code E3 is decrypted by using authentication key "Kake", and the decrypted data and code E2 are exclusive ORed to generate a media-2 ID'. Among the obtained Ra', Rb', and media-2 ID', Ra' and the media-2 ID' are collated with those transmitted by media 2 (steps S410 and S411). If the collation indicates identity, media 2 identifies the device 200 as a correct one. If the collation does not indicate identity, the mutual authentication is regarded as a failure (step S413), and data communication thereafter is stopped.

In step S412, the media-2 controller 231 generates random numbers as a session key (Kses) which is used after authentication.

Next, in step S421 shown in FIG. 24, Ra, Rb, and Kses are encrypted in the order given in the CBC mode of the DES by using authentication key "Kake". In step S422, the encrypted data are transmitted to the memory I/F unit 300 of the device 200.

In step S423, the memory I/F unit 300 of the device 200 receives the encrypted data. In step S424, the memory I/F unit decrypts the received data by using the authentication key "Kake". Among the decrypted data, that is, Ra", Rb", and Kses, Ra" and Rb" are collated with those transmitted by the device 200 (steps S425 and S426). If the collation indicates identity, the device 200 identifies media 2 as a correct one. After the device 200 and the media 2 (230) perform mutual authentication, they share session key "Kses" (step S429), and uses the shared key as a common key for secret communication after the authentication. When Ra" and Rb" do not correspond to transmission data, the mutual authentication is regarded as a failure (step S428), and data communication thereafter is stopped.

Referring back to FIG. 20, the identification processing of media 2 is continuously described below.

The mutual authentication and the key sharing processing are executed in step S305, and when the memory I/F unit 300 confirms that the mutual authentication has successfully been performed (step S306), it collates the media-2 ID received in the mutual authentication processing with revoked media-2 IDs of the already set revocation list (step S307).

When the received midia-2 ID does not match any revoked media-2 ID, it is determined that the loaded media 2 is not media to be revoked, but is valid media which can be used ("NO" in step S308), the media-2 valid flag of the status register 301 is set to "1" (valid) in step S309, and the busy flag is set to "0" (ready) in step S310. When the received midia-2 ID matches one of revoked media-2 IDs, it is determined that the loaded media 2 is media to be revoked and is invalid media which cannot be used ("YES" in step S308), and the setting of the valid flag of the status register 301 to be valid is not executed in step S309, and the busy flag is set to "0" (ready), so that the identification processing ends.

In step S311, the control unit 205 transmits a status reading command to the memory I/F unit 300. In step S312, the control unit 205 confirms whether the busy flag is "0" (ready). When the confirmation is affirmative, and the result of confirming whether the media-2 valid flag is "1" (valid) is affirmative ("YES" in step S313), the identification processing is continued. Alternatively, when the result of confirming whether the media-2 valid flag is "0" (invalid) ("NO" in step S313), the identification processing is terminated.

With reference to FIG. 21, the control unit 205 transmits, to the memory I/F unit 300, a command to read a media-2-related FAT (step S321), and the memory I/F unit 300 transmits, to media 2, a command that reads a sector in which the FAT is stored (step S322). Also, the memory I/F unit 300 receives the FAT from media 2 and transmits the FAT to the control unit 205 (step S323).

When the control unit 205 receives the FAT (step S324), which corresponds to data stored in media 2, it executes reading based on the FAT of the BPT (step S325), and performs transmission of a BPT set command and the BPT to the memory I/F unit 300 (step S326). Only when the BPT is valid does the memory I/F unit 300 perform the setting of the BPT. After the BPT is set, in content processing such as writing of content from media 2, it is determined, by referring to the BPT, whether or not block-unit erasure can be performed. Data writing processing by referring to the actual BPT is described later.

After the memory I/F unit 300 receives the BPT set command and the BPT from the control unit 205 (step S327), it sets the busy flag of the status register 301 to "1" (step S328), and generates ICV generating key "Kicv_bpt" for BPT integrity checking (step S329).

ICV generating key "Kicv_bpt" for BPT integrity checking is generated based on master key "MKicv_bpt" for generating an ICV key of a BPT stored beforehand in the device 200, and initial value "IVicv_bpt" at the time an ICV key of the BPT is generated, and the media-2 ID. Specifically, the generation is performed based on ICV generating key "Kicv_bpt"=DES(E, MKicv_bpt, media-2 ID^IVicv_bpt). This expression indicates that the exclusive ORed value of the media-2 ID and initial value "IVicv_bpt" is encrypted in the DES mode by using master key "MKicv_bpt".

In step S330, the memory I/F unit 300 generates a BPT ICV' by using the generated ICV generating key "Kicv_bpt" and "IVbpt", it executes collation (ICV'=ICV?) of the BPT ICV' with a correct ICV which is stored beforehand in the BPT. The generation of the ICV' is performed based on the DES mode described using FIG. 14 by processing to which ICV generating key "Kicv_bpt" generated using initial value "IVbpt" is applied. The ICV stored as additional information to the BPT is generated based on data including the media-2 ID. The ICV checking functions both to verify whether or not the data of the BPT includes interpolation but also to prove a correct media-unique BPT, that is, a BPT which is not copied to another type of media.

When ICV'=ICV ("YES" in S331), it is determined that the BPT is a valid one free from interpolation, which is stored in valid media, and the media-2 set flag is set to "1" (set) in step S332. When ICV'≠ICV ("NO" in step S331), it is determined that the BPT includes interpolation, and content processing based on BPT reading is inhibited and terminated. The termination of the processing sets the busy flag to "0" (set) in step S333.

On condition that the control unit 205 transmits the status reading command to the memory I/F unit 300 (step S334) and the busy flag is "0" ("YES" in step S335), the media-2 set flag is stored in step S336. When it is determined that the BPT does not include interpolation, the stored media-2 set flag is "1" which indicates valid setting. In the other cases, the stored media-2 set flag is "0".

Data-File Reading Processing

Figure 25:
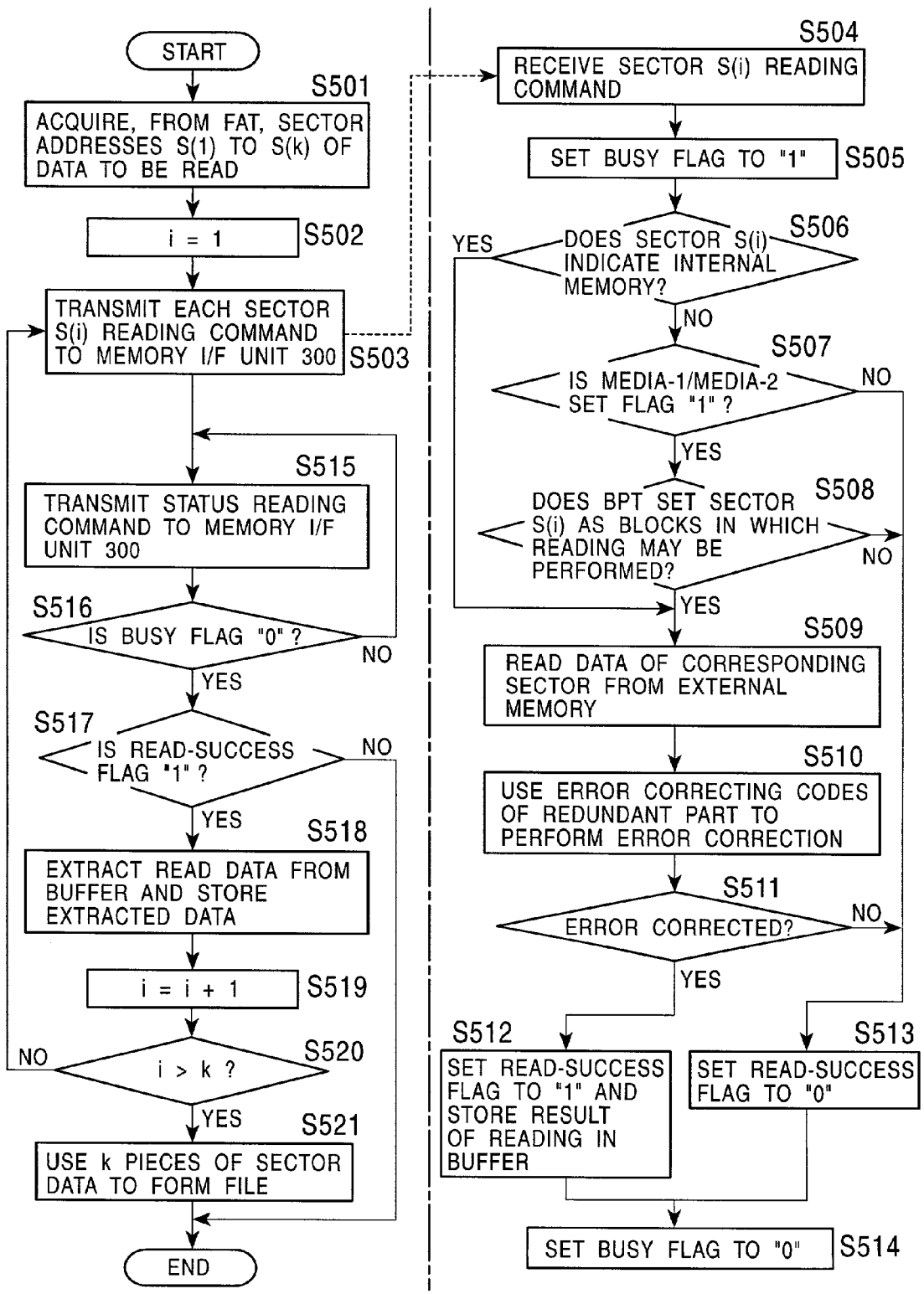
FIG. 25 consists of flowcharts showing data-file reading processing in a data processing device of the present invention.

Next, with reference to FIG. 25, data-file reading processing is described below. Data files include content data files such as music data and image data, and the above revocation list. The flowchart shown in FIG. 25 is common in reading of a data file which is stored in any one of the internal memory and the external memory (media 1 or media 2). In FIG. 25, the left part shows a process of the device 200, and the right part shows a process of the memory I/F unit 300.

In step S501, the control unit 205 acquires, from the FAT (see FIG. 17), sector addresses (S(1) to S(k)) of data to be read. In steps S502 and S503, the control unit 205 sequentially transmits each sector S(i) reading command to the memory I/F unit 300. When the memory I/F unit 300 receives the sector S(i) reading command in step S504, it sets the busy flag to "1" (busy) in step S505, and determines, in step S506, which one of the internal memory and the external memory the received sector S(i) indicates. When the received sector S(i) indicates the external memory, in step S507, the memory I/F unit 300 determines whether the set flag of the media 1 or the media 2 is "1" (which indicates valid setting of media). If the set flag is "1", in step S508, the memory I/F unit 300 determines by referring to the BPT whether the BPT sets the sector S(i) as blocks in which reading may be allowed. If the BPT sets the sector S(i) as blocks in which reading may be allowed, the memory I/F unit 300 reads data of the corresponding sector from the external memory in step S509.

When the data to be read is data in the internal memory which is not managed by the BPT, steps S507 and S508 are skipped. When the determinations in steps S507 and S508 are negative, that is, when the set flag of the media in which the sector S(i) is not "1", or when the BPT does not have settings on permission of reading from the sector S(i), the memory I/F unit 300 proceeds to step S513, and sets the read-success flag to "0" in order to indicates a reading error.

If the memory I/F unit 300 has determined in steps S506 to S508 that the reading of the sector S(i) is executable, the corresponding sector is read from the memory, and in step S510, correction processing based on error correcting codes of a redundant unit which are set correspondingly to the sector S(i) is executed. After the memory I/F unit 300 verifies that error correction has successfully been performed ("YES" in step S511), it performs setting of the read-success flag to "1" (success) and storing the result of reading in buffer in step S512, and sets the busy flag to "0" (ready) in step S514. When the error correction fails, the read-success flag is set to "0" (fail) in step S513 and the reading processing is terminated.

In steps S515 to S520, the control unit 205 repeatedly executes the reading of the status of the memory I/F unit 300, acquiring from a buffer and storing read data on condition that the read-success flag is "1" when the busy flag is "0", and sequentially acquiring, from a buffer, and storing data while sequentially incrementing the address. After storing all sectors to be read, the control unit 205 uses all the read sector data to constitute a file, and terminates the reading processing.

File Writing Processing

Figure 26:
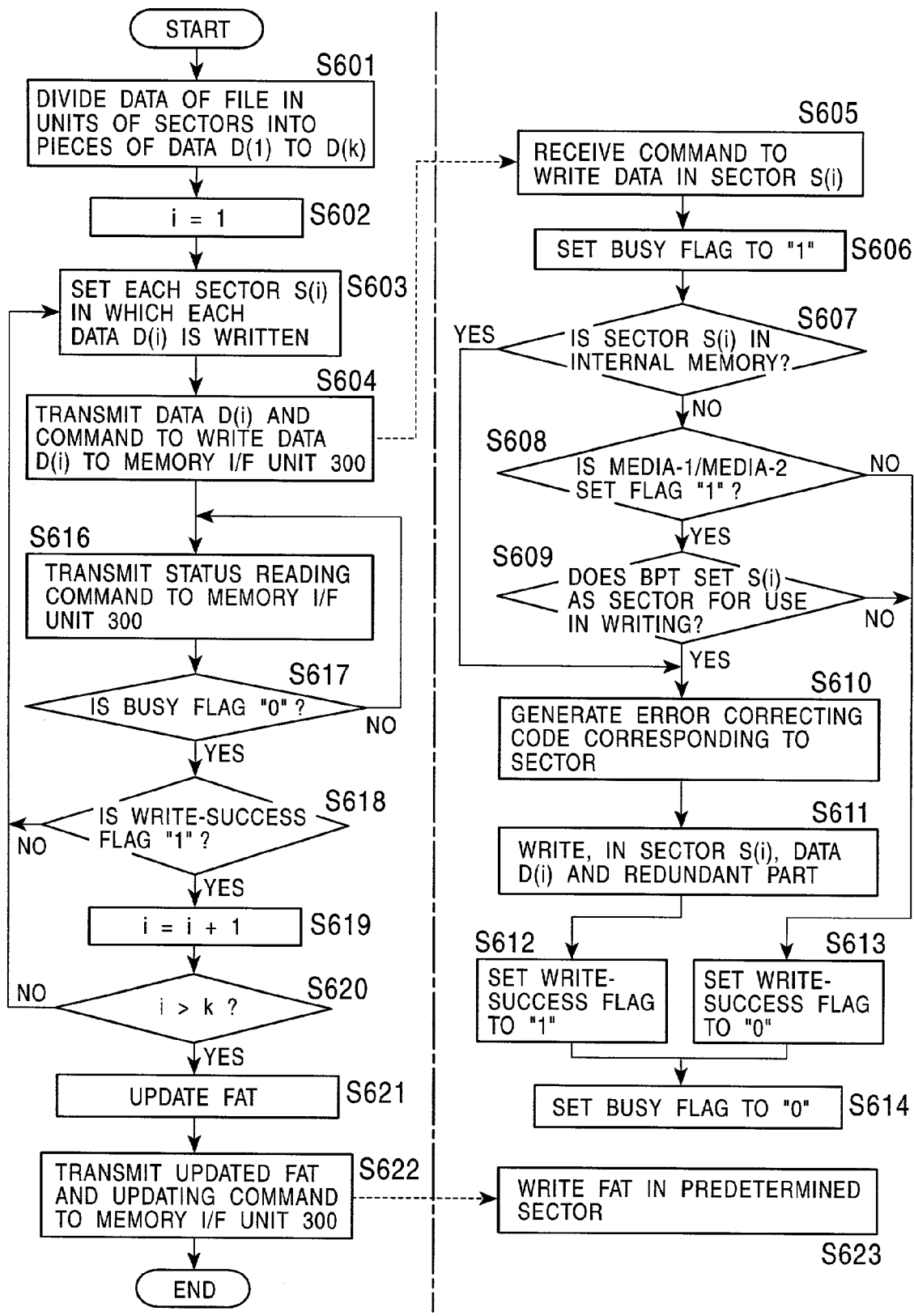
FIG. 26 consists of flowcharts showing data-file writing processing in a data processing device of the present invention.

Next, with reference to FIG. 26, data-file writing processing is described below. The flowchart in FIG. 26 indicates a common process performed when a file is written in one of the internal memory and the external memory (media 1 or media 2). The left part of the flowchart indicates processing by the control unit 205 of the device 200, and the right part of the flowchart indicates processing by the memory I/F unit 300 of the device 200.

In step S601, the control unit 205 divides the data of a file to be written in units of sectors. The divided pieces of the data are represented by D(1) to D(k). The control unit 205 sets each sector S(i) in which each data D(i) is written (steps S602 to S603), and sequentially transmits each data D(i) and a command to write each data D(i) to the memory I/F unit 300 (step S604). After the memory I/F unit 300 receives the command to write each sector S(i) (step s605), it sets the busy flag to "1" (busy) (step S606), and determines whether the received sector S(i) is in the internal memory or in the external memory (step S607). When the received sector S(i) is in the external memory, the memory I/F unit 300 determines whether or not the media-1 or media-2 set flag is "1" (indicating the valid setting of the media) (step S608). When the set flag is "1", the memory I/F unit 300 determines, by referring to the BPT, whether or not the BPT sets the S(i) as a sector for use in writing (step S609). When the determination is affirmative, an error correcting code which corresponds to the sector is generated in step S610, and the data D(i) and a redundant part having the error correcting code are written in the sector S(i) in step S611. In step S612, the write-success flag is set to "1" (success), and in step S614, the busy flag is set to "0" (ready).

In step S607, if the memory I/F unit 300 has determined that the received sector S(i) is in the internal memory, steps S608 and S609 are skipped. When the determinations are negative, that is, when the media-1 or media-2 set flag is not "1", or the BPT does not set the sector S(i) as a sector for use in writing, the memory I/F unit 300 proceeds to step S613, and sets the write-success flag to "0" in order to indicate a write error.

In steps S616 to S620, on condition that, after reading the status of the memory I/F unit 300, the write-success flag is "1" when the busy flag is "0", the device 200 sequentially increments the address and sequentially transmits each data to be written to the memory I/F unit 300. After processing of all the pieces of the data ends, the drive 200 executes the updating of the FAT in step S621, and transmits the updated FAT and an updating command to the memory I/F unit 300 in step S622. In step S623, the memory I/F unit 300 executes the writing of the FAT in response to the command.

Encryption Processing to which Encryption Key in Accordance with Sector Position is Applied Encryption processing to which an encryption key in accordance with sector position is applied is described below.

There is a case in which a content part is encrypted in order to protect copyright, etc. In this case, when a single encryption key is used to encrypt the entirety of the content part, a large number of codes are generated under the same encryption key. This results in a possibility that the codes may be easily attacked. Normally, it is preferable that, after dividing the content part as much as possible, the divided pieces of the content part be encrypted by using different encryption keys. In the system of the present invention, the minimum unit of content encryption is a sector. However, practically, sector-unit encryption is not preferable for the purpose of storing encryption keys in header areas because 8-byte (in the case of the DES) or 16-byte (in the case of the Triple-DES) key information is required in proportion to the number of sectors, so that increased header size causes the reduction of data areas in the areas of the memory. Also, by employing a method in which in the data part of each sector, a key for encrypting the sector is stored, the header size is not affected. However, data cannot be stored in an area for the key, so that the data size decreases, and in the case of a system in which a control unit has a file system, the file system itself must be greatly changed.

Figure 8:
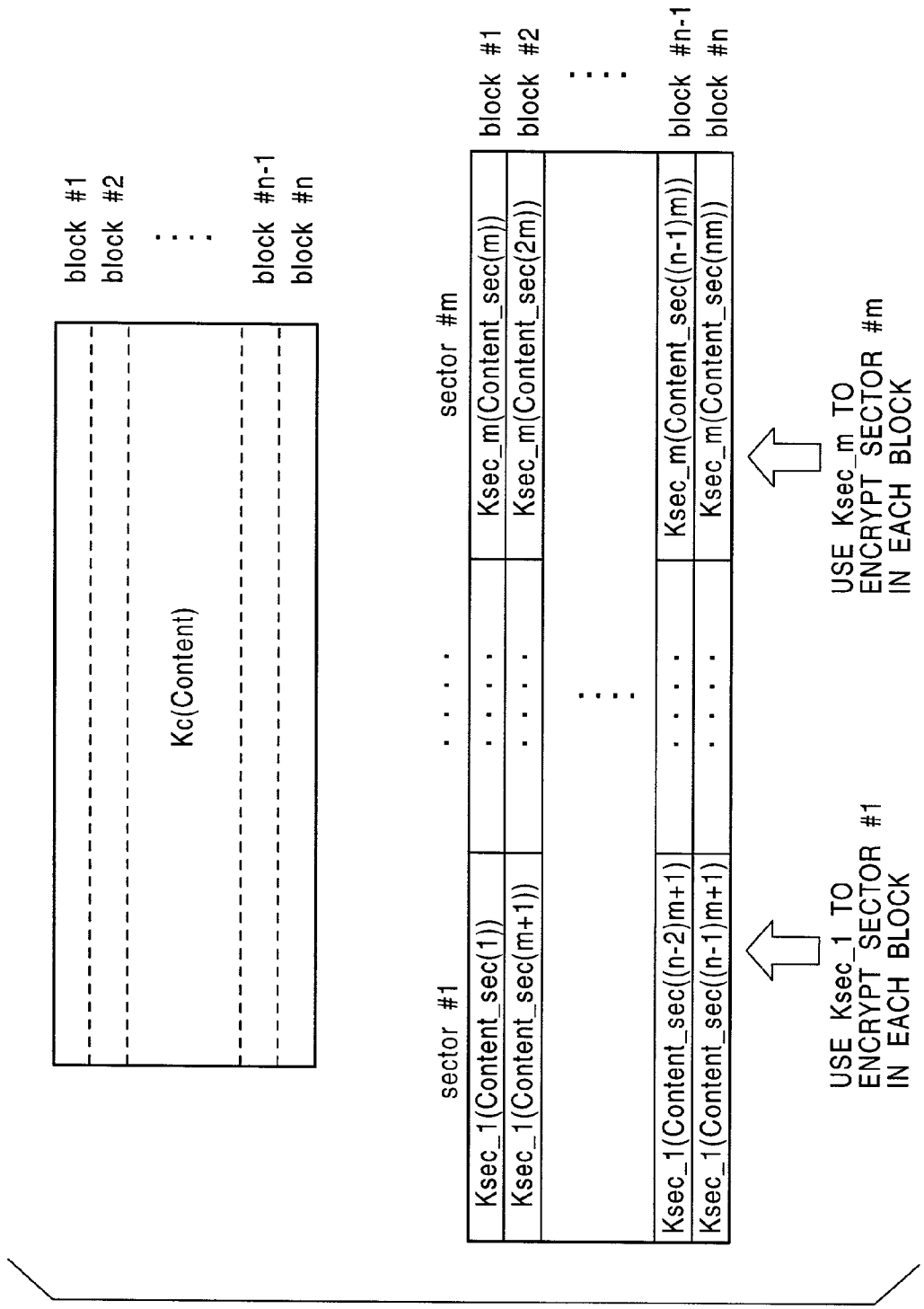
FIG. 8 is a drawing showing two modes of data encryption in a data processing device of the present invention.

Accordingly, in the system of the present invention, for example, M pieces of key information which correspond to the number M of sectors per block of the media are stored in the security header (see FIG. 7) as the above-described attribute information of each content, and are used as encryption keys for the sectors (see FIG. 8). In the security header shown in FIG. 7, "Kc_Encrypted0" to "Kc_Encrypted31" represent 32 encryption keys Kc. In each representation, "Encrypted" indicates that each key Kc is encrypted and stored. Depending on the position of a sector in the block, one encryption key is selected from among the encryption keys Kc, and is used as an encryption key corresponding to the sector.

Figure 27A:
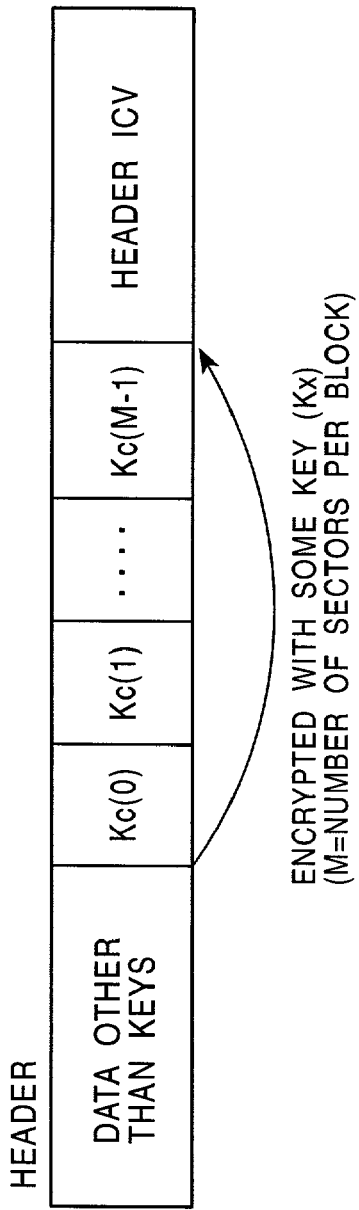
FIGS. 27A and 27B are illustrations of encryption forms of data stored in memory in a data processing device of the present invention.
Figure 27B:
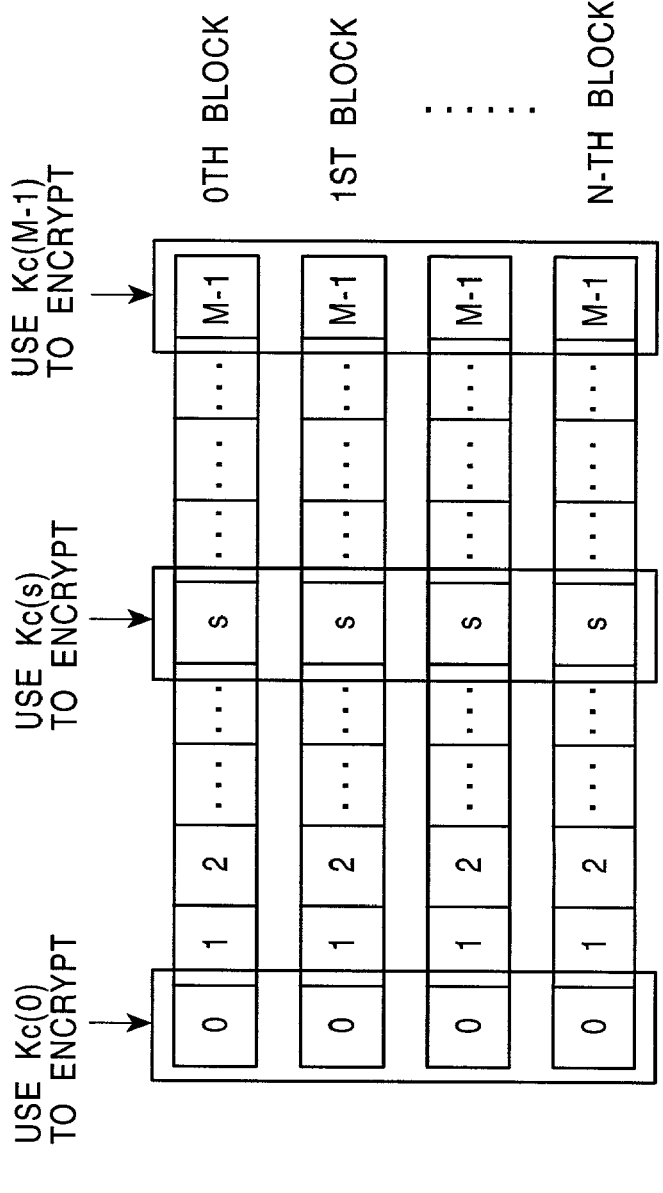

In FIG. 27A, a stored key arrangement in a security header generated correspondingly to content as header information of content is shown. In FIG. 27B, the correspondence between each stored key and each sector in the memory to which the stored key is applied is shown. Specifically, FIG. 27A shows the schematic arrangement of keys stored in the above-described security header (shown in FIG. 7). In the security header in FIG. 27A, M keys (content keys) "Kc(0)" to "Kc(M−1)" are stored. In addition, various types of information such as a version and a content type, and an ICV for header-information integrity checking are stored other than the keys.

As shown in FIG. 27B, each of the M content keys is correlated to each sector, and is used for encryption of data to be stored in the sector. As described above with reference to FIG. 3, the data storage area of the flash memory in which erasure is performed in units of blocks is divided in block units, and each of the block units is divided into a plurality of sectors. For example, the key "Kc(0)" is used as an encryption key for data to be stored in the sectors 0 of the blocks of the memory, and the key "Kc(s)" is used as an encryption key for data to be stored in the sectors "s" of the blocks of the memory. The key "Kc(M−1)" is used as an encryption key for data to be stored in the sectors M−1 of the blocks of the memory.

By using different encryption keys for different sectors when storing data, as described above, the security of the stored data (e.g., content) is enhanced. In other words, when the entirety of content is encrypted by using a single key, the entirety of the content can be decrypted by a leak key. Conversely, in the present invention, it is impossible for the entirety of the data to be decrypted by using a single leak key.

The Single DES in which DES encryption processing using a single encryption key is executed is used as an encryption algorithm. Also, encryption not by the Single DES but by the Triple DES using two or more keys for encryption may be employed as the encryption algorithm.

Figure 28A:
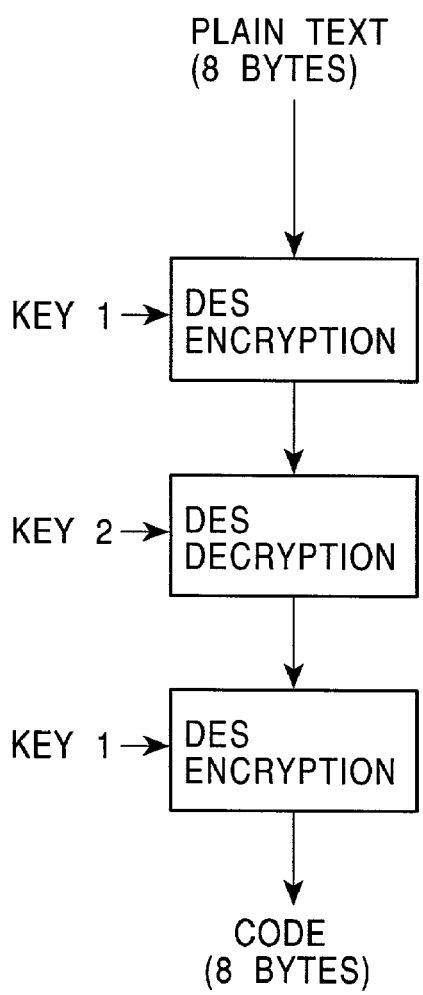
FIGS. 28A and 28b are illustrations of the triple DES which is usable as an encryption form of data stored in memory in a data processing device of the present invention.
Figure 28B:
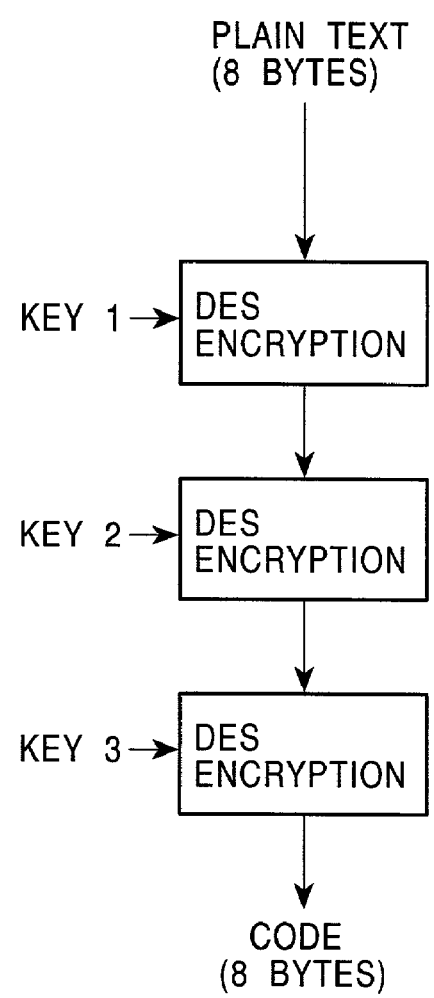

Details of the Triple DES are shown in FIGS. 28A and 28B. As shown in FIGS. 28A and 28B, there are two different typical modes of the Triple DES, which are described below.

FIG. 28A shows a mode of the Triple DES in which two encryption keys are used and which performs: encryption processing based on a first key K1; encryption processing based on a second key; and encryption processing based on the first key K1. Two types of keys are used in the order of K1, K2, and K1. FIG. 28B shows a mode of the Triple DES in which three encryption keys are used and which performs: encryption processing based on a first key K1; encryption processing based on a second key K2; and encryption processing based on a third key K3. Three types of keys are used in the order of K1, K2, and K3. In this manner, by performing successive processing a plurality of times, the security can be enhanced compared with the Single DES.

Figure 29:
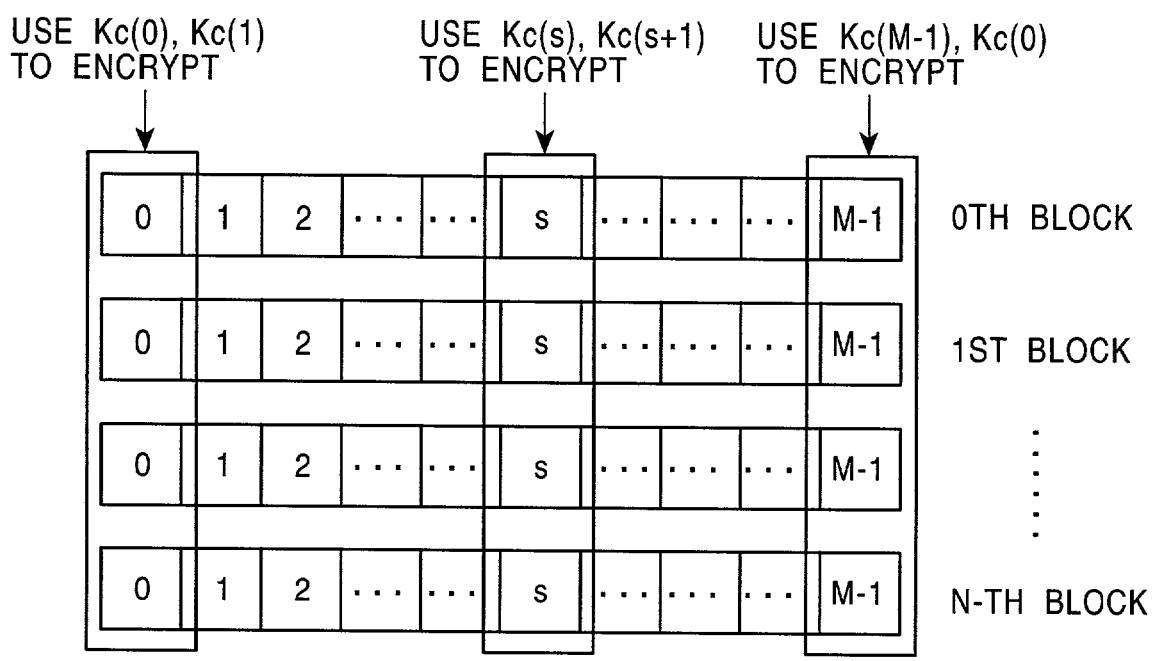
FIG. 29 is an illustration of an encryption form of data stored in memory in a data processing device of the present invention.

In FIG. 29, an example of encryption performed based on the Triple DES by using a pair of different encryption keys for each sector of data to be stored in the memory is shown. As shown in FIG. 29, in the sectors 0 of the blocks, two keys "Kc(0)" and "Kc(1)" are used to perform the Triple DES. In the sectors "s" of the blocks, two keys "Kc(s)" and "Kc(s+1)" are used to perform the Triple DES. In the sectors M−1 of the blocks, two keys "Kc(M−1)" and "Kc(0)" are used to perform the Triple DES. Also in this case, the number of keys stored in the header is M. Accordingly, the security can be enhanced without increasing the number of stored keys which is shown in FIG. 27A.

Figure 30:
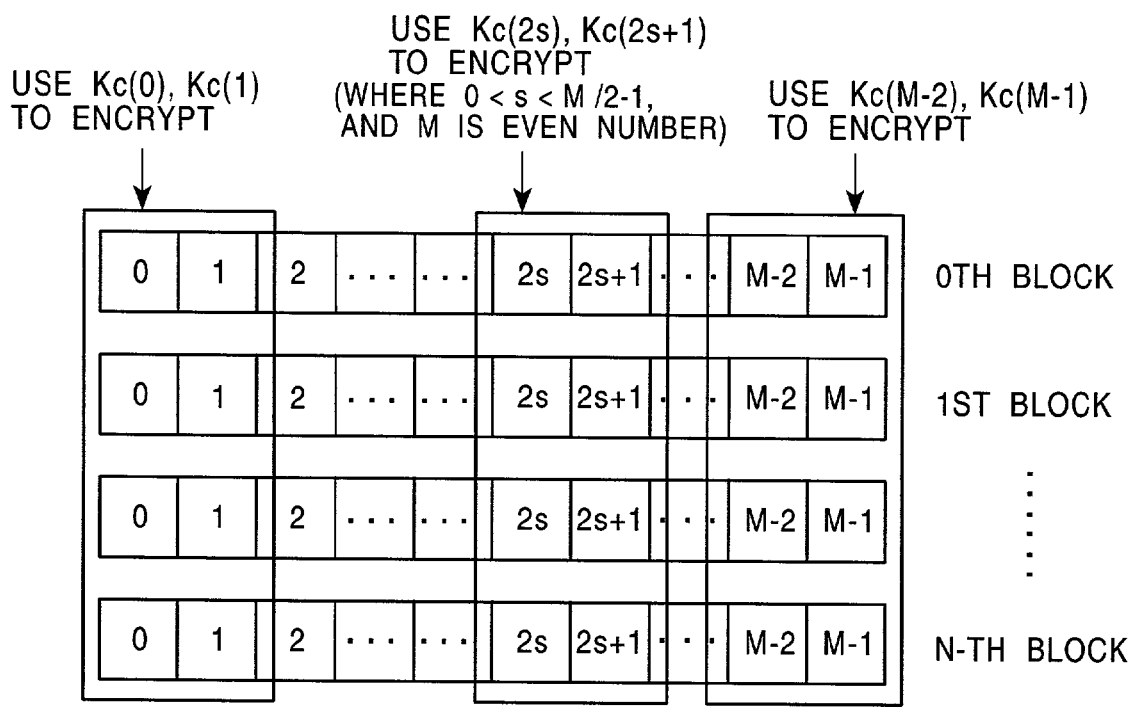
FIG. 30 is an illustration of an encryption form of data stored in memory in a data processing device of the present invention.

In FIG. 30, a further different mode of the data encryption is shown. In this mode, two consecutive sector areas in each block of the memory are treated as one encryption block, and two keys are used to perform encryption based on the Triple DES by using two keys. As shown in FIG. 30, in the sectors 0 and sectors 1 of the blocks, two keys "Kc(0)" and "Kc(1)" are used to perform the Triple DES, in the sectors 2s and sectors 2s+1 of the blocks, two keys "Kc(2s)" and "Kc(2s+1)" are used to perform the Triple DES, and in the sectors M−2 and sectors M−1 of the blocks, two keys "Kc(M−2)" and "Kc(M−1)" are used to perform the Triple DES. In this manner, by applying a single type of encryption processing to a plurality of sectors, the processing load on the encryption process or decryption process can be reduced.

In addition to the examples shown in FIGS. 27B, 29, and 29, various types of modes can be employed in order to perform sector-unit encryption by storing a plurality of keys in the header, and selectively using a key among the stored keys. For example, in FIGS. 27B, 29, and 30, the number of keys stored in the header is equal to the number of sectors. However, when the number of sectors is, for example, M, encryption of the sectors 0 and the sectors "s" by using a single key may be performed by setting the number of sectors to N (N<N). Also, by setting the number of stored keys to L (L>M), encryption based on the Triple DES in which a set of completely different keys is used for each sector.

Sector-Unit Addition of ICVs

Sector-unit addition of ICVs is described below.

When the validity of data in a plurality of sectors is verified, in general, the above ICV is added to the end, etc., of the entirety of content data. Accordingly, in the case of the addition of the ICV to the entirety of the data, it is impossible to verify the validity of each sector unit constituting the data.

In the case of adding the ICV, the storage of the ICV in a storage area for content as actual data results in the reduction of an area that can be used as a data part. If each sector-unit ICV is stored in each sector so as to correspond to the data of each sector, in order to execute processing that reads data in units of data parts, the file system of the device 200 must once execute processing for separating actually used data from the ICV, that is, both a process that extracts ICVs in the sectors of read data part and a process that connects the data of the extracted sectors. Thus, a new file system for executing both processes must be formed. In addition, in a case in which the control unit 205 checks the ICVs, the load on the control unit 205 increases.

In a data processing device of the present invention, in order that data integrity checking may be performed in units of sectors, ICVs are set in units of sectors, and each position in which each ICV is set is provided not in an actual data area but in a redundant area which is preset as an area in which reading by the file system of the device is prevented.

By providing each ICV in the redundant area, the need for providing the ICV in the data part is eliminated, and an area for the data part can be greatly used. Also, by providing the ICV in the redundant part, the need for separating the data part and the ICV and for connecting data is eliminated, so that the continuity of the data reading is maintained.

When data is read, the memory I/F unit 300 (shown in FIG. 2) executes ICV checking in units of sectors. If the memory I/F unit 300 has found invalid data which has interpolation, it does not transfer the data to the control unit 205. When data is written, the memory I/F unit 300 executes processing that calculates and writes, in the redundant part, the ICV of each sector.

The operation of whether or not an IC is added to each sector is set by describing information in security header. As described above about the security header in FIG. 7, the "ICV Flag" of the security header has portions corresponding to the sectors (32 sectors) of the block. Each portion indicates that the ICV is added/not added in each sector. For example, each portion in which "0" is set indicates that the ICV is not added, and each portion in which "1" is set indicates that the ICV is added.

Figure 31:
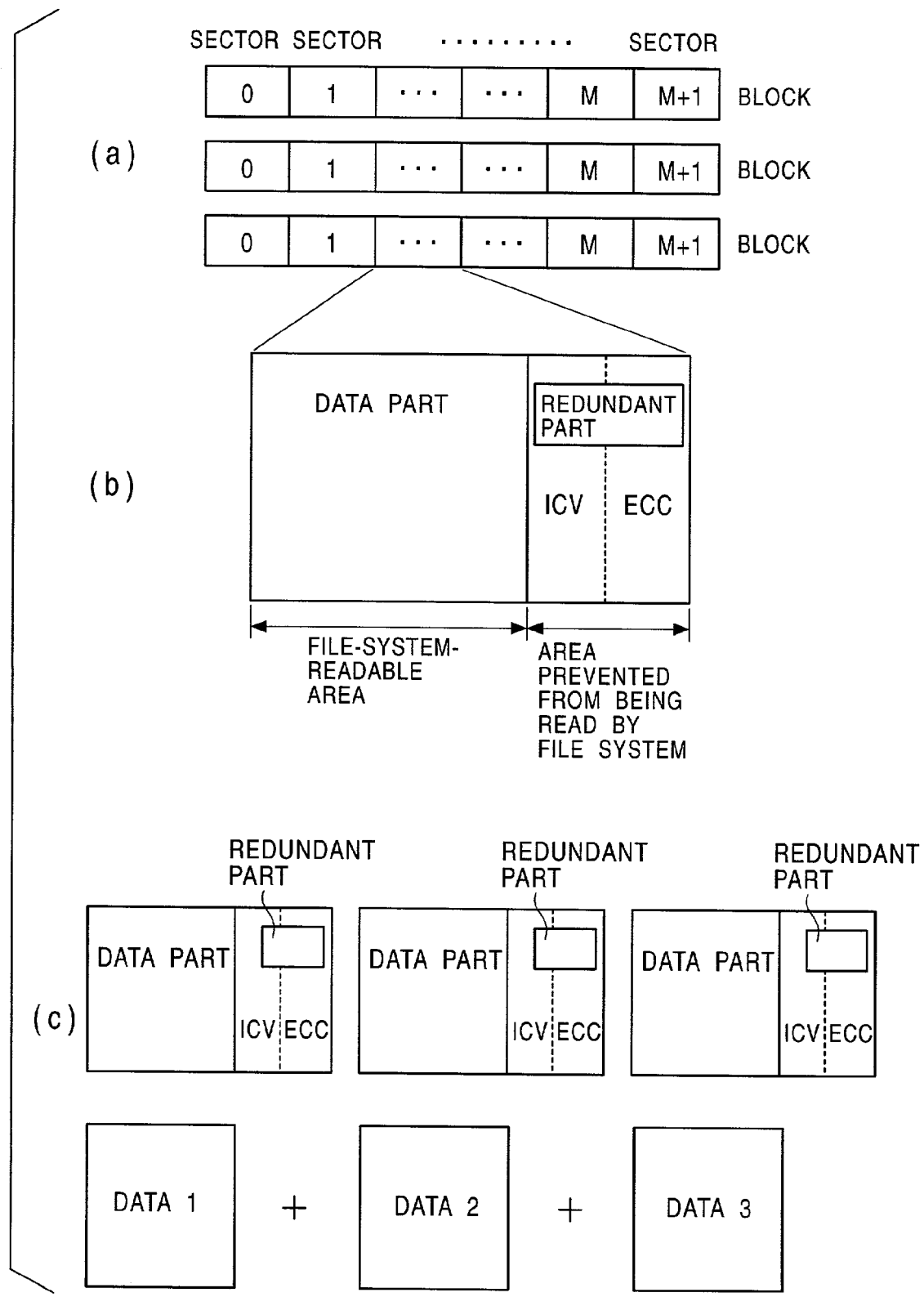
FIG. 31 is an illustration of a storage form of a sector-unit integrity check value in a data processing device of the present invention.

The arrangement of the data part and redundant part of each sector is shown in FIG. 31. As the part (a) of FIG. 31 shows, data to be stored in a memory (e.g., flash memory) is divided into block units each composed of a plurality of sectors. As the part (b) of FIG. 31 shows, each sector consists of, for example, a 512-byte or 1024-byte data part that is read as actual data (e.g., content) by the file system of the device 200, and a redundant part storing information that cannot be read depending on the file system type, such as error correcting codes.

The redundant part is a predetermined area having, for example, 16 bytes or 20 bytes. The redundant part is recognized as a non-data area by the file system of the device 200, and is not read in read processing. In general, an error correcting code stored in the redundant part does not use the entirety of the redundant part, and includes an unused area (reserved area). In the reserved area, the ICV of each sector is stored.

Processing that connects data parts by the file system of the device 200 when the ICV is stored in the redundant part can be performed similarly to conventional data-combining processing which only connects data parts simply usable as data. Accordingly, the file system of the device 200 may simply connect data parts, excluding redundant parts, so that any additional processing does not need to be performed.

By using the above configuration, the validity of data composed of a plurality of sectors can be verified in units of sectors. Also, by providing an ICV in a redundant part, a data part usable for data can be utilized without being changed. Sectors that are regarded as correct (not interpolated) as a result of ICV checking are only transmitted to the control unit 205. In addition, the execution by the memory I/F unit 300 of ICV checking provides an advantage in that the load on the control unit 205 is reduced.

Processing that Stores Content Key by Using Unique Key in Media

Processing that stores each content key by using a unique key in media is described below.

As described above using FIG. 7, in a security header formed for each content, a plurality of content keys "Kc_Encrypted(numbers)" as encryption keys corresponding to sectors, and a content-ICV generating key "Kicv_Encrypted" are encrypted and stored.

In an encryption mode, after using a distribution key "Kdist" which is stored beforehand in the memory unit 321 (shown in FIG. 4) of the memory I/F unit 300 (in the device 200) to encrypt the above keys, the encrypted keys are stored. For example, Kc_Encrypted0=Enc(Kdist, Kc(0)), where Enc(a, b) represents data obtained by using a to encrypt b. In this manner, each key is encrypted by using the device's distribution key "Kdist", and is stored in the security header.

In another encryption mode, in media 2 which has the cryptosystem unit 235 and which executes content processing by performing mutual authentication with the device 200, by using a unique key of media 2, a content key related to content to be stored in media 2, and an ICV generating key are encrypted. Processing that stores, in media, the unique keys of media 2, that is, a content key and a con-ICV generating key which are encrypted by using the storage key "Ksto" of media 2) is described below.

The media-2 storage key "Ksto" is stored in the internal memory 235 of the media-2 controller 231 in media 2 (230), as shown in FIG. 2. Accordingly, processing that uses the media-2 storage key "Ksto" to encrypt/decrypt the content key and the ICV generating key is executed by media 2. When the device 200 into which media 2 is loaded executes acquisition of the content key and the ICV generating key or the storage of these keys into the security header in order to use the content of media 2, key encryption and decryption must be performed by media 2. In a data processing device of the present invention, the key encryption and decryption can be performed in the CBC mode.

Figure 32:
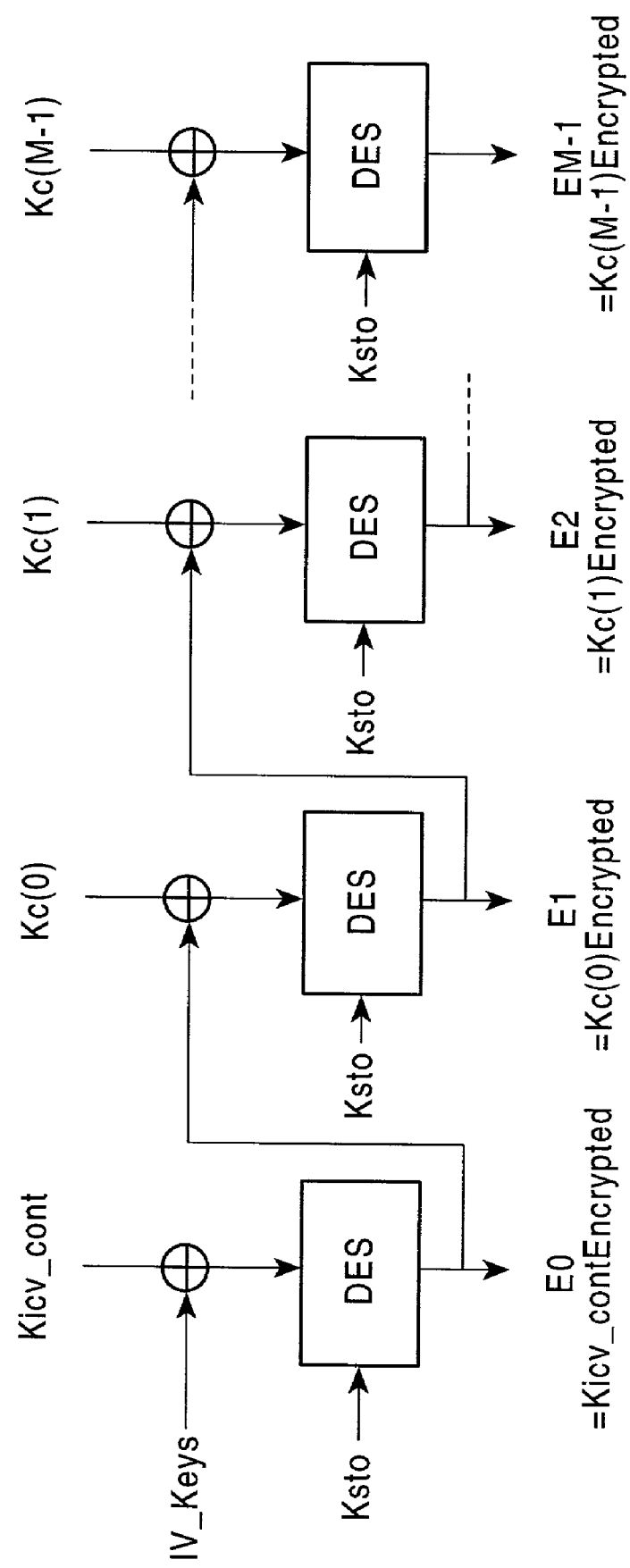
FIG. 32 is an illustration of a storage form of a sector-unit integrity check value in a data processing device of the present invention.

In FIG. 32, the construction of key encryption processing in the CBC mode is shown. This encryption processing is executed by the cryptosystem unit 236 (shown in FIG. 2) in media 2. The exclusive OR operation of the initial value "IV_keys" stored in the internal memory 235 and the content-ICV generating key "Kicv_cont" is executed. The result is processed by performing DES encryption to which the storage key "Ksto" stored in the internal memory 235 is applied, and the encrypted result is stored as "Kicv_cont Encrypted" in the header. The exclusive OR operation of "Kicv_cont Encrypted" and the content key Kc(0) corresponding to sector (0) is executed. The result is processed by performing DES encryption to which the storage key "Ksto" stored in the internal memory 235 is applied, and the encrypted result is used as an encryption key "Kc(0)Encrypted" to be stored in the header. The exclusive OR operation of the " Kc(0)Encrypted" and the content key "Kc(1)" is executed. The result is processed by performing DES encryption to which the storage key "Ksto" stored in the internal memory 235 is applied, and the encrypted result is represented by "Kc(1)Encrypted". After that, by repeatedly executing these steps, key data to be stored in the header is formed.

Figure 33:
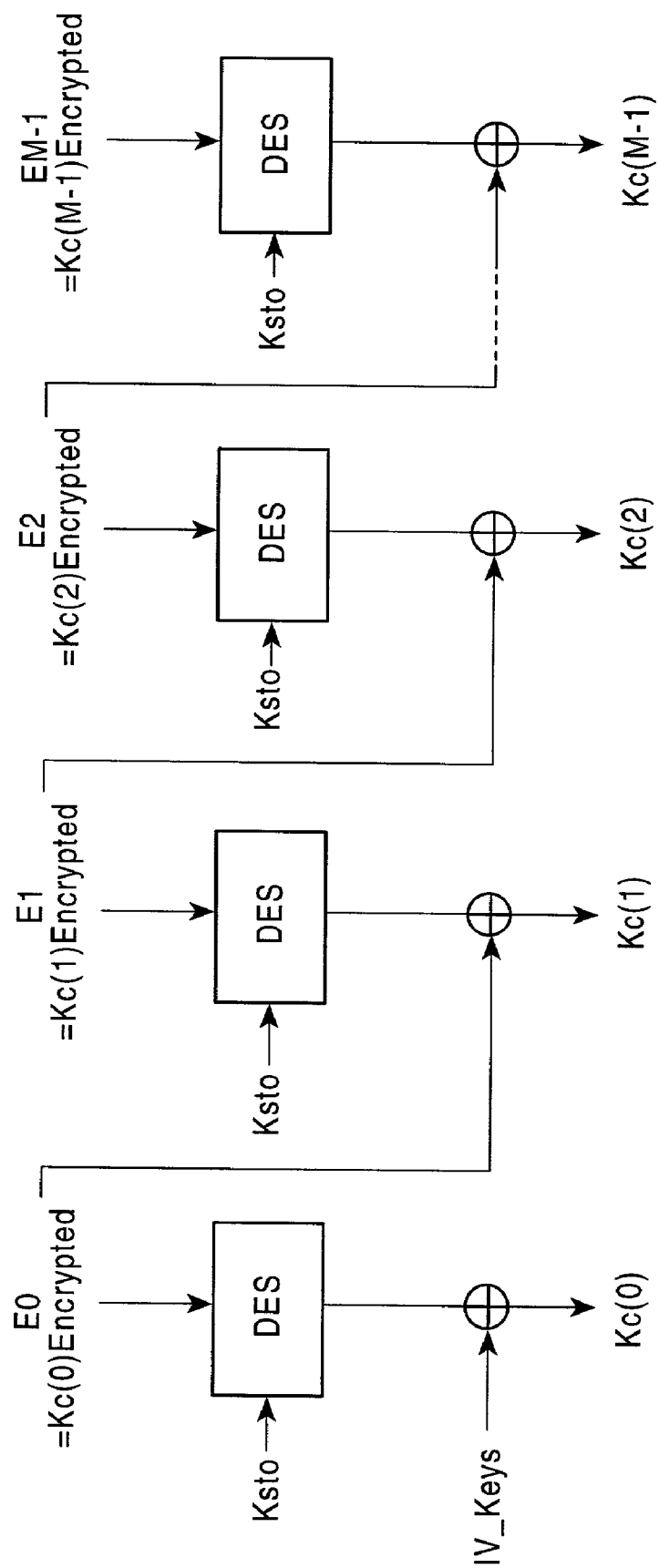
FIG. 33 is an illustration of the construction of key decryption processing in the CBC mode in a data processing device of the present invention.

In FIG. 33, the construction of key decryption processing in the CBC mode is shown. This decryption processing is executed by the cryptosystem 236 (shown in FIG. 2) in media 2. First, "Kc(O)Encrypted" is processed by performing DES decryption processing to which the storage key "Ksto" stored in the internal memory 235 is applied. The decrypted result and the initial value "IV_keys" stored in the internal memory 235 are exclusive ORed to output the content key "Kc(0)". "Kc(1)Encrypted" is processed by performing DES decryption processing to which the storage key "Ksto" is applied. The decrypted result and the content key "Kc(0)Encrypted" are exclusive ORed to output the content key "Kc(1)" corresponding to sector (1). After that, by repeatedly executing these steps, content keys are acquired. Although FIG. 33 shows a case that only outputs content keys, similar processing can be applied to the content-ICV generating key "Kicv_Encrypted". Accordingly, from the encrypted content-ICV generating key "Kicv_Encrypted", the content-ICV generating value "Kicv" can be generated.

In many cases, the above encryption processing and the above decryption processing on each content key "Kc(sector number)" or the content-ICV generating key "Kicv" are executed based on a command from the device 200 into which media 2 is loaded. In this case, between the device 200 and media 2, the above mutual authentication is executed. On condition that the mutual authentication is established, various processes are executed, such as content playback and storage, and the above-described encryption and decryption of content are executed as a type of content processing. When the decrypted key (e.g., a content key "Kc(sector number)" is transferred between the device 200 and media 2, it is encrypted by using the session key "Kses" generated in mutual authentication. By applying the CBC mode also to the encryption and decryption based on the session key "Kses", security can be enhanced.

Figure 34:
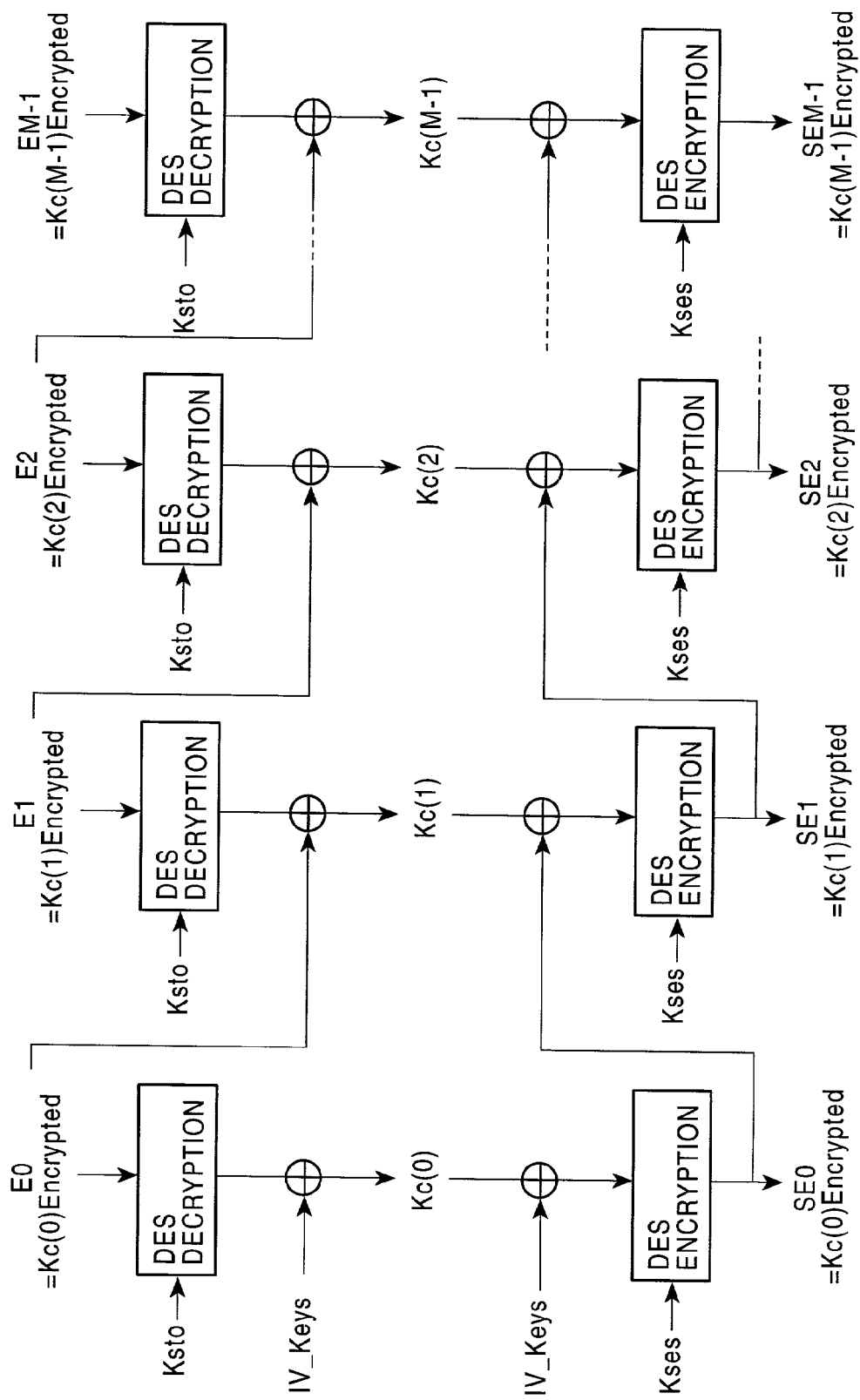
FIG. 34 is an illustration of an example in which a sector-unit content key and other keys are processed between a data processing device of the present invention and media.

In FIG. 34, the construction of processing is shown in which after the key stored in the header is decrypted in the CBC mode, the decrypted key data is encrypted in the DES-CBC mode by using the session key "Kses". The upper part of FIG. 34 is identical in construction to FIG. 33. Each encrypted content key which is extracted from the security header is sequentially input to each DES decryption unit, and the input key is processed by performing decryption processing to which the storage key "Ksto" of media 2 is applied. The decrypted result, and the initial value or previously input data are exclusive ORed, whereby a content key is obtained as an output result.

Each output result is further processed by executing DES-CBC mode encryption processing to which the session key "Kses" generated in mutual authentication with the device 200. The thus obtained data "SE0:Kc(0)Encrypted" to "SEM−1:Kc(M−1)Encrypted" are transmitted to the device 200. The device 200 can obtain the content key "K(c)" by applying the session key "Kses" generated in mutual authentication with media 2, and executing decryption processing (identical to that shown in FIG. 33) on the data "Kc(0)Encrypted" to "Kc(M−1)Encrypted" which are received from media 2. Although FIG. 34 shows a case in which only a content key is used as data to be processed, the content-ICV generating key "Kicv_Encrypted" can be used as data to be processed.

Processing for Reading Encrypted Data

With reference to the flowcharts shown in FIG. 35 and the following drawings, details of processing that reads encrypted data from media are described below.

There are two forms of data encryption. As described above, one is that data is encrypted by using different keys for sectors, and the other one is that the entirety of content is encrypted by using one encryption key. The form of encryption is determined based on header information. The left part of FIG. 35 shows processing of the control unit 205 in the device 200, and the right part shows processing of the memory I/F unit 300.

In step S701, the control unit 205 reads the header file of content to be read. This step is executed as a process in accordance with the flowchart shown in FIG. 25. In step S702, the control unit 205 transmit a header set command and the read header file to the memory I/F unit 300.

After reading the command and the header file in step S703, the memory I/F unit 300 sets the busy flag to "1" (busy) in step S704, and checks the ICV of the header in step S705. The ICV checking is executed by performing, in the ICV generating processing described using FIG. 14, the generation of an ICV' by using a security-header-ICV generating key "Kicv_sh" and the initial value "IVsh" and inputting data constituting the header, and collation of the generated ICV' and an ICV stored beforehand in the header.

When the result of the checking indicates that the header has no interpolation (step S706), it is verified whether or not the valid revocation list version is "0" (step S707). For example, when content generated and stored by the device 200 is stored in a memory, the revocation list version is set to "0", SO that in playback processing, the revocation list is set so as not to be accessed.

When the revocation list version is "0", it is not necessary to refer to the revocation list, so that the memory I/F unit 300 proceeds to step S710. When the revocation list version is not "0", it is verified in step S708 whether or not the currently set revocation list is older than the version of the header. When the set revocation list is older, the memory I/F unit 300 proceeds to step S713, and sets the header set success flag to "0" (not OK) before terminating the processing. When the set revocation list is not older than the version of the header, the memory I/F unit 300 proceeds to step S709, and determines, by referring to the revocation list, whether a content ID to be read is found. If the content ID is found, the header set success flag is set to "0" (not OK) in step S713 in order to prevent reading, and the processing is terminated.

When the content ID to be read is not found in the revocation list, in step S710, the content key "Kc" which is encrypted based on the header information, and the content ICV generating key "Kicv_cont" are decrypted. As described above using the flowchart in FIG. 16, the revocation list is set in the memory I/F unit 300 when the device 200 is activated. After the revocation list is set, the revocation list can be continuously used when media is loaded into the device 200 or content is played back.

As described above using FIG. 7, in the security header, a plurality of content keys "Kc(0)" to "Kc(M−1)" are encrypted and stored as the above encryption keys to be applied to sectors. Also, the content-ICV generating key "Kicv_cont" for generating a content ICV is encrypted and stored.

Before decrypting content, it is necessary to execute processing in which the content-ICV generating key "Kicv_cont" is decrypted in order to perform content integrity checking, and it is necessary to execute processing that decrypt the content keys "Kc(0)" to "Kc(M−1)".

Figure 37:
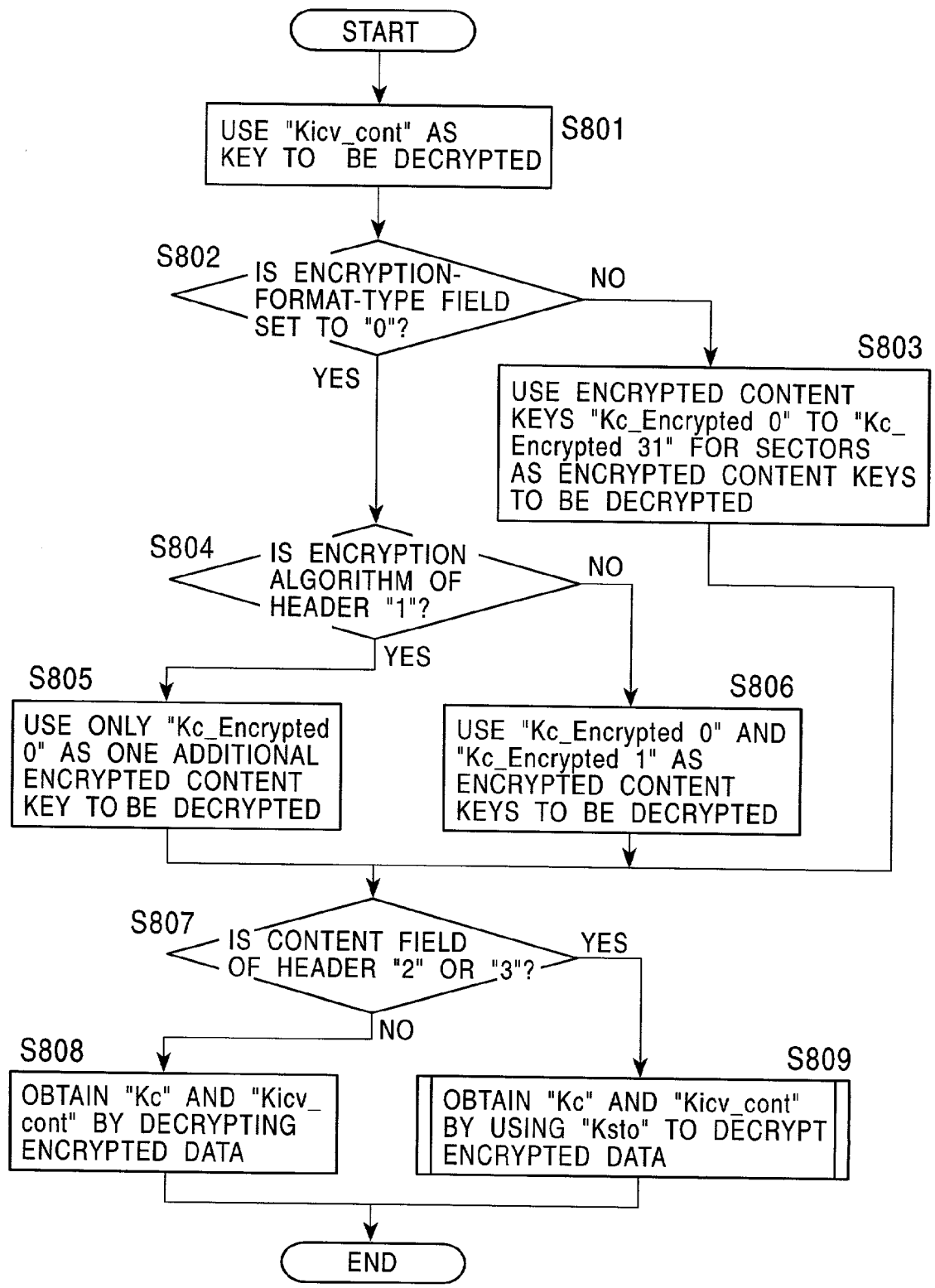
FIG. 37 is a flowchart showing processing that decrypts a content key and other keys in a data processing device of the present invention.

In FIG. 37 is shown a process for decrypting the encrypted content key "Kc" and the encrypted content-ICV generating key "Kicv_cont". The steps in FIG. 37 are described below. The process in FIG. 37 is a process in the memory I/F unit 300 in the device 200. The process in FIG. 37 is executed by the cryptosystem unit 320.

In step S801, the cryptosystem unit 320 selects the encrypted content-ICV generating key "Kicv_cont" as a key to be decrypted. In step S802, the cryptosystem unit 320 determines whether or not the encryption format type field of the header is "0". If the encryption format type field is "0", a technique in which, regardless of sectors, the entirety of content is treated as one to be encrypted is employed. If the encryption format type field is "1", a technique using sector-unit encryption keys, as described using FIGS. 27A and 27B, is employed. If the technique using sector-unit encryption keys is employed, the cryptosystem unit 320 proceeds to step S803, and the encrypted sector-unit content keys "Kc_Encrypted0" to "Kc_Encrypted31" are used as keys to be decrypted.

When the cryptosystem unit 320 has determined in step S802 that the encryption format type field is "0", the cryptosystem unit 320 further determines whether the algorithm field of the header is "1" (triple DES) or "0" (single DES). If the single DES is employed, in step S805, only one encrypted content key "Kc_Encrypted0" is additionally treated as a key to be decrypted. If the triple DES is employed, in step S806, a plurality of encrypted content keys "Kc_Encrypted0-1" are additionally treated as keys to be decrypted.

In step S807, the cryptosystem unit 320 checks the set content type field of the header. When the content type field is not "2" or "3" (representing content stored in media 2), the cryptosystem unit 320 proceeds to step S808. In step S808, by using the distribution key "Kdist" stored in the memory unit 321, data to be decrypted, that is, the encrypted content-ICV generating key "Kicv_cont" and at least one content key are decrypted.

When the content type field is "2" or "3" (representing content stored in media 2), the cryptosystem unit 320 proceeds to step S809. In step S809, data to be decrypted, that is, the encrypted content-ICV generating key "Kicv_cont" and at least one content key are decrypted by using the media-2 storage key "Ksto" (CBC mode). The details of this decryption processing is as described above with reference to FIGS. 32, 33, and 34.

Figure 38:
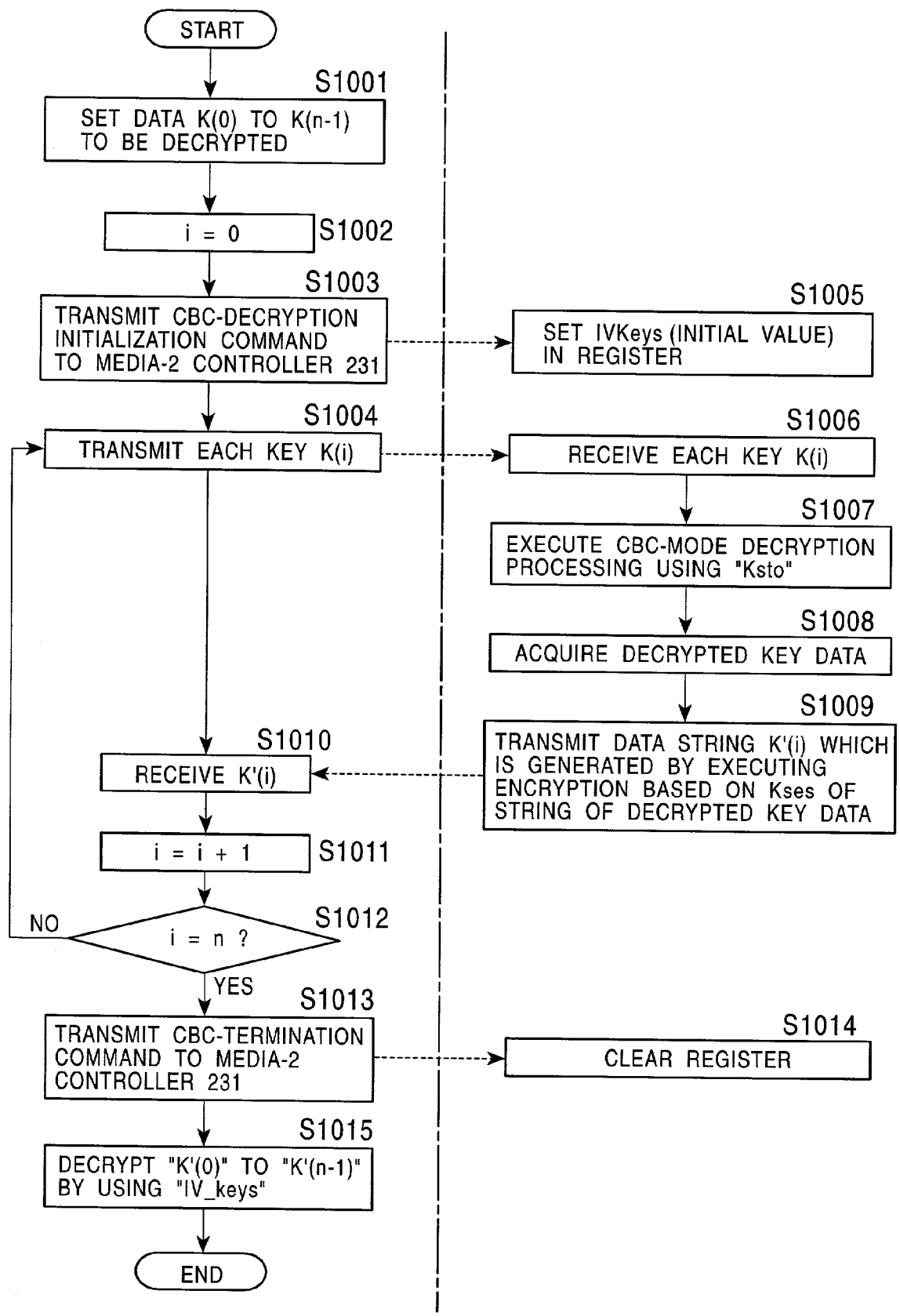
FIG. 38 consists of flowcharts showing storage-key decryption processing in a data processing device of the present invention.

With reference to the flowchart shown in FIG. 38, the decryption process (in step S809) is described below in which the media-2 storage key "Ksto" is used to decrypt the encrypted content-ICV generating key "Kicv_cont" and at least one content key. The left part of the flowchart in FIG. 38 shows processing of the memory I/F unit 300, and the right part of the flowchart in FIG. 38 shows processing of the media-2 controller 231 (shown in FIG. 2).

In step S1001, the memory I/F unit 300 sets K(0) to K(n−1) as data to be decrypted (the encrypted content-ICV generating key "Kicv_cont" and at least one content key). In step S1003, the memory I/F unit 300 transmits a CBC decryption initialization command to the media-2 controller 231. In step S1005, the media-2 controller 231 sets the initial value "IV_keys". After that, the memory I/F unit 300 sequentially transmits each key K(i) to the media-2 controller 231. In step S1006, the media-2 controller 231 receives the key K(i) to be decrypted.

In step S1007, by executing CBC-mode decryption processing by using the media-2 storage key "Ksto", the media-2 controller 231 processes the received key K(i) to be decrypted. In step S1008, the media-2 controller 231 obtains the decrypted key data (e.g., content key corresponding to a plurality of sectors). In step S1009, by executing CBC-mode decryption processing by using the session key generated in the mutual authentication with media 2, the media-2 controller 231 processes a decrypted data string to generate a data string K'(i), and transmits the data string K'(i) to the memory I/F unit 300. Steps S1007 to S1009 are executed based on the DES-CBC-mode processing described using FIG. 34.

After the memory I/F unit 300 sequentially receives K'(i) and confirms the reception of all pieces of data (step S1012), it transmits a CBC termination command to the media-2 controller 231 (step S1013). When receiving the CBC termination command, the media-2 controller 231 clears its register (step S1014).

In step S1015, the memory I/F unit 300 decrypts, in the CBC mode, K'(i) which is received from media 2 by using the initial value "IV_keys" stored in the memory unit 321 (shown in FIG. 4), and applying the session key "Kses" generated in the mutual authentication with media 2. This decryption processing is identical to that described using FIG. 33.

The above processing enables the device 200 to decrypt the encrypted content key Kc and the content-ICV generating key "Kicv_cont" and to obtain the decrypted keys.

Referring back to FIG. 35, the encrypted-file reading processing is described below.

After step S710, which is the above key-decryption processing, ends, the memory I/F unit 300 proceeds to step S711. In step S711, the memory I/F unit 300 internally sets the header as a "read header", sets the header set success flag to "1" (success), and sets the busy flag to "0" (ready). When content is read, processing based on set header information is executed.

In step S715, the control unit 205 transmits a status reading command to the memory I/F unit 300. On condition that the busy flag is "0" (ready) (step S716) and the header set success flag is "1" (success) (step S717), the control unit 205 proceeds to the next processing (shown in FIG. 36).

Figure 36:
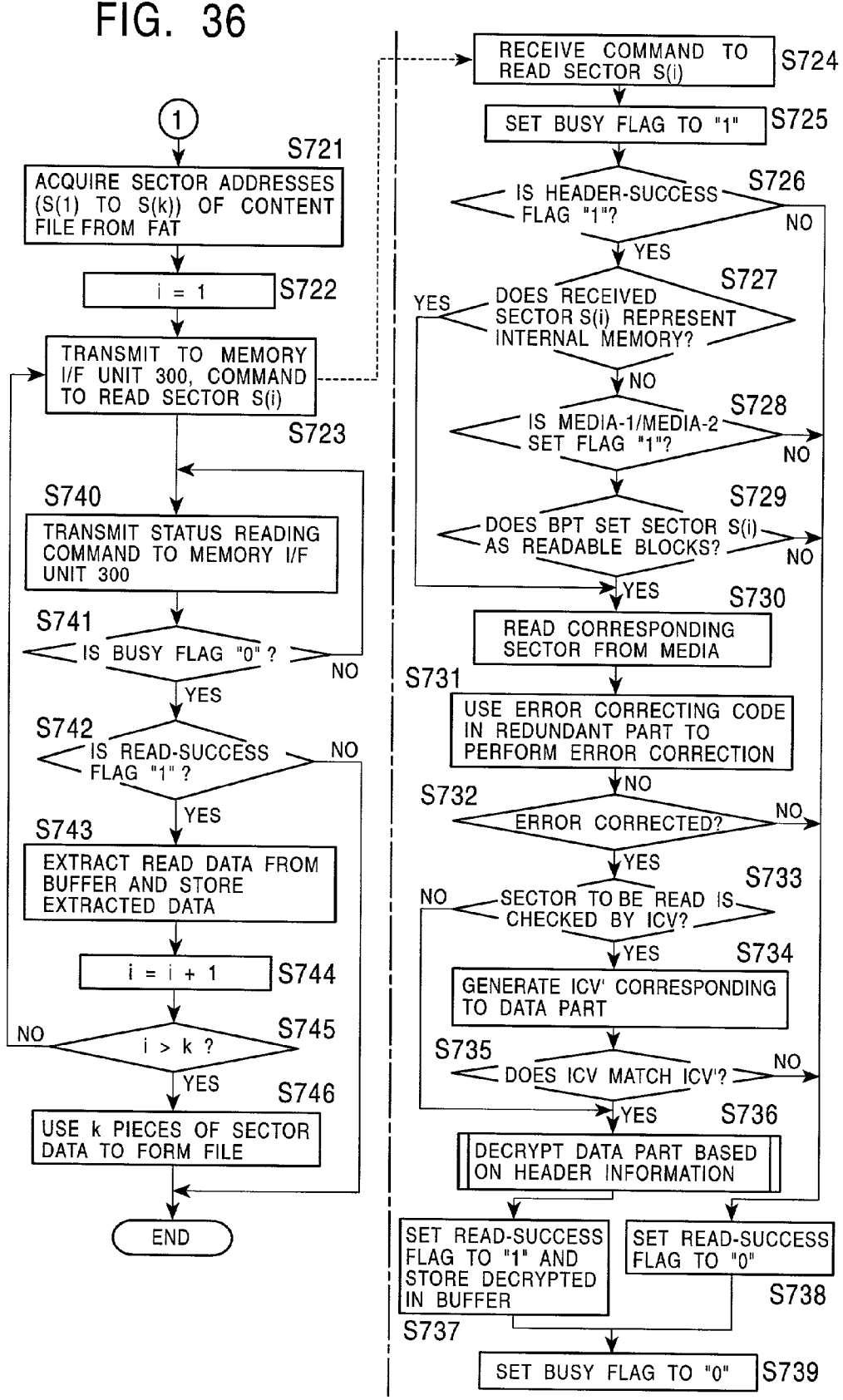
FIG. 36 consists of second flowcharts showing processing that reads encrypted data in a data processing device of the present invention.

In FIG. 36, in step S721, the control unit 205 acquires, from the FAT, the sector addresses S(1) to S(k) of a content file to be read, and sequentially transmits, to the memory I/F unit 300, each command to read sector S(i).

When the memory I/F unit 300 receives the command to read sector S(i) in step S724, it sets the busy flag to "1" (busy) in step S725, and proceeds to step S726 when the header success flag is "1" (success). When the header success flag is not "1", the memory I/F unit 300 proceeds to step S738, and sets the read-success flag to "0" (not OK) before terminating the processing.

When the header success flag is "1" (success), it is determined in step S727 whether the received sector S(i) is in the internal memory or in the external memory. If the received sector S(i) is in the external memory, it is determined in step S728 whether or not the media-1/media-2 set flag is "1" (indicating that the media is properly set). If the media-1/media-2 set flag is "1", in step S729, it is determined, by referring to the BPT, whether the BPT sets the sector S(i) to be read, as readable blocks. If the determination is affirmative, in step S730, the data of the corresponding sector is read from the external memory.

If the data to be read is data in the internal memory which is not managed by the BPT, steps S728 and S729 are skipped. If the determinations in steps S728 and S729 are negative, that is, when the set flag of media in which the sector S(i) is stored is not "1", or the BPT does not set the sector S(i) as readable blocks, the memory I/F unit 300 proceeds to step S738, and sets the read-success flag to "0" to represent a read error.

If the memory I/F unit 300 has determined in steps S726 to S729 that the reading of the sector S(i) is executable, the memory I/F unit 300 reads the corresponding sector from media in step S730, and executes, in step S731, error-correction processing based on an error correcting code in the redundant part which corresponds to the sector. In step S732, the memory I/F unit 300 determines whether or not the error correction has successfully been performed. In step S733, by referring to the ICV flag (shown in FIG. 7) of the header, the memory I/F unit 300 determines whether or not the sector to be read is a sector to be ICV-processed. As described above using FIG. 31, in the redundant part of each sector, an ICV for integrity checking is stored, and integrity checking can be performed in units of sectors.

If the sector to be read is a sector to be ICV-processed, the memory I/F unit 300 proceeds to step S734. In step S734, by using the content-ICV generating key "Kicv_cont" which is obtained by the decryption processing in step S710, and the initial value "IVcont", and inputting data (sector data) to be ICV-processed, the ICV generating processing described using FIG. 14 is executed, whereby an ICV' is found. In step S735, the memory I/F unit 300 collates the ICV' with an ICV stored in the sector's redundant part. If the collation indicates identity, it is determined that no interpolation is found.

When the ICV checking indicates that no interpolation is found, the memory I/F unit 300 proceeds to step S736, and executes the decryption based on header information of the data part. In step S737, the read-success flag is set to "1" (success) and the decrypted data is stored in the buffer.

In steps S740 to S746, the control unit 205 repeatedly executes the steps of reading the status of the memory I/F unit 300; extracting and storing the read data from the buffer on condition that the read-success flag is "1" when the busy flag is "0"; and sequentially extracting and storing data from the buffer while sequentially incrementing the address. After the control unit 205 stores all the sectors to be read, it uses the data of all the read sectors to form a file, and terminate the processing.

Figure 39:
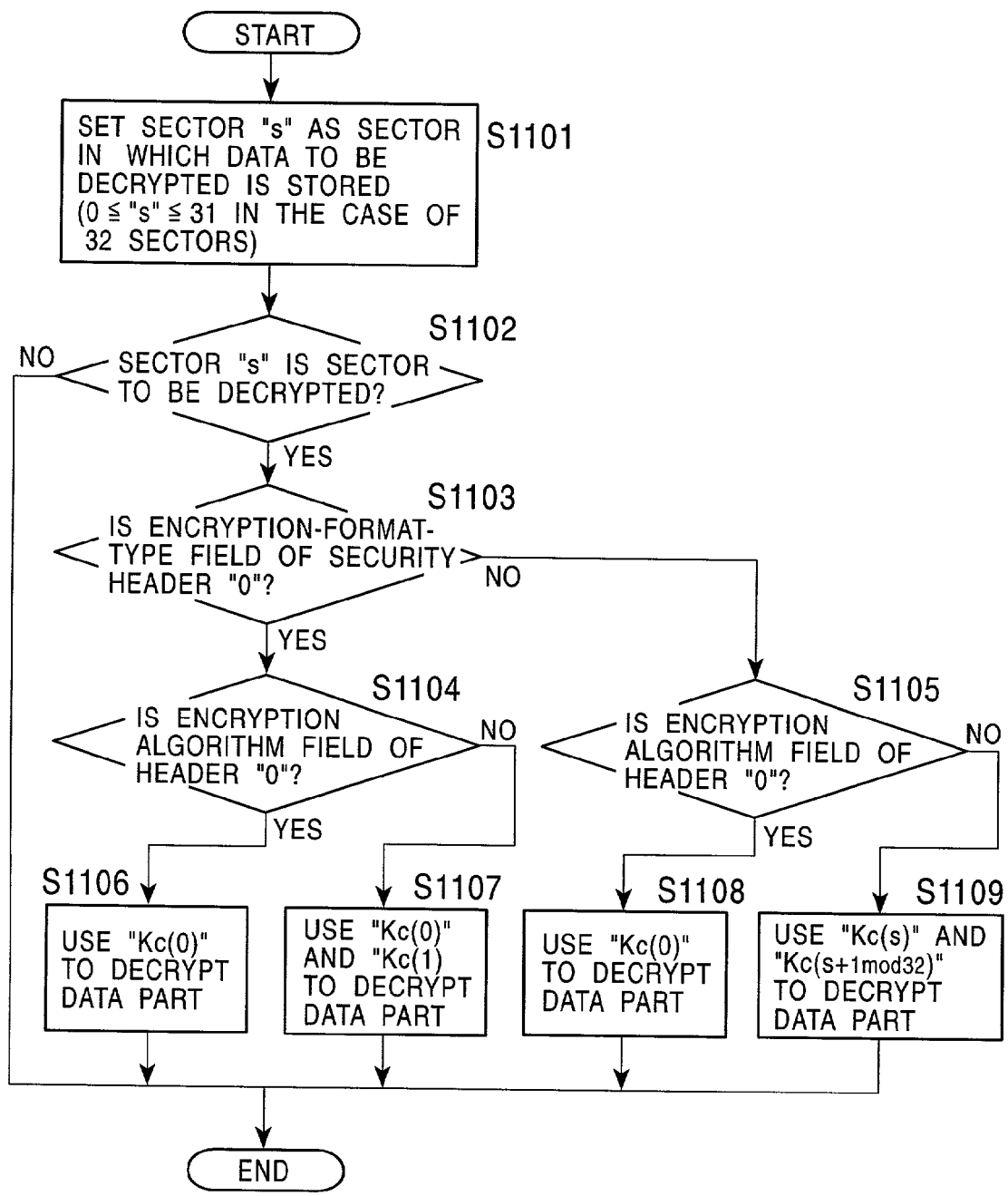
FIG. 39 is a first flowchart showing sector-data decryption processing in a data processing device of the present invention.

The details of the data-part decryption processing in step S736 in FIG. 36 are described below with reference to FIG. 39. This decryption processing is executed by the cryptosystem unit 320 (shown in FIG. 4) of the memory I/F unit 300.

In step S1101, the cryptosystem unit 320 sets sector "s" ($0 \leq s \leq 31$ in the case of 32 sectors) as a sector in which data to be decrypted is stored. In step S1102, the cryptosystem unit 320 verifies whether or not sector "S" is an encrypted sector. This verification is performed based on the encryption flag of the security header (shown in FIG. 7). If sector "s" is not an encrypted sector, decryption processing is not executed and is terminated. In step S1103, if sector "s" is an encrypted sector, the cryptosystem unit 320 checks the encryption format type. In other words, the setting of the encryption format type in the security header is checked. The cryptosystem unit 320 determines which encryption type is employed, an encryption type that encrypts the entirety of content by using a single encryption form, or an encryption type that performs encryption by using different keys for sectors.

When the encryption format type is set to "0", the entirety of content is processed in a single encryption form. In this case, in step S1104, the encryption algorithm is checked. The encryption algorithm is set to one of the single DES and the triple DES (see FIG. 28). When the encryption algorithm is set to the single DES, in step S1106, a single content key Kc(0) is used to execute decryption processing on the encrypted content. When the encryption algorithm is set to the triple DES, in step S1107, two content keys Kc(0) and Kc(1) are used to execute decryption processing on the encrypted content.

When it is found in step S1103 that the encryption format type is set to "1", the value indicates that encryption processing is performed by using different keys for different sectors. In this case, in step S1105, the encryption algorithm is checked. The encryption algorithm is set to one of the single DES and the triple DES (see FIG. 28). When the checking in step S1105 indicates that the encryption algorithm is set to the single DES, in step S1108, decryption processing on the encrypted content is executed by using each content key Kc(s) corresponding to each sector (s) for each sector. When the checking in step S1105 indicates that the encryption algorithm is set to the triple DES, in step S1109, two content keys Kc(s) and Kc(s+1mod32) are used to execute decryption processing on encrypted content in each sector.

Figure 40:
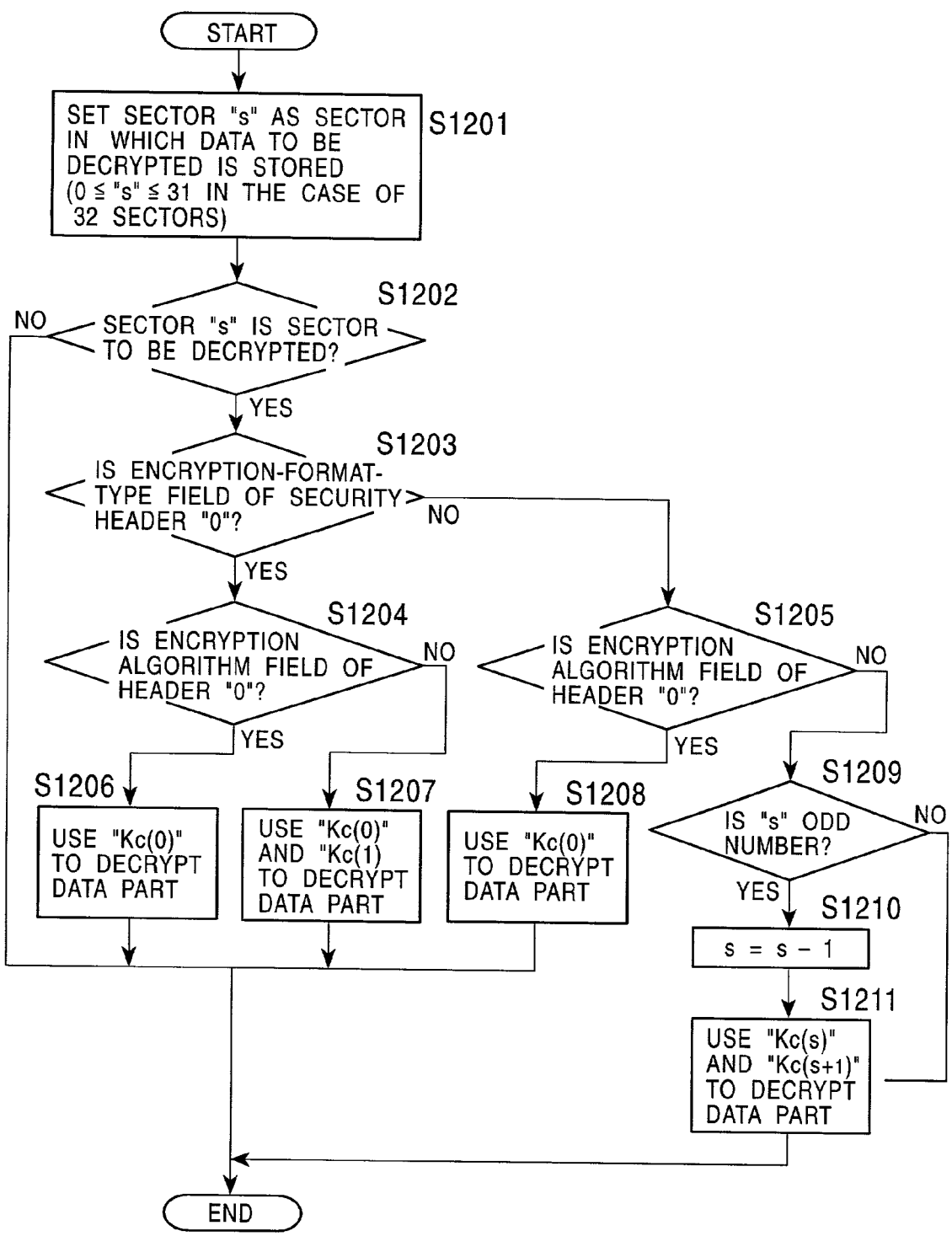
FIG. 40 is a second flowchart showing sector-data decryption processing in a data processing device of the present invention.

A different form of the decryption processing on sector data is shown in FIG. 40. In FIG. 40, steps S1201 to S1208 are identical to steps S1101 to S1108 shown in FIG. 39. The flowchart in FIG. 40 differs from FIG. 39 in steps S1209 to S1211.

After determining, in step S1205, that the encryption algorithm is the triple DES, it is determined, in step S1209, whether or not the sector number "s" is odd. If the sector number "s" is odd, the updating represented by s=s−1 is executed in step S1210. In step S1211, decryption processing based on the triple DES is executed, using Kc(s) and Kc(s+1) as keys for each sector.

Playback processing that needs decryption processing of stored encrypted-form data is executed in accordance with the flowcharts in FIGS. 35 to 40.

Processing for Writing Data in Encrypted Form

With reference to the flowcharts shown in FIG. 41 and the following drawings, details of processing that writes data in encrypted form into media are described below.

There are two forms of data encryption. As described above, one is that data is encrypted by using different keys for sectors, and the other one is that the entirety of content is encrypted by using one encryption key. The form of encryption is set in the header information.

Figure 41:
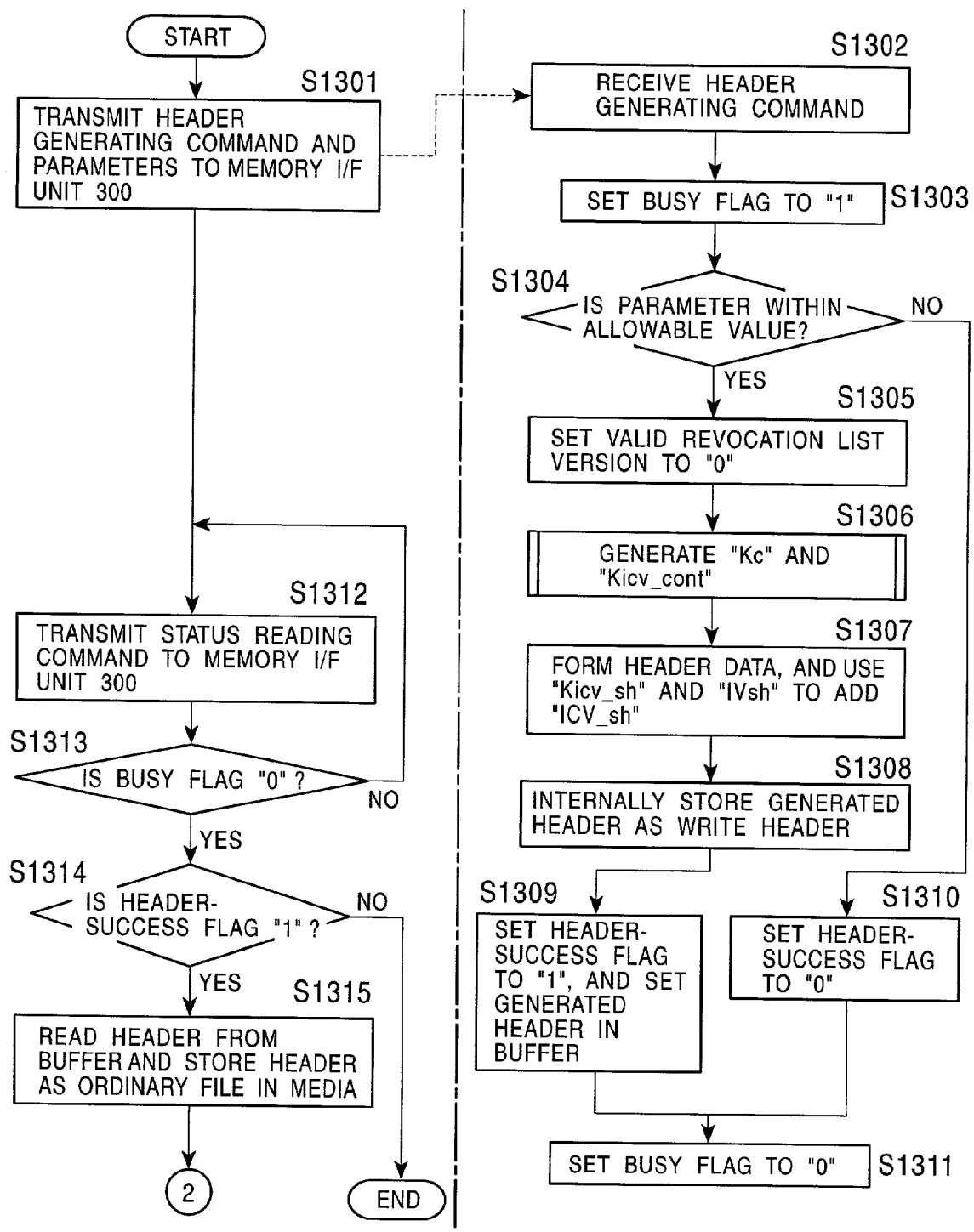
FIG. 41 consists of first flowcharts showing processing that writes data in encrypted form in a data processing device of the present invention.

In FIG. 41, the left part of the flowchart shows processing of the control unit 205 in the device 200, and the right part of the flowchart shows processing of the memory I/F unit 300 in the device 200.

In step S1301, the control unit 205 transmits a header generating command that corresponds to stored content to be read, and a parameter as header information to the memory I/F unit 300.

When the memory I/F unit 300 receives the header generating command in step S1302, it sets the busy flag to "1" (busy) in step S1303, and determines, in step S1304, whether or not the received parameter is in an allowable range. The memory I/F unit 300 has a predetermined parameter range which can be set in the header. In step S1304, when the comparison between the received parameter and the allowable range indicates that the received parameter exceeds the settable parameter range, the memory I/F unit 300 proceeds to step S1310, and sets the header-generating-success flag to "0" (not OK) before terminating the processing. When the received parameter is within the allowable range, the memory I/F unit 300 sets the valid revocation list version of the header to "0" in step S1305, whereby data processing can be performed without referring to the revocation list. Concerning the setting of the valid revocation list version to "0", on the assumption that content stored by the device 200 itself is guaranteed to be valid, the device 200 is set so as to perform data processing (playback) without referring to the revocation list.

Figure 35:
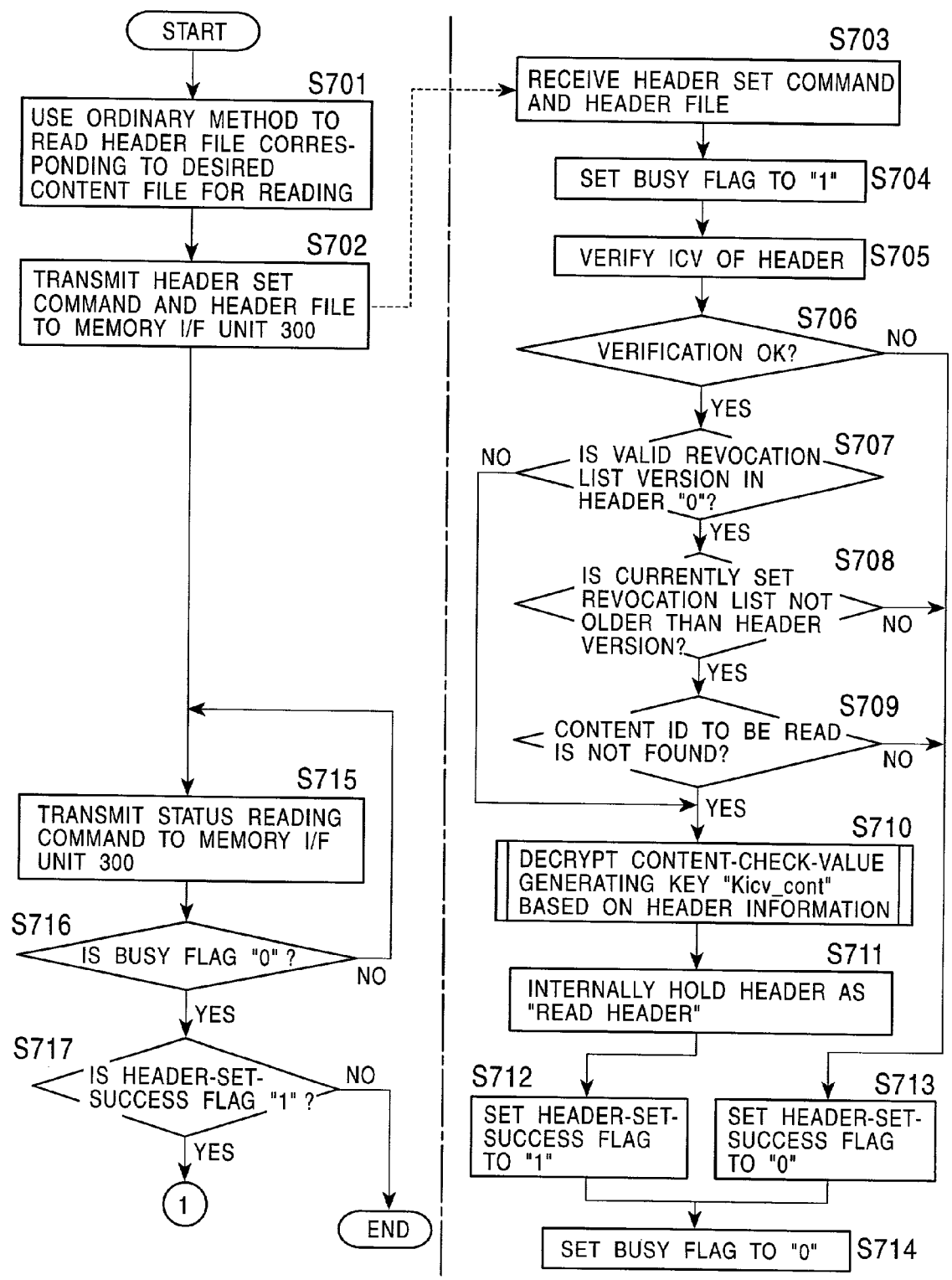
FIG. 35 consists of first flowcharts showing processing that reads encrypted data in a data processing device of the present invention.

In a case in which content to be written is, for example, content that is externally received by means of communication, an identifier is added to the received content, and a revocation list to be read is stored in the header, which can be collated with the revocation list in the device 200, identifier-collation processing using revocation lists may be performed which are identical to steps S707 to S709 in the encrypted-file reading processing described using FIG. 35.

Figure 43:
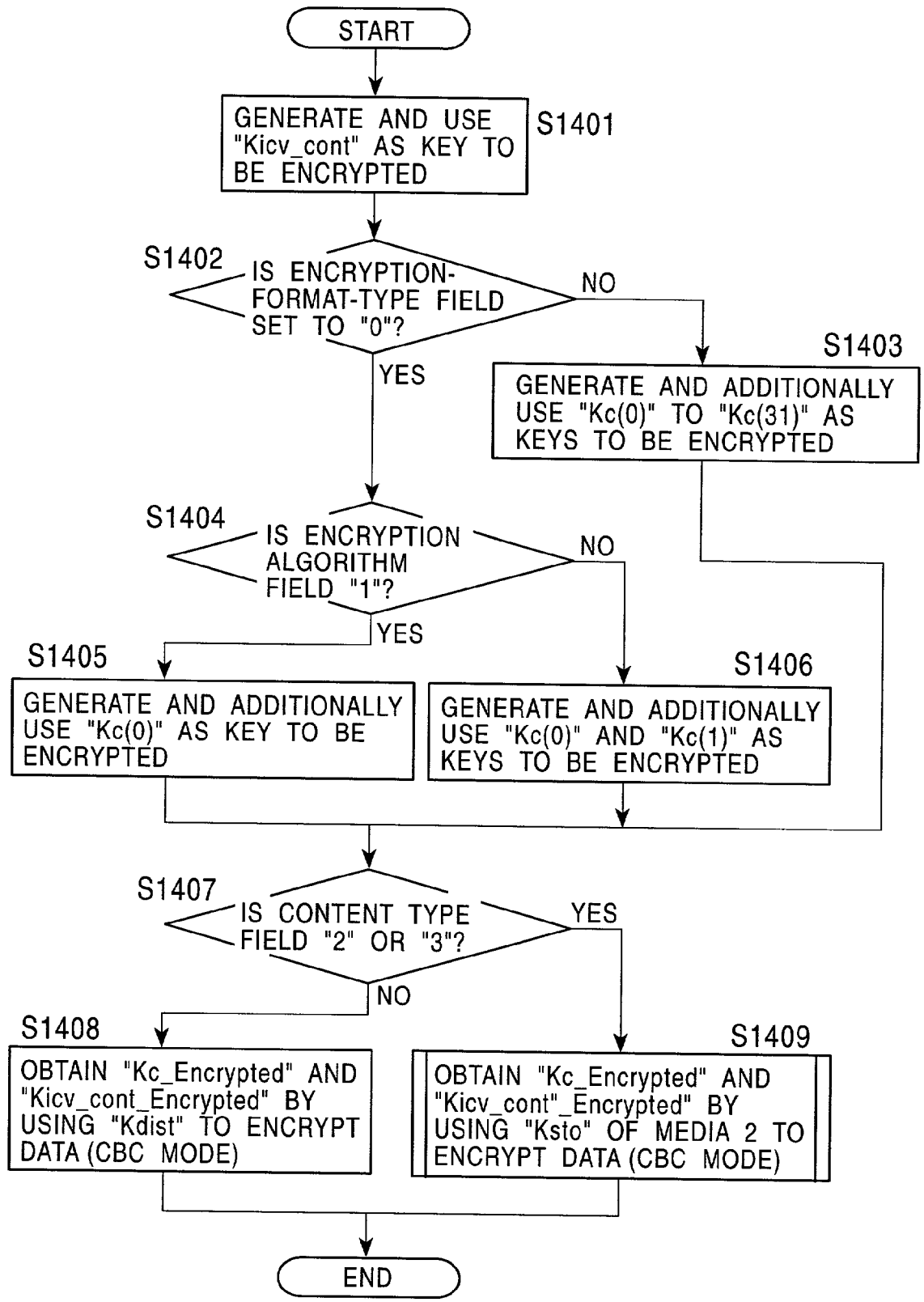
FIG. 43 is a flowchart showing encryption processing in a data processing device of the present invention.

In step S1306, based on the header information, a content key "Kc" and a content-ICV generating key "Kicv_cont" are generated and encrypted. The details of the generation and encryption in step S1306 of the content key "Kc" and the content-ICV generating key "Kicv_cont" are shown in FIG. 43. The processing in FIG. 43 is executed by the cryptosystem unit 320 (shown in FIG. 4) of the memory I/F unit 300 in the device 200. The flowchart in FIG. 43 is described below.

In step S1401, a content-ICV generating key "Kicv_cont" is generated based on, for example, random numbers, and is used as a key to be encrypted. In step S1402, the cryptosystem unit 320 determines whether or not the encryption format type field is set to "0". The setting of the encryption format type field to "0" indicates that the entirety of content is encrypted in a single encryption form, regardless of sectors. The setting of the encryption format type field to "1" indicates that content is encrypted by using the sector-unit encryption keys described using FIGS. 27A and 27B. When the encryption format type field is not set to "0", the cryptosystem unit 320 proceeds to step S1403, and generates sector-unit content keys Kc(0) to Kc(31) (in the case of 32 sectors) to be encrypted.

In step S1404, if the cryptosystem unit 320 has determined that the encryption format type field is set to "0", it proceeds to step S1404, and determines whether or not the encryption algorithm field of the header is "1" (triple DES) or "0" (single DES). If the encryption algorithm field is set to "0" (single DES), the cryptosystem unit 320 proceeds to step S1405, and additionally generates a content key Kc(0) to be encrypted. If the encryption algorithm field is set to "1" (triple DES), the cryptosystem unit 320 proceeds to step S1406, and additionally generates a plurality of content keys Kc(0) and Kc(1) to be encrypted.

In step S1407, the cryptosystem unit 320 determines whether or not the content type field of the header is set to one of "2" and "3" (content stored in media 2). When the content type field of the header is not set to one of "2" and "3", the cryptosystem unit 320 proceeds to step S1408, and uses the distribution key "Kdist" stored in the memory unit 321 (shown in FIG. 4) to encrypt data, namely, the content-ICV generating key "Kicv_cont" and at least one content key.

When the content type field of the header is set to one of "2" and "3" (content stored in media 2), the cryptosystem unit 320 proceeds to step S1409, and encrypts data, namely, the content-ICV generating key "Kicv_cont" and at least one content key by using the storage key "Ksto" (CBC mode) of media 2. The details of this encryption are as described above using FIGS. 32, 33, and 34.

With reference to the flowchart shown in FIG. 44, encryption processing (in step S4109) on the content-ICV generating key "Kicv_cont" and at least one content key by using the media-2 storage key "Ksto" is described below.

Figure 44:
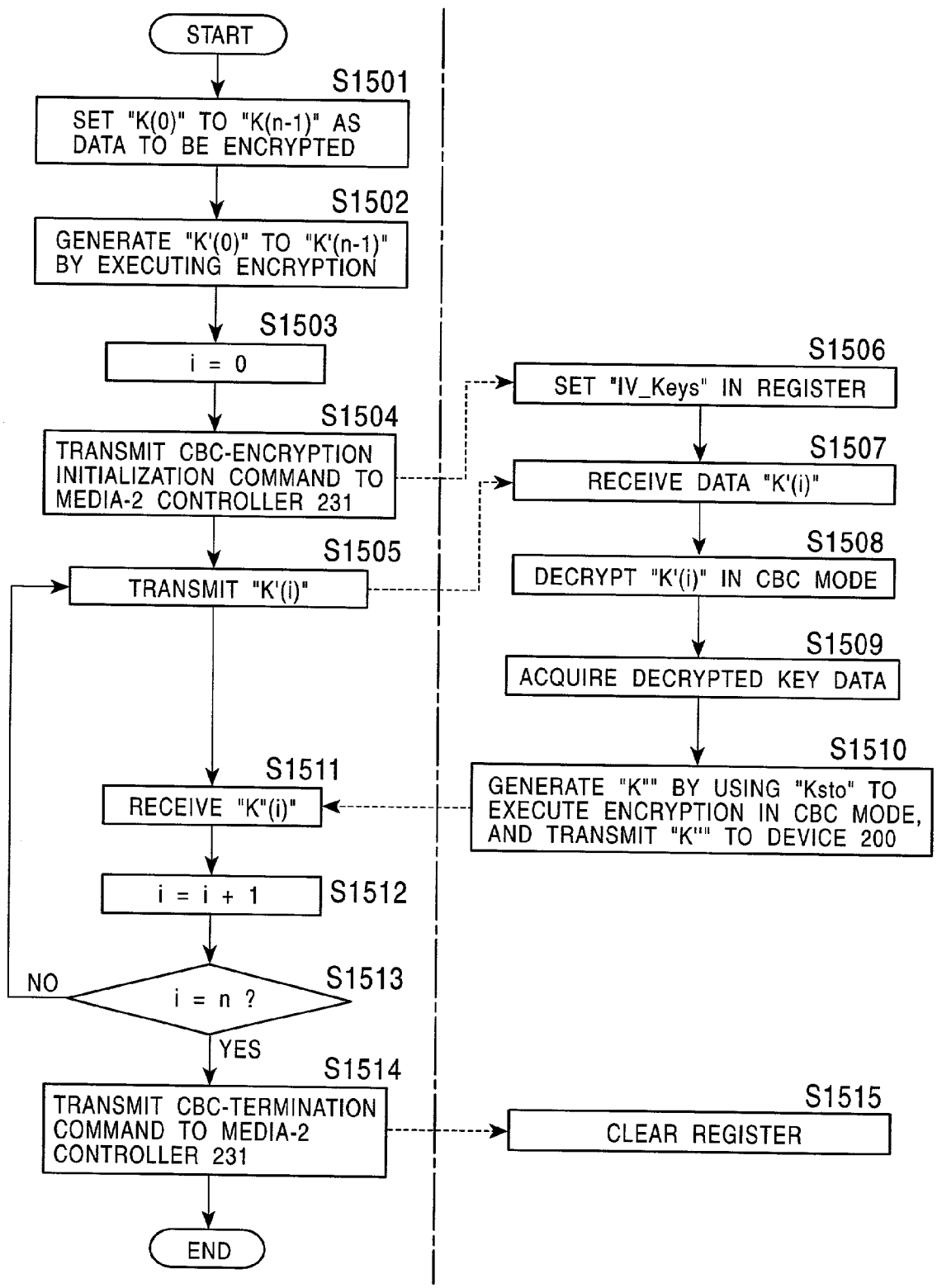
FIG. 44 consists of flowcharts showing storage-key encryption processing in a data processing device of the present invention.

The left part of the flowchart in FIG. 44 shows processing of the memory I/F unit 300, and the right part of the flowchart in FIG. 44 shows processing of the media-2 controller 231 (shown in FIG. 2).

In step S1501, the memory I/F unit 300 sets data to be encrypted K(0) to K(n−1) (the content-ICV generating key "Kicv_cont" and at least one content key). In step S1502, the memory I/F unit 300 generates data K'(0) to K'(n−1) by executing the DES-CBC-mode encryption of the data to be encrypted K(0) to K(n−1) by using the session key generated in the mutual authentication with media 2, and the initial value "IV_keys" stored in the memory unit 321. This encryption processing is executed by a processing structure identical to that described using FIG. 32. In step S1504, the memory I/F unit 300 transmits a CBC-encryption initialization command to the media-2 controller 231. In step S1506, the media 2 sets the internally stored initial value "IV_keys" in its register. After that, in step S1505, the memory I/F unit 300 transmits each key K'(i) as data to the media-2 controller 231.

In step S1507, the media-2 controller 231 receives the data K'(i). In step S1508, the media-2 controller 231 executes, by using the session key generated in the mutual authentication with the device 200, CBC-mode decryption processing on the received data K'(i). In step S1509, the media-2 controller 231 obtains the decrypted key data (e.g., a plurality of content keys corresponding to sectors). In step S1510, by executing CBC-mode encryption processing on the decrypted key data string by using the media-2 storage key "Ksto", a data string K"(i) is generated, and is transmitted to the device 200. Steps S1507 to S1510 are executed based on the DES-CBC mode described above using FIG. 34.

After the memory I/F unit 300 sequentially receives K"(i) and confirms the reception of all pieces of the data, it transmits a CBC termination command to the media-2 controller 231 (steps S1511 to S1514). When receiving the CBC termination command, the media-2 controller 231 clears its register.

The memory I/F unit 300 uses the K"(0) to K"(n−1) received from media 2 as encrypted key data which is stored in the header. The above processing enables the device 200 to obtain the encrypted content key "Kc" and "Kicv_cont" which are stored in the header.

Referring back to FIG. 41, the processing that writes data in encrypted form is described below.

After the above generation and encryption in step S1306 of the content key "Kc" and the content-ICV generating key "Kicv_cont" ends, the memory I/F unit 300 proceeds to step S1307, and generates an ICV based on the generated header data. The security-header check value "ICV_sh" is generated based on the ICV generating construction described above using FIG. 14 by using the initial value "IVsh" stored in the memory unit 321 (shown in FIG. 4) and the security-header-ICV generating key "Kicv_sh". In step S1308, the generated header is internally stored as a write header. In step S1309, the header-generating-success flag is set to "1" (success) and the busy flag is set to "0" (ready).

In step S1312, the control unit 205 transmits a status reading command to the memory I/F unit 300. On condition that the determination in step S1313 indicates that the busy flag is "0" (ready) and the determination in step S1314 indicates that the header-generating-success flag is "1" (success), the control unit 205 proceeds to step S1315. In step S1315, the control unit 205 reads the header from its buffer and stores the header as an ordinary file in media 2. After that, the control unit 205 proceeds to the next processing shown in FIG. 42.

In FIG. 42, in step S1321, the control unit 205 divides the content file to be written into sectors. The divided pieces of the data are represented by D(1) to D(k). In steps S1321 to S1324, the control unit 205 sets sector S(i) in which each data D(i) is written, and sequentially transmits, to the memory I/F unit 300, data D(i) and a command to write sector S(i) in encrypted form. When the memory I/F unit 300 receives the command to write sector S(i) in encrypted form in step S1325, it sets the busy flag to "1" (busy) in step S1326, and proceeds to step S1328 when it is determined in step S1327 that the head-generating-success flag is set to "1" (success).

In step S1328, the memory I/F unit 300 determines whether the received sector S(i) is in the internal memory or in the external memory. If the he received sector S(i) is in the external memory, the memory I/F unit 300 determines in step S1329 whether the media-1 or media-2 set flag is set to "1". When the set flag is "1", the memory I/F unit 300 determines, in step S1330, by referring to the BPT, whether the BPT sets sector S(i) in which data is written, as writable blocks. When the BPT sets sector S(i) as writable blocks, in step S1331, the memory I/F unit 300 generates error correcting codes corresponding to sectors.

In step S1332, the memory I/F unit 300 determines, based on the header information (ICV flag), whether or not sector S(i) is a sector in which an ICV is set. When sector S(i) is a sector in which an ICV is set, an ICV for sector data is generated based on the content-ICV generating key "Kicv_cont" in step S1333.

Figure 45:
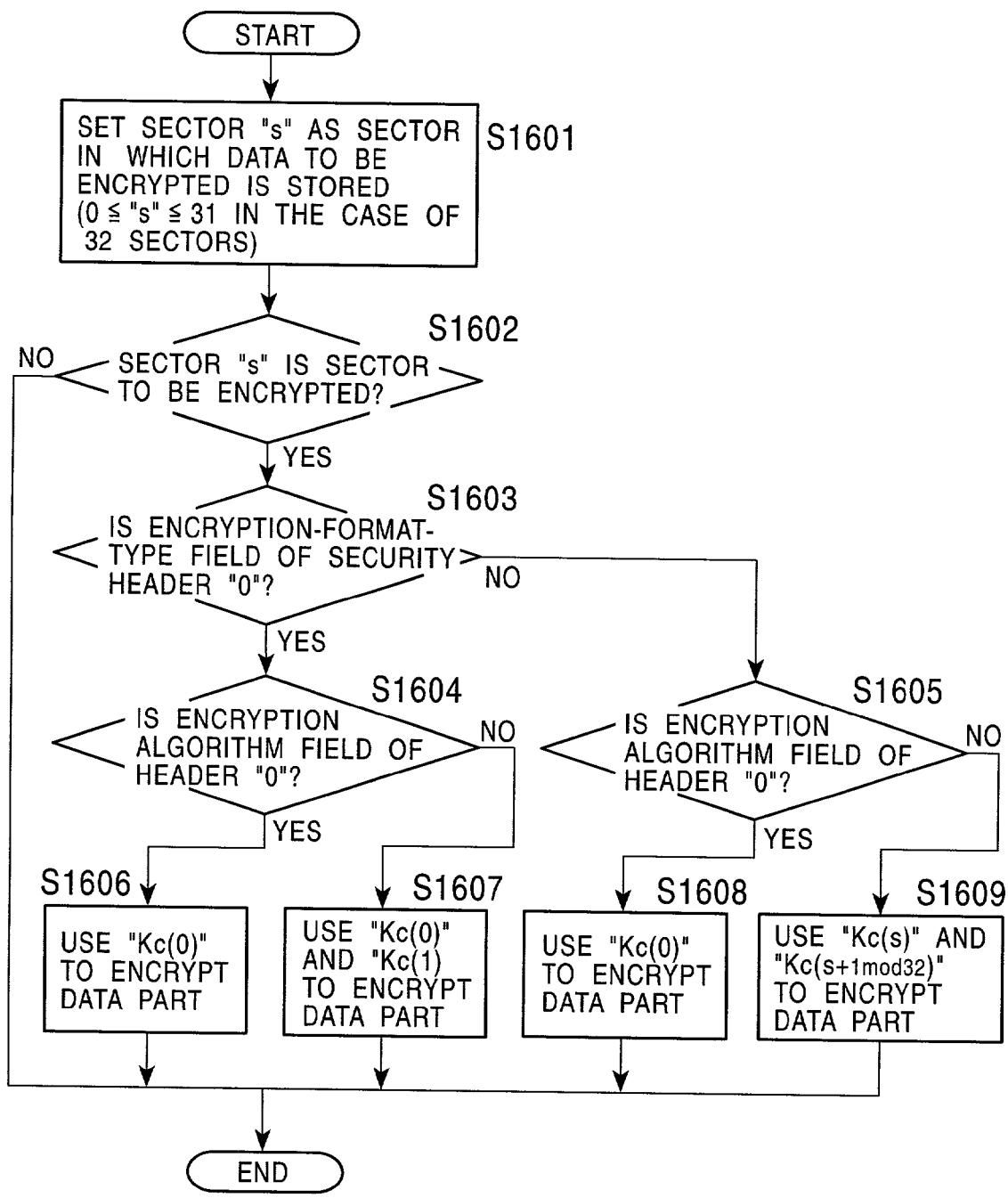
FIG. 45 is a first flowchart showing sector-data encryption processing in a data processing device of the present invention.

In step S1334, the memory I/F unit 300 executes the encryption processing based on the header information of the data. The details of the encryption processing in step S1334 are described below with reference to FIG. 45. This encryption processing is executed by the cryptosystem unit 320 (shown in FIG. 4) of the memory I/F unit 300 in the device 200.

In step S1601, the cryptosystem unit 320 sets sector "s" ($0 \leq s \leq 31$ in the case of 32 sectors) as a sector in which data to be encrypted is stored. In step S1602, the cryptosystem unit 320 verifies whether or not sector "s" is a sector to be encrypted. This verification is performed based on the encryption flag in the security header (shown in FIG. 7). When sector "s" is not a sector to be encrypted, the encryption processing is not executed and is terminated. When sector "s" is a sector to be encrypted, the encryption format type is checked in step S1603. This is verification of the setting of the encryption format type in the security header, in which it is determined which encryption type is employed, a type in which the entirety of content is encrypted in one encryption form, or a type in which content is encrypted by using different keys for different sectors.

The setting of the encryption format type field to "0" indicates that the entirety of content is encrypted in a single encryption form. In this case, in step S1604, the encryption algorithm is checked in step S1604. The encryption algorithm is used to set one of the single DES and the triple DES (shown in FIGS. 28A and 28B). When the encryption algorithm is set to the single DES, a single content key "Kc(0)" is used to execute encryption processing on content to be encrypted in step S1606. When the encryption algorithm is set to the triple DES, two content keys "Kc(0)" and "Kc(1)" are used to execute encryption processing on content to be encrypted in step S1607.

The setting of the encryption format type to "1" indicates that content is encrypted by using different keys for different sectors. In this case, in step S1605, the encryption algorithm is checked. The encryption algorithm is used to set one of the single DES and the triple DES (shown in FIGS. 28A and 28B). When the encryption algorithm is set to the single DES, encryption processing on content to be encrypted is executed in step S1608 by applying each sector-unit content key "Kc(s)" set for each sector "s". When the encryption algorithm is set to the triple DES, sector-unit encryption processing is executed in step S1609 by applying two content keys "Kc(s)" and "Kc(s+1mod32)".

Figure 46:
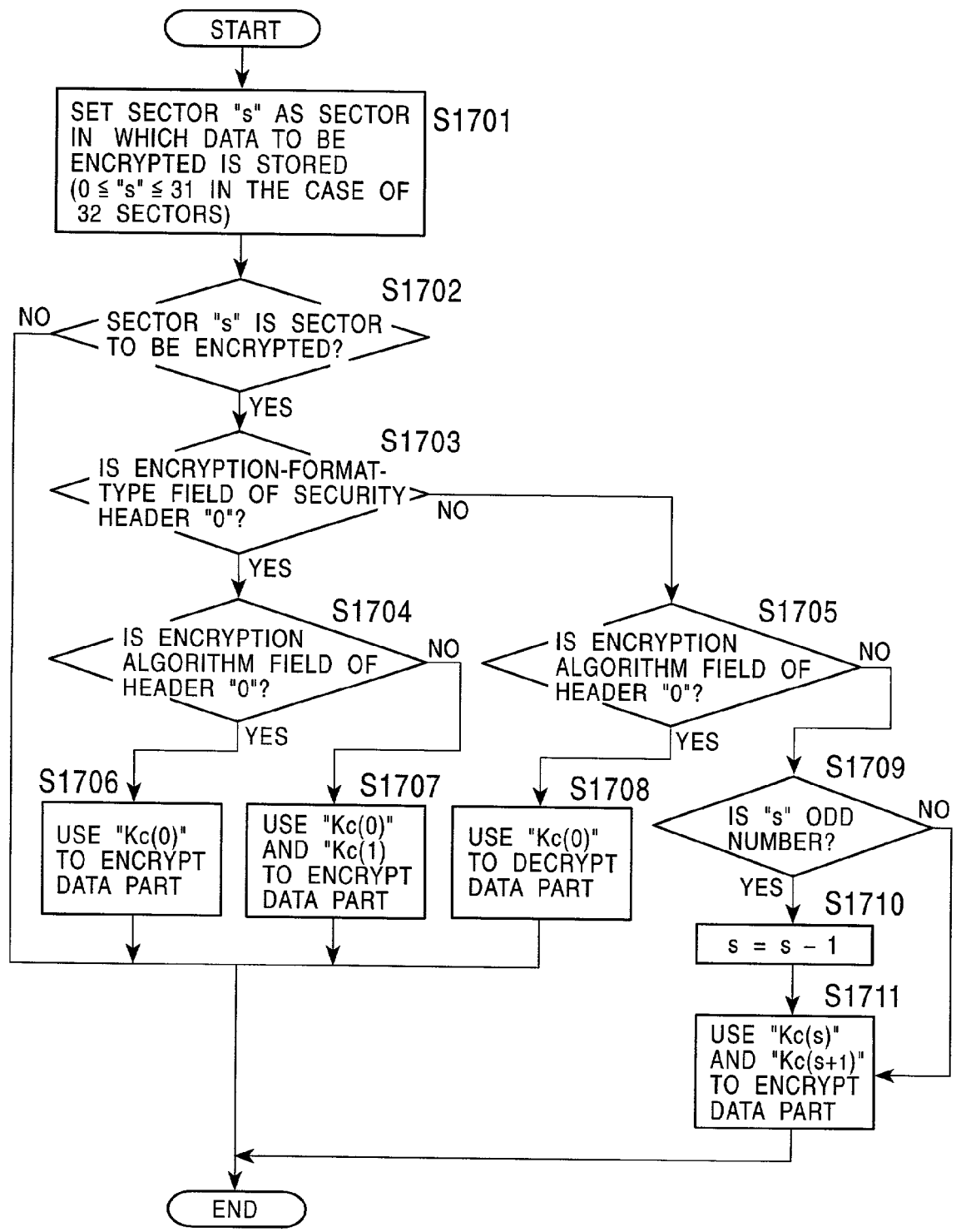
FIG. 46 is a second flowchart showing sector-data encryption processing in a data processing device of the present invention.

A different form of the encryption processing on the sector data is shown in FIG. 46. Steps S1701 to S1708 are identical to steps 1601 to S1608 shown in FIG. 45. The flowchart of FIG. 46 differs from that of FIG. 45 in steps S1709 to S1711.

When it is determined in step S1705 that the encryption algorithm is set to the triple DES, the sector number "s" is checked in step S1709. When the number "s" is odd, updating represented by s=s−1 is executed in step S1710, and encryption processing based on the triple DES is executed in step S1711, using "Kc(s)" and "kc(s+1)" for each sector.

Referring back to FIG. 42, the processing that write the file in encrypted form is further described below.

When step S1334 that uses the above processing to encrypt the data part ends, an error correcting code for the data part is generated in step S1335, and in step S1336, the encrypted data D(i), an ICV corresponding to sector data, and the redundant part having the error correcting code are written in media. In step S1337, the write-success flag is set to "1" (success). In step S1339, the busy flag is set to "0" (ready).

When the data to be written is written in the internal memory, steps S1329 and S1330 are skipped. When the determinations in steps S1329 and S1330 are negative, that is, when the media set flag is not "1", or the BPT does not set sector S(i) as a writable sector, the write-success flag is set to "0" in step S1338 in order to indicate a write error.

In steps S1341 to S1345, the control unit 205 reads the status of the memory I/F unit 300, sequentially increments the address on condition that the busy flag is set to "0", and sequentially transmits the data to be written. After all pieces of the data are processed, update processing on the FAT is executed in step S1346. In step S1347, the updated FAT is transmitted to the memory I/F unit 300, with an update command. In step S1340, the memory I/F unit 300 executes the write processing of the FAT in accordance with the command.

By using the above-described processing described using FIGS. 41 to 46, data-encryption processing and data-storage processing are executed.

Updating of Revocation List

Updating processing of the revocation list as revocation information on inappropriate media and content is described below.

As described above, the revocation list according to the present invention consists of identifiers (IDs) of a plurality of types (e.g., media, content). By providing a plurality of types of IDs in a revocation list as revocation information on content and media, and performing collations as different operations, a plurality of types of content and media can be excluded with a single revocation list. When loading media or reading content, by controlling the memory I/F unit 300 to collate the ID of media or content in use with each of IDs recorded on the revocation list, the use of inappropriate media and the reading of inappropriate content can be prevented.

As described above, since a revocation list version is set in a revocation list, the revocation list is updated, for example, when adding revocation information on new inappropriate media and content.

Figure 47:
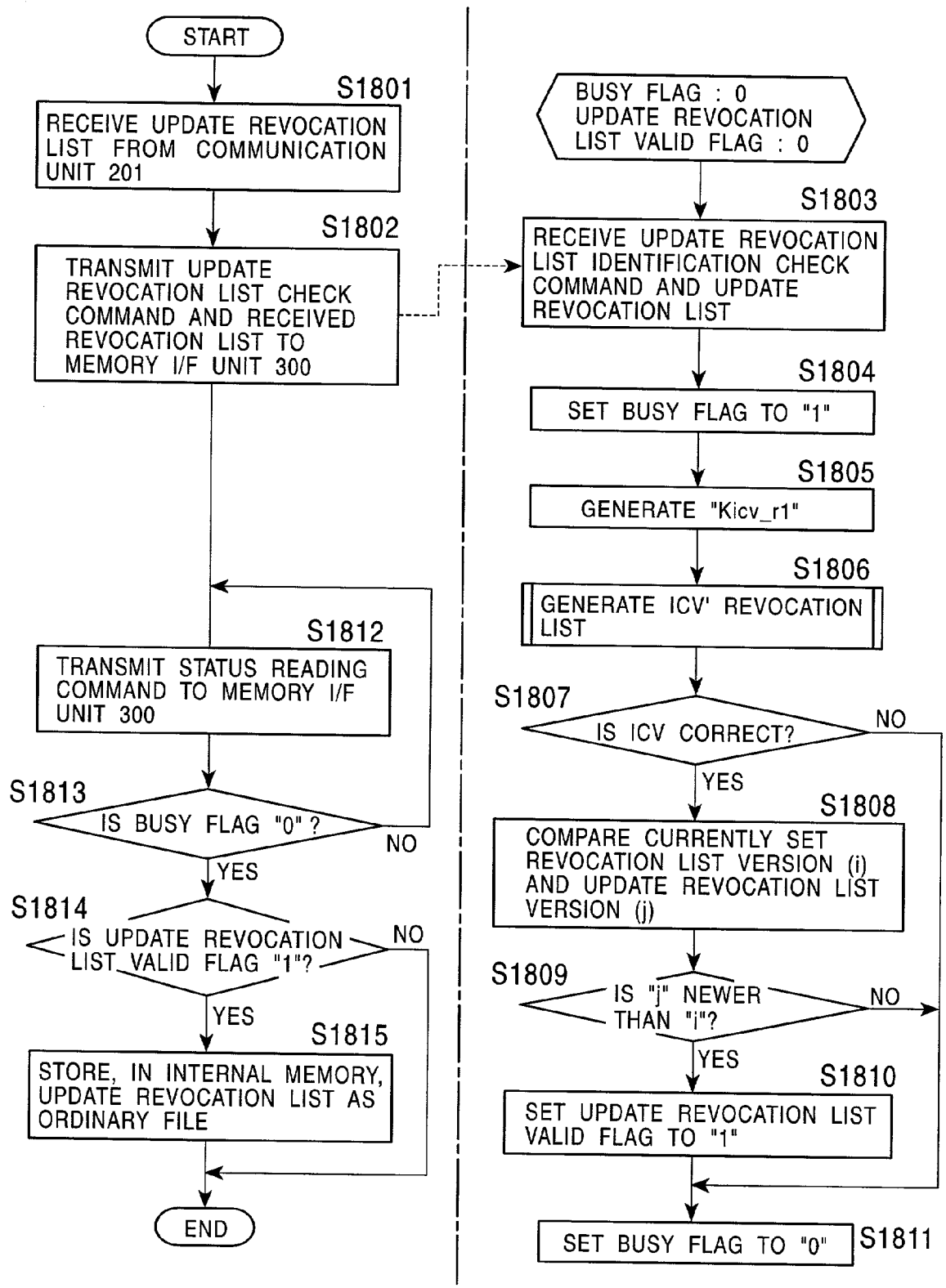
FIG. 47 consists of flowcharts showing update processing of a revocation list in a data processing device of the present invention.

The revocation list update processing is shown as a flowchart in FIG. 47. The left part of the flowchart shows processing of the control unit 205 in the device 200, and the right part of the flowchart shows processing of the memory I/F unit 300 in the device 200.

When the control unit 205 receives an update revocation list from the communication unit 201 (shown in FIG. 2) in step S1801, it transmits an update-revocation-list check command and the received update revocation list to the memory I/F unit 300 in step S1802.

When the memory I/F unit 300 receives the update-revocation-list check command and the received update revocation list from the control unit 205 in step S1803, it sets the busy flag to "1" (busy) in step S1804, and generates a revocation-list-ICV generating key "Kicv_rl" in step S1805.

The revocation-list-ICV generating key "Kicv_rl" is generated based on a master key "MKicv_rl" for generating an ICV key of a revocation list which is stored beforehand in the device 200, an initial value "IVicv_rl" at the time the ICV key of the revocation list is generated, a revocation list version ("Version") included in the attribute information of the revocation list. Specifically, The revocation-list-ICV generating key "Kicv_rl" is generated based on the ICV generating key "Kicv_rl"=DES(E, MKicv_rl, Version^IVicv_rl). This expression indicates that the exclusive OR value of the Version and the initial value "IVicv_rl" is processed by performing DES-mode encryption processing using the master key "MKicv_rl".

In step S1806, the memory I/F unit 300 uses the generated revocation-list-ICV generating key "Kicv_rl" to generate an ICV' of the revocation list. In step S1807, the memory I/F unit 300 performs collation of the ICV' with a correct ICV which is stored beforehand in the revocation list. The generation of the ICV' is performed based on the DES mode described using FIG. 14 by executing processing in which the initial value "IVrl" and the ICV generating key "Kicv_rl" are used.

When ICV'=ICV ("YES" in step S1807), it is determined that the update revocation list is valid without being interpolated, and the memory I/F unit 300 proceeds to step S1808. In step S1808, the memory I/F unit 300 compares version (i) of the currently set revocation-list and the version (j) of the update revocation list. When it is found in step S1809 that "j" is newer than "i", the update revocation list valid flag is set to "1" in step S1810, and the busy flag is set to "0" in step S1811.

In step S1812, the control unit 205 transmits a status reading command to the memory I/F unit 300. When it is determined that the busy flag is "0" ("YES" in step S1813), and it is determined that the update revocation list valid flag is "1" ("YES" in step S1814), the update revocation list is stored as an ordinary file in the internal memory in step S1815. When performing content processing, or checking media when it is loaded, the revocation list stored in the internal memory is read.

The present invention has been described while referring to specific embodiments thereof. However, it is obvious for a person skilled in the art to modify and substitute the embodiments without departing from the gist of the present invention. In other words, the present invention has been disclosed in the form of embodiments and should not limitedly be interpreted. To understand the gist of the present invention, the appended claims should be considered.

What is claimed is:

1. A data storage device comprising:
   a data storage area consisting of a plurality of blocks, each of which consists of a plurality of sectors which each have a predetermined data capacity; and
   cryptosystem means;
   wherein said cryptosystem means receives cryptosystem keys for performing cryptosystem processing on data to be stored in said data storage area, wherein the cryptosystem keys comprise:
   a first set of keys comprising a plurality of encryption/decryption keys, each of the encryption/decryption keys corresponding to a particular sector and used to encrypt or decrypt that particular sector, for each of the sectors from a device capable of performing data communication with said data storage device, and
   a second set of keys corresponding to integrity-check-value generating keys, the integrity-check-value generating keys being used to check the integrity of data to be stored in at least one of the sectors; and
   wherein the first and second set of keys are encrypted in a cipher block chaining (CBC) mode by said cryptosystem means using a storage key stored in said data storage device, and
   transmits the encrypted keys to said data storage device.

2. A data storage device according to claim 1, wherein said cryptosystem means generates key data as the header information of the data to be stored in said data storage area by using a storage key which is unique to said data storage device to execute the encryption processing in the CBC mode on the received set of keys.

3. A data storage device according to claim 1, wherein:
   said data storage device performs mutual authentication with said device capable of performing data communication with said data storage device;
   the received set of keys is a set of session-key-used CBC-mode-processing keys encrypted in the CBC mode by using a session key generated in the mutual authentication;
   said cryptosystem means performs the decryption in the CBC mode of said set of encrypted session-key-used CBC-mode-processing keys; and
   in said cryptosystem means, a set of storage-key-used CBC-mode-processing keys is generated by executing, based on a storage key unique to said data storage device, the encryption processing in the CBC mode on the set of decrypted session-key-used CBC-mode processing keys, and said set of storage-key-used CBC-mode-processing keys is transmitted as header-information-forming data to said device.

4. A data storage device according to claim 1, wherein:
   said data storage device performs mutual authentication with said device capable of performing data communication with said data storage device;
   the received set of keys is header information on the data to be stored in said data storage area, and is a set of storage-key-used CBC-mode-processing keys encrypted in the CBC mode based on a storage key unique to said data storage device;
   said cryptosystem means performs the decryption in the CBC mode of the set of encrypted storage-key-used CBC-mode-processing keys by using said storage key; and
   in said cryptosystem means, a set of session-key-used CBC-mode-processing keys is generated by executing, based on a session key generated in the mutual authentication, the encryption processing in the CBC mode, and said set of session-key-used CBC mode-processing keys is transmitted as data constituting decrypting key information.

5. A data recording method for a data processor comprising: a data storage device comprising cryptosystem means and a data storage area consisting of a plurality of blocks, each of which consists of a plurality of sectors which each have a predetermined data capacity; and a data recording device for executing data storage processing by transmitting data to said data storage device, said data recording method comprising the steps of:
   executing mutual authentication processing between said data storage device and said data recording device;

when the mutual authentication is established, transmitting, to said data storage device, by said data recording device, a set of session-key-used CBC-mode processing keys which are generated by executing, based on a session key generated in the mutual authentication, encryption processing in the CBC mode on a first set of keys comprising a plurality of encryption keys, each of the encryption keys corresponding to a particular sector and used to encrypt on pieces of data to be stored in each of the particular sectors, and a second set of keys corresponding to integrity-check-value generating keys, the integrity-check-value generating keys being used to check the integrity of data to be stored in at least one of the sectors, the encryption processing comprising encrypting said first and second set of keys in the CBC mode using a storage key stored in said data storage device;

decrypting, by said data storage device, said set of session-key-used CBC-mode-processing keys by performing decryption in the CBC mode using the session key;

transmitting, to said data storage device, a set of storage-key-used CBC-mode-processing keys which are generated by executing, based on a storage key unique to said data storage device, encryption processing in the CBC mode on the set decrypted session-key-used CBC-mode-processing keys; and generating, by said data recording device, header information including as a component the received set of storage-key-used CBC-mode-processing keys, the header information corresponding to the data to be stored in said data storage device.

6. A data playback method for a data processor comprising: a data storage device comprising cryptosystem means and a data storage area consisting of a plurality of blocks, each of which consists of a plurality of sectors which each have a predetermined data capacity; and a data playback device for playing back data which is received from said data storage device, said data playback method comprising the steps of:

executing mutual authentication processing between said data storage device and said data playback device;

when the mutual authentication is established, transmitting, from said data playback device to said data storage device, a set of storage-key-used CBC-mode-processing keys which is included in the header information of data stored in said data storage area and which is generated by executing encryption processing in the CBC mode using a storage key unique to said data storage device on an integrity-check-value generating key, the integrity-check-value generating key being used to check the integrity of data to be stored in at least one of the sectors;

decrypting, by said data storage device, the set of storage-key-used CBC-mode-processing keys by performing decryption in the CBC mode using the storage key;

transmitting, by said data storage device, to said data playback device, a set of session-key-used CBC-mode-processing keys which are generated by encrypting the set of decrypted storage-key-used CBC-mode-processing keys in the CBC mode based on a session key generated in the mutual authentication; and obtaining, by said data playback device, a set of keys comprising a plurality of decryption keys, each of the decryption keys corresponding to a particular sector and used for decrypting encrypted sector data which is stored in each of the particular sectors in said data storage area by decrypting, in the CBC mode, the session-key-used CBC-mode-processing keys by using the session key.

7. A program providing medium for providing a computer program which controls a computer system to execute data recording processing for a data processor comprising: a data storage device comprising cryptosystem means and a data storage area consisting of a plurality of blocks, each of which consists of a plurality of sectors which each have a predetermined data capacity; and a data recording device for executing data storage processing by transmitting data to said data storage device, said computer program comprising the steps of:

executing mutual authentication processing between said data storage device and said data recording device;

when the mutual authentication is established, transmitting, to said data storage device, by said data recording device, a set of session-key-used CBC-mode processing keys which are generated by encrypting a first set of keys comprising a plurality of encryption keys, each of the encryption keys corresponding to a particular sector and used to encrypt on pieces of data to be stored in each of the particular sectors, and a second set of keys corresponding to integrity-check-value generating keys of data, the integrity-check-value generating keys being used to check the integrity to be stored in at least one of the sectors, in the CBC mode based on a session key generated in the mutual authentication using a storage key stored in said data storage device;

decrypting, by said data storage device, said set of session-key-used CBC-mode-processing keys by performing decryption in the CBC mode using the session key;

transmitting, to said data storage device, a set of storage-key-used CBC-mode-processing keys which are generated by executing, based on a storage key unique to said data storage device, encryption processing in the CBC mode on the set of decrypted session-key-used CBC-mode-processing keys; and generating, by said data recording device, header information including as a component the received set of storage-key-used CBC-mode-processing keys; the header information corresponding to the data to be stored in said data storage device.

8. A program providing medium for providing a computer program which controls a computer system to execute data playback processing for a data processor comprising: a data storage device comprising cryptosystem means and a data storage area consisting of a plurality of blocks, each of which consists of a plurality of sectors which each have a predetermined data capacity; and a data playback device for playback device data which is received from said data storage device; said computer program comprising the steps of:

executing mutual authentication processing between said data storage device and said data playback device;

when the mutual authentication is established, transmitting, from said data playback device to said data storage device, a set of storage-key-used CBC-mode-processing keys which is included in the header information of data stored in said data storage area and which is generated by executing encryption processing in the CBC mode using a storage key unique to said data storage device on an integrity-check-value generating key, the integrity-check-value generating keys being used to check the integrity of data to be stored in at least one of the sectors;

decrypting, by said data storage device, the set of storage-key-used CBC-mode-processing keys by performing decryption in the CBC mode using the storage key;

transmitting, by said data storage device, to said data playback device, a set of session-key-used CBC-mode-processing keys which are generated by encrypting the set of decrypted storage-key-used CBC-mode-processing keys in the CBC mode based on a session key generated in the mutual authentication; and obtaining, by said data playback device, a set of keys comprising a plurality of decryption keys, each of the decryption keys corresponding to a particular sector and used for decrypting encrypted sector data which is stored in each of the particular sectors in said data storage area by decrypting, in the CBC mode, the session-key-used CBC-mode-processing keys by using the session key.

* * * * *